United States Patent
Nomura et al.

(10) Patent No.: US 7,616,899 B2
(45) Date of Patent: Nov. 10, 2009

(54) SYNCHRONIZING METHOD IN OPTICAL ACCESS NETWORK, OPTICAL SWITCHING DEVICE, CENTER DEVICE, AND REMOTE DEVICE

(75) Inventors: Takumi Nomura, Tokyo (JP); Hiromi Ueda, Tokyo (JP); Kunitetsu Makino, Tokyo (JP); Hiroyuki Kasai, Tokyo (JP); Toshinori Tsuboi, Tokyo (JP); Hiroaki Kurokawa, Tokyo (JP); Hirokazu Kobayashi, Tokyo (JP); Hiroyuki Endo, Tokyo (JP)

(73) Assignee: NEC Communications Systems, Ltd., Tokyo (JP)

( * ) Notice: Subject to any disclaimer, the term of this patent is extended or adjusted under 35 U.S.C. 154(b) by 648 days.

(21) Appl. No.: 11/366,842

(22) Filed: Mar. 3, 2006

(65) Prior Publication Data

US 2006/0239285 A1 Oct. 26, 2006

(30) Foreign Application Priority Data

Mar. 4, 2005 (JP) .............................. 2005-061672

(51) Int. Cl.
*H04B 10/00* (2006.01)
*H04J 14/00* (2006.01)

(52) U.S. Cl. ..................... 398/154; 398/68; 398/165; 398/167.5

(58) Field of Classification Search ............. 398/66–68, 398/70–72, 165–167, 167.5, 154

See application file for complete search history.

(56) References Cited

U.S. PATENT DOCUMENTS

2004/0109688 A1* 6/2004 Kim et al. .................. 398/68
2004/0146064 A1* 7/2004 Kramer ..................... 370/448
2004/0264400 A1* 12/2004 Lee et al. ................... 370/319

FOREIGN PATENT DOCUMENTS

JP 2000-295264 10/2000

* cited by examiner

*Primary Examiner*—Dalzid Singh
(74) *Attorney, Agent, or Firm*—McGinn IP Law Group, PLLC

(57) ABSTRACT

To provide synchronizing methods, optical switch modules, center devices, remote devices, optical access systems, optical access networks, programs, and recording media in the optical access network which can give the connection start time of the upstream optical switching element of the optical switch module. To the optical switch module, ranging functions are provided and the center device OLU carries out ranging of the optical switch module OSM as is the case of ranging of the remote device ONU. The center device OLU transmits the difference between roundtrip time of the remote device ONU and roundtrip time of optical switch module OSM, which is the result of these rangings, to the optical switch module OSM, and the optical switch module OSM can obtain the contact start time of the upstream optical switching element by calculating the contact start time using the difference.

40 Claims, 11 Drawing Sheets

SYNCHRONIZING METHOD IN OPTICAL ACCESS NETWORK, OPTICAL SWITCHING DEVICE, CENTER DEVICE, AND REMOTE DEVICE

BACKGROUND OF THE INVENTION

1. Field of the Invention

The present invention relates to a synchronizing method in an optical access network, an optical switching device, a center device, and a remote device.

2. Related Art

Proposed is PON (Passive Optical Network) of an optical access network without using OSM (Optical Switching device) (for example, referring to non-patent document 1). The PON is configured with a passive element being at least one optical splitter between a center (OLT) and a remote device (ONU) with a tree shape. The PON uses the passive element, however the PON does not use the optical switching device.

The technique described in the non-patent document 1 determines a relationship between a time and a period, namely the synchronizing method, between two devices of the OLT and ONU, which constitutes the PON.

Here, there is described the relationship between the center device (OLT) in cases where there is no optical switching device (OSM) and the time concerned with transmission and reception of a packet of the remote device (ONU). The OLT and the ONU have timepieces being medium for managing the time respectively. Additionally, since there is no optical switching device, it is the same case as the non-patent document 1.

FIGS. 9A and 9B exemplify a relationship of the time concerned with the transmission and reception of the packet of the OLT and ONU in cases where there is no OSM. Additionally, two horizontal lines in FIG. 9A represent the time and the period in the OLT and ONU respectively, and FIG. 9B is an illustrative view showing a GATE message and a REPORT message indicated in FIG. 9A.

The respective dots of the horizontal line of the OLT and ONU represent the time on the timepiece of the OLT, the time on the timepiece of the ONU and distance between two dots represents the period. There are represented these time and period by adding subscripts to respective "t" and "T". Further, a vertical direction represents distance, and spacing between two horizontal lines means distance between the OLT and certain one ONU.

In FIG. 9, first, the GATE message (also, referred to as "downstream control packet") is made to transmit from the OLT at the time t1 on the timepiece of the OLT.

In the GATE message, described are LLID (Logical Link ID) (Identification Number ID) of the ONU of the transmission destination, Force Report R (R=0: REPORT message (also, referred to as "upstream control packet") non-transmission, R=1: REPORT message transmission request) of Flag Field, (transmission request R of the upstream control packet), time stamp t1 (transmission time t1), grant start time t2 (transmission time t2 of the ONU), and grant length ta (transmission duration period Ta of the ONU).

For simplification-oriented presentation, hereinafter, there is indicated the ONU corresponding to the transmission destination LLID (identification number ID) of the GATE message (downstream control packet) as ONUa. In case of R=1, the ONUa sets, when having received the GATE message (downstream control packet), the time stamp t1 (transmission time t1) to the time of the timepiece of the ONUa. The ONUa transmits, when the timepiece of the ONUa indicates t2 (t2 of transmission time of the ONU) of the grant start time, the REPORT message (upstream control packet) with the length not more than Ta (Ta of transmission duration period) of the grant length. T1=t2−t1 is, in FIG. 9, determined as a system while taking into consideration of necessary period to transmit the REPORT message (upstream control packet) from the ONU has received the GATE message. Added is the time t2 on the timepiece of the ONUa as the time stamp (transmission time) in the REPORT message (upstream control packet) from the ONUa. The REPORT message transmitted from the ONUa arrives at the OLT, and its arrival time is taken to as t3 on the timepiece of the OLT.

From the process described above, the OLT calculates a round trip time RTTa between the OLT and the ONUa from RTTa=(t3−t1)−(t2−t1)=t3−t2. If there has been obtained the RTTa once, the OLT can control freely the time t3 wanted to receive from the ONU. That is, the OLT can receive the packet from the ONU at arbitrary time t3 on the timepiece of the OLT if the grant start time t2 (transmission time t2 of the ONU) written in the GATE message (downstream control packet) is taken to as t3−RTT.

If the RTTa is obtained once, it is possible to update the RTTa as the RTTa=t3'−t2, when the time of the upstream control packet received actually by the OLT is taken to as t3'. That is, the update of the RTTa is performed in every repetition of the transmission and reception of the control packet.

As found from this, it becomes important the method for obtaining the round trip time RTTa between the OLT and the ONU initially. First, there is shown explanation of the method for obtaining the RTTa, in FIG. 10.

FIG. 10 is a view showing conventional system frame, ranging window and ranging.

Generally, the OLT performs transmission control of the ONU using certain periodical frame systematically. This periodical frame is referred to as a system frame. In IEEE 802. ah of the non-patent document, the length Tf of this system frame is left to the designer of the system. At this time, the ONU before starting communication does not know the round trip time RTTa, therefore, the OLT is necessary to be considered that the ONU is distributed at the farthest position on the system design from 0 km. It is necessary to define a region with the size of Tw on the system frame when the round trip time corresponding to the ONU at the farthest position on the system design is taken to as RTTmax, length of the REPORT message using when determining the RTTa is taken to as Tg, and Tw is taken to as Tw=RTTmax+Tg. For example, if the farthest ONU from the OLT on the system design is taken to as 10 km, the round trip distance is 20 km and the Tg is little, therefore, Tw becomes about 100 μs. The range of the length Tw on the frame is referred to as ranging window, and measuring the round trip time is referred to as the ranging. When carrying out ranging initially, the ranging window may be fixed to a frame position, or it may be used variably at arbitrary position.

FIG. 10 shows an example in which fixed ranging window is placed on a position that is last position of the system frame.

First, when determining the RTTa of the ONUa, since it is unclear that the packet arrives where in the ranging window Tw, it does not cause the packet of another ONU to receive to avoid collision. The OLT issues the GATE message to the ONUa with the round trip time unclear immediately before the ranging window, the RTTa is made to determine from the REPORT message of the ONU entering into inside the ranging window Tw. If the RTTa is determined once, it is not necessary to produce the range that is inhibited to receive the packet of another ONU referred to as the ranging window, and the update of the RTTa is performed every transmission and reception described above.

However, generally, distance between the ONU and OLT, and distance between the ONU and the OSM are arbitrary, and medium for obtaining Tz cannot be given.

On the other hand, it is proposed that a tree-shaped optical network is made to configure with one optical line terminator (OLT), amplifier/splitter (AS) and plural network terminators (NT) (for instance, referring to patent document 1). Further, since medium for obtaining Tz is not given, thus connection start time of an upstream optical switching device is not given.

[Patent Document 1] Japanese Patent Application Laid-Open No. 2000-295264

[Non-patent Document] IEEE Draft P802. 3ahTM/D3.3. Draft Amendment to Carrier Sense Multiple Access with Collision Detection (CSMA/CD) access method and physical layer specifications. Apr. 19, 2004

Next, there is described relationship of the time of an optical access network in which there is an optical switching device between the OLT and ONU.

In addition, in this case, the OLT, OSM and ONU have the timepiece respectively. FIG. 11 shows an example of the relationship of the time concerned with the transmission and reception of the packet of the OLT, OSM and ONU.

In the OSM of FIG. 11, there are obtained LLID, $t1$, $t2$ and Ta from the OLT which are written in the GATE message (downstream control packet) in the direction of ONU to find the length Tp of the GATE message (downstream control packet). The timepiece of the OSM is set to the time $t1$. The time when the GATE message is transmitted to the ONU from the OSM via the downstream optical switching element with the time $t1$ as the base point is taken to as $t1+Tx$.

Here, the Tx is a known value on the design of the OSM which is determined by the time to obtain LLID, $t1$, $t2$ and Tp from the above described GATE message, and delay time Ts of the downstream optical switching element. The OSM selects an outgoing port to which the ONUa corresponding to the LLID obtained from the GATE message in the downstream optical switching element is connected, a connection start time is taken to as $t1+Tx-Ts$, a connection duration period is taken to as Tp, and the GATE message is made to transmit at the time of $t1+Tx$.

The ONUa having received the GATE message passed through the OSM sets the time of the timepiece of the ONUa to $t1$, in the case of R=1, the REPORT message is made to produce, and the REPORT message is made to transmit when the time has reached $t2$. The OSM causes the REPORT message to pass and needs to transmit it to the OLT, therefore, it is necessary to determine a connection incoming port of the upstream optical switch of the OSM, a connection start time, and connection duration period to the REPORT message. For this reason, it is necessary to cause the GATE message from the OLT to correspond to the REPORT message responded thereto from the ONU in the OSM.

That is, the arrival REPORT message at the time $t2+Tz-Ty$ corresponds to the GATE message, when a period during which the REPORT message from the ONUa gets out of the OSM is taken to as Tz, and a delay time of the upstream optical switching element is taken to as Ty, while setting the time $t2$ obtained from the GATE message with the OSM as the basis. Thus, the outgoing port of the upstream optical switching element can be selected from the LLID acquired from the GATE message, and there are obtained the connection start time with $t2+Tz-Ty$, and the connection duration period from Ta.

Meanwhile, in the technique described in the non-patent document 1 described above, Ty is the value known beforehand on the design of the OSM, $t2$ and Ta are the values obtained from the GATE message. Therefore, switching control of the upstream optical switching element in the OSM becomes possible if Tz is known. Problem is how to obtain this Tz in the OSM.

Further, the patent document 1 has not described the point of using the optical switch medium OSM.

Consequently, in order to achieve the above mentioned problem, it is an object of the present invention to provide a synchronizing method in an optical access network capable of giving a connection start time of an upstream optical switching element of an optical switching device, an optical switching device, a center device, a remote device, an optical access system, an optical access network, a program, and a recording medium.

SUMMARY OF THE INVENTION

In order to solve the above-described problem, the invention according to claim 1 provides a synchronizing method in an optical access network comprising in a tree-shaped structure one center device, a plurality of remote devices, and at least one optical switching device connected between the center device and the remote devices; the center device transmitting to the optical device a downstream control packet having written therein a transmission time thereof, and an identification number, a transmission start time and a transmission duration time of the remote device to which the downstream control packet is transmitted the optical switching device transmitting the downstream control packet to the remote device to which the control packet is transmitted the remote device to which the downstream control packet is transmitted, upon receipt of the downstream control packet, setting its own clock to the transmission time to transmit to the optical switching device an upstream control packet having written therein the transmission start time at the transmission start time; the optical switching device transmitting to the center device the upstream control packet; and the center device determining the packet transmission start time of the remote device after the receipt of the upstream control packet; characterized in that: the center device determines a round trip time respectively between the center device and the remote device to which the packet is transmitted and between the center device and the optical switching device; and the optical switching device sets its own clock to the transmission time to obtain a value of a difference in the round trip time and the information thereof, and determining a delay time from the dispatch of an instruction of a connection start to upstream optical means of the upstream optical switching device up to the time of transmitting the upstream control packet with the result that a value obtained by subtracting the delay time from a sum of the transmission start time and the difference thereof is set as a connection start time, and the connection start time is set at least to the transmission duration time.

According to the invention claimed in claim 1, the optical switching device is provided with a ranging function, and the center device performs the ranging of the optical switching device in the same manner as the ranging of the remote device. The center device transmits to the optical device a difference in the two round trip times which is the ranging result thereof; the round trip time between the center device and remote device and the round trip time between the center device and the optical switching device while the optical switching device is capable of obtaining the connection start time of the upstream optical switching element by calculating the connection start time using the difference thereof.

The invention according to claim 2 provides the synchronizing method in the optical access network according to claim 1, wherein an identification numbers ID of the remote device to which the control packet is transmitted and a transmission request R (R=1; request, R=0; non-request) of the upstream control packet are written in the downstream control packet which is transmitted from the center device with the result that the center device sets the request R to 1 at the transmission time $t_1$ on its own clock to transmit the downstream control packet.

According to the invention claimed in claim 2, the identification number ID of the remote device to which the control packet is transmitted and the transmission request R of the upstream control packet are used with the result that the start time of the upstream optical switching element of the optical switching device can be accurately given while the ranging can be performed.

The invention according to claim 3 provides a synchronizing method in an optical access network comprising in a tree-shaped structure one center device, a plurality of remote devices, and at least one optical switching device connected between the center device and the remote devices; the center device writing in the downstream control packet a transmission time $t_1$ of the downstream control packet, an identification number and a transmission start time $t_2$ of the remote device to which the downstream control packet is transmitted, and a transmission duration time Ta of the remote device to which the downstream control packet is transmitted to transmit at the transmission time $t_1$ on its own clock the downstream control packet to the remote device to which the packet is transmitted the remote device to which the packet is transmitted, upon receipt of the downstream control packet, setting the transmission time $t_1$ as the time on its own clock to transmit only in the transmission duration time Ta the upstream control packet having written therein the transmission start time $t_2$ at the transmission start time $t_2$ on its own clock; and the center device setting to $t_3$ on its own clock the time at which the upstream control packet is received, and obtaining the transmission start time $t_2$ written in the upstream control packet which has been received with the result that the center device determines as $RTTa = t_3 - t_2$ the round trip time RTTa between the center device and the remote device to which the control packet is transmitted, and sets to $t_3 - RTTa$ the transmission start time $t_2$ to be written in the downstream control packet when the desired time is set to $t_3$ at which time the packet is received from the remote device to which the control packet is transmitted after RTTa has been determined; characterized in that: the optical switching device obtains from the downstream control packet the transmission time $t_1$, the identification number, the transmission start time $t_2$, the transmission duration time Ta, and the packet length of the downstream control packet, sets the time on its own clock to the transmission time $t_1$ and uses the outgoing port of the downstream optical switching means as a port corresponding to the identification number to be connected only in the downstream control packet length Ta, so that the arrival time of the upstream control packet from the remote device to which the control packet is transmitted is measured at the outgoing port of the upstream optical switching means, the delay time is determined which extends from the incoming port of the upstream optical switching means up to a point of measuring the delay time, the other delay time is set to (the arrival time−the transmission start time $t_2$), the connection start time of the upstream optical switching means of the optical switching means is set to (the transmission start time $t_2$+the other delay time−the delay time), and the connection duration time is set to at least the transmission duration time Ta.

According to the invention claimed in claim 3, the center device detects a GATE message corresponding to a first ranging with respect to the remote device to connect the upstream optical switching element after the GATE message has been detected, and detects the arrival time of the REPORT message thereof at the outgoing port of the upstream optical switching element with respect to the REPORT message from the remote device corresponding to this GATE message to determine a difference between the transmission start time of the remote device which is written in the GATE message and the arrival time thereof thereby enabling obtaining a start time of the upstream optical switching element by calculating a connection start time using the difference thereof.

The invention claimed in claim 4 provides the synchronizing method in an optical access network according to claim 3, wherein an identification numbers ID of the remote device to which the control packet is transmitted and a transmission request R (R=1; request, R=0; non-request) of the upstream control packet are written in the downstream control packet which is transmitted from the center device with the result that the center device sets the request R to 1 at the transmission time $t_1$ on its own clock to transmit the downstream control packet.

According to the invention claimed in claim 4, the identification number ID of the remote device to which the control packet is transmitted and the transmission request R of the upstream control packet are used with the result that the start time of the upstream optical switching element of the optical switching device can be accurately given while the ranging can be performed.

The invention claimed in claim 5 provides a synchronizing method in an optical access network comprising in a tree-shaped structure one center device, a plurality of remote devices, and at least one optical switching device connected between the center device and the remote devices; the center device transmitting to the optical device a downstream control packet having written therein a transmission time thereof, an identification number a transmission start time and a transmission duration time of the remote device to which the control packet is transmitted the optical switching device transmitting the downstream control packet to the remote device to which the control packet is transmitted the remote device to which the downstream control packet is transmitted, upon receipt of the downstream control packet, setting its own clock to the transmission time to transmit to the optical switching device an upstream control packet having written therein the transmission start time at the transmission start time; the optical switching device transmitting to the center device the upstream control packet; and the center device determining the packet transmission start time of the remote device after the receipt of the upstream control packet; characterized in that: the optical switching device obtains from the downstream control packet the transmission time, the identification number, the transmission start time, the transmission duration time, and the packet length of the downstream control packet to set the time on its own clock to the transmission time, the incoming port of the outgoing port connected in time not less than the packet length of the control packet to the remote device to which the control packet is transmitted and which corresponds to the identification number are connected to the downstream optical switching means with the result that the arrival time of the upstream packet from the remote device to which the control packet is transmitted is set to the arrival time measured on its own clock to determine the other delay time by subtracting the transmission start time from the arrival time, the port connected to the remote device to which the control packet is transmitted is used as the own incoming port of the upstream switching means, the connection start time is set to the sum of the transmission start time and the other delay time, and the connection duration time is set to at least the transmission duration time.

According to the invention claimed in claim 5, a difference is determined which between the time written in the GATE message and the arrival time of the packet from the remote device corresponding to the GATE message at the incoming port of the upstream optical switching element, and the delay time of the optical switching element thereby enabling obtaining a start time of the upstream optical switching element by calculating the connection start time using the delay time.

The invention according to claim 6 provides the synchronizing method according to claim 5, wherein an identification numbers ID of the remote device to which the control packet is transmitted and a transmission request R (R=1; request, R=0; non-request) of the upstream control packet are written in the downstream control packet which is transmitted from the center device with the result that the center device sets the request R to 1 at the transmission time t1 on its own clock to transmit the downstream control packet.

According to the invention claimed in claim 6, the identification number ID of the remote device to which the control packet is transmitted and the transmission request R of the upstream control packet are used so that the start time of the upstream optical switching element in the optical switching device is accurately given while ranging can be performed.

The invention according to claims 7-9, the GATE message defined in MPCP of IEEE 802.3ah is set as the downstream control packet and the REPORT message is used as the upstream control packet.

According to the invention claimed in claims 7-9, the connection start time of the upstream optical switching element in the optical switching device can be given.

The invention according to claim 10 provides the synchronizing method in the optical access network wherein the center device determines the round trip time RTTs between the center device and the optical switching device to determine at first the round trip time RTTa between the center device and the remote device to which the control packet is transmitted the center device sets a size W of the time area for receiving the upstream control packet from the remote device to which the control packet is transmitted is set to W=Tw−RTTs in the case where a round trip time of the remote device which is most remote in design is set to RTTmax, a length of the upstream control packet is set to Tq, and Tw=RTTmax+Tq is set while the start time of the time area is set to time (t1*+RTTs) wherein RTTs is added to time t1* at which the center device has completed the transmission of the control packet.

According to the invention claimed in claim 10, the identification number ID of the remote device to which the control packet is transmitted and the transmission request R of the upstream control packet are used with the result that the start time of the upstream optical switching element of the optical switching device can be accurately given while the ranging can be performed.

The invention according to claim 11 provides an optical switching device which is used in an optical access network comprising in a tree-shaped structure one center device, a plurality of remote devices, and at least one optical switching device between the center device and the remote device; the center device writing in the downstream control packet a transmission time thereof, and an identification number, a transmission time and a transmission duration time of the remote device to which the control packet is transmitted or the optical switching device to transmit the downstream control packet the remote device or the optical switching device which has received the downstream control packet setting its own clock to the transmission time to transmit at the transmission start time on its own clock the upstream control packet having written therein the transmission start time at the transmission start time on its own clock; and the center device determining from the time on its own clock and the transmission start time of the upstream packet a round trip time between the center device and the remote device to which the control packet is transmitted and a round trip time between the center device and the optical switching device respectively; the optical switching device comprising: first branching and synthesizing means for branching and synthesizing a wave-length of a downstream optical signal and a wave-length of an upstream optical signal which are transmitted with an optical fiber connected to a side of the center device; n second branching and synthesizing means for branching and synthesizing a wave-length of a downstream optical signal and a wave-length of an upstream optical signal which are transmitted with at most n optical fibers connected to a side of the remote device; first branching means for branching into two the downstream optical signal obtained by branching the wave-length from the side of the center device with the first branching and synthesizing means; delay means for giving a delay to one downstream optical signal out of the two downstream optical signals which are branched with the first delay means; downstream optical switching means for switching the downstream optical signal from the delay means having n outgoing ports and one incoming port for switching the downstream optical signal from the delay means; upstream optical switching means for synthesizing a wave-length of the downstream optical signal from n outgoing ports from the downstream optical switching means, the means having one outgoing port and n incoming port for switching the upstream optical signal which has been branched in the wave-length from at most n remote devices with the second synthesizing means; control means for giving the outgoing port of the downstream optical switching means and the connection duration time with the identification number of the downstream packet and the length of the downstream packet, and giving the connection start time of the downstream optical switching means from the arrival time information of the upstream packet with the result that the incoming port of the upstream optical switching means, the connection start time and the connection duration time are determined from the identification number, the difference in the round trip time between the center device and the remote device and the round trip time between the center device and the optical switching device, the transmission time of the remote device and the transmission duration time of the remote device to dispatch a connection instruction to connect the upstream optical switching means and the incoming port upon the arrival of the connection start time; the means obtaining the value of the difference in the two round trip times and the information and determining a delay time which extends from the dispatch of the connection start instruction to the upstream optical switching means with the result that the connection start time is set to a value obtained by subtracting the delay time from the sum of the transmission start time and the difference, and the connection duration time is set to at least the transmission duration time to be given to the optical switching means; And an outgoing port of the second branching means or of the upstream optical switching means; the second branching means connecting the optical signal from the upstream optical switching means and an optical signal from the control means; the upstream optical switching means receiving the optical signal from the control means.

According to the invention claimed in claim 11, the optical switching device is provided with a ranging function, and the center device performs the ranging of the optical switching device in the same manner as the ranging of the remote device. The center device transmits to the optical device a difference in the two round trip times which is the ranging result thereof; the round trip time between the center device and remote device and the round trip time between the center device and the optical switching device while the optical switching device is capable of obtaining the connection start time of the upstream optical switching element by calculating the connection start time using the difference thereof.

The invention according to claim 12 provides the optical switching device according to claim 11, wherein the control means comprises: first conversion means for converting to an electric signal the other downstream optical signal out of two downstream optical signals which are branched with the first branching means; extraction means for extracting a downstream packet from the electric signal from the extraction means; analyzing means for analyzing the content of the downstream packet from the extraction means; time management means for setting the transmission time obtained with the analyzing means; calculation means for calculating the arrival time of the downstream packet from the time from the time management means and the downstream packet with the information obtained with the extraction means; downstream switch control means for giving the connection start time and the outgoing port of the downstream optical switching means from the identification number obtained with the analyzing means and the length of the downstream packet and for giving the connection start time of the downstream optical switching means; generation means for generating with an instruction from the analyzing means the identification number of the optical switching means of the optical switching means and the upstream control packet having written therein the transmission start time obtained with the analyzing means; transmission means for transmitting at the transmission start time with the time management means the upstream control packet from the generation means; and second conversion means for converting to an electric signal the transmission start time from the transmission means; wherein the value of the difference in the two round trip times and the transmission start time are obtained, a delay time is determined which extends from the dispatch of the connection start instruction to the upstream optical switching means up to the time of transmitting the upstream control packet, and the connection start time is set to a value obtained by subtracting the delay time from the sum of the transmission start time and the value of the difference to set the connection duration time to at least the transmission duration time.

According to the invention claimed in claim 12, the optical switching device is provided with a ranging function, and the center device performs the ranging of the optical switching device in the same manner as the ranging of the remote device. The center device transmits to the optical device a difference in the two round trip times which is the ranging result thereof; the round trip time between the center device and remote device and the round trip time between the center device and the optical switching device while the optical switching device is capable of obtaining the connection start time of the upstream optical switching element by calculating the connection start time using the difference thereof.

The invention according to claim 13 provides the optical switching device according to claim 11, wherein an identification numbers ID of the remote device to which the control packet is transmitted and a transmission request R (R=1; request, R=0; non-request) of the upstream control packet are written in the downstream control packet which is transmitted from the center device with the result that the center device sets the request R to 1 at the transmission time t1 on its own clock to transmit the downstream control packet.

According to the invention claimed in claim 13, the identification number ID of the remote device to which the control packet is transmitted and the transmission request R of the upstream control packet are used with the result that the start time of the upstream optical switching element of the optical switching device can be accurately given while the ranging can be performed.

The invention according to claim 14 provides an optical switching device used in an optical access network comprising in a tree-shaped structure one center device, a plurality of remote devices, and at least one optical switching device between the center device and the remote device; the center device writing in the downstream control packet a transmission time thereof, and an identification number, a transmission start time and a transmission duration time of the remote device to which the control packet is transmitted to transmit the downstream control packet and receives the downstream control packet to set its own clock to the transmission time; the remote device setting its own clock to the transmission time to transmit the upstream control packet having written therein the transmission start time at the transmission start time on its own clock; and the center device to determine a round trip time between the center device and the remote device to which the control packet is transmitted respectively from the time on its own clock and the transmission start time of the transmission start time; the optical switching device comprising: first branching and synthesizing means for branching and synthesizing a wave-length of a downstream optical signal and a wave-length of an upstream optical signal which are transmitted with an optical fiber connected to a side of the center device; n second branching and synthesizing means for branching and synthesizing a wave-length of a downstream optical signal and a wave-length of an upstream optical signal which are transmitted with at most n optical fibers connected to a side of the remote device; first branching means for branching into two the downstream optical signal obtained by branching the wave-length from the side of the center device with the first branching and synthesizing means; delay means for giving a delay to one downstream optical signal out of the two downstream optical signals which are branched with the first delay means; downstream optical switching means for switching the downstream optical signal from the delay means having n outgoing ports and one incoming port for switching the downstream optical signal from the delay means; upstream optical switching means for synthesizing a wave-length of the downstream optical signal from n outgoing ports from the downstream optical switching means, the means having one outgoing port and n incoming port for switching the upstream optical signal which has been branched in the wave-length from at most n remote devices with the second synthesizing means; second branching means for branching an upstream optical signal from the optical switching means; and control means for obtaining a packet length of the control packet and obtaining a transmission time t1 at the center device written in the control, the upstream packet transmission start time t2 of the remote device to which the control packet is transmitted and the packet transmitting duration time Ta of the remote device to which the control packet is transmitted with the result that the downstream optical switching means the outgoing port of the downstream optical switching means, the connection start time and the connection duration time is given with the information and the upstream optical switching means to the downstream optical switching means, and the connection incoming port information of the upstream optical switching means, the connection start time and the connection duration time are given to the upstream optical switching means.

According to the invention claimed in claim 14, the center device detects a GATE message corresponding to a first ranging with respect to the remote device to connect the upstream optical switching element after the GATE message has been detected, and detects the arrival time t3 of the REPORT message thereof at the outgoing port of the upstream optical switching element with respect to the REPORT message from the remote device corresponding to this GATE message to determine a difference Tz (=t3−t2) between the time t2 written in the GATE message and the arrival time t3 thereby enabling obtaining a start time of the upstream optical switching element by calculating a connection start time using the difference Tz thereof.

The invention according to claim 15 provides the optical switching device according to claim 14, wherein the control means comprises: first conversion means for synthesizing with the first branching and synthesizing means a wave-length of one upstream optical signal out of two upstream optical signals branched with the second branching means to convert to an electric signal the other downstream optical signal out of two downstream optical signals branched with the first branching means; first extraction means for extracting the downstream packet from the electric signal from the first conversion means; first calculation means for calculating the arrival time of the downstream control packet with information from the first extraction means and the management means; analyzing means for obtaining a downstream packet length Tp from the extraction means and for obtaining the transmission time t1 at the center device, the identification number of the remote device to which the control packet is transmitted the upstream packet transmission start time t2 of the remote device to which the control packet is transmitted, and the packet transmitting duration time Ta of the remote device to which the control packet is transmitted in the case where the downstream packet is the downstream control packet; downstream switch control means for giving the outgoing port of the downstream optical switching means, the connection duration time, and the connection start time with the identification number of the remote device to which the control packet is transmitted from the analyzing means and with the packet length and the information from the calculation means; management means for managing time on the basis of the transmission time t1 added to the downstream control packet obtained with the analyzing means; second conversion means for converting to an electric signal another upstream optical signal out of two upstream optical signals branched with the second branching means; second extraction means for extracting the upstream control packet from the electric signal from the second conversion means; second calculation means for calculating the arrival time of the upstream control packet with information from the second extraction means and the management means; and upstream optical switching control means for determining the incoming port of the upstream optical switching means and the connection duration from the analyzing means, further receiving the time from the management means to give to the optical switching means the incoming port the connection start time and the connection duration time.

According to the invention according to claim 15, the center device detects a GATE message corresponding to a first ranging with respect to the remote device to connect the upstream optical switching element after the GATE message has been detected, and detects the arrival time of the REPORT message thereof at the outgoing port of the upstream optical switching element with respect to the REPORT message from the remote device corresponding to this GATE message to determine a difference between the transmission start time of the remote device which is written in the GATE message and the arrival time thereof thereby enabling obtaining a start time of the upstream optical switching element by calculating a connection start time using the difference thereof.

The invention according to claim 16 provides the optical switching device according to claim 14, wherein an identification numbers ID of the remote device to which the control packet is transmitted and a transmission request R (R=1; request, R=0; non-request) of the upstream control packet are written in the downstream control packet which is transmitted from the center device with the result that the center device sets the request R to 1 at the transmission time t1 on its own clock to transmit the downstream control packet.

According to the invention claimed in claim 16, the identification number ID of the remote device to which the control packet is transmitted and the transmission request R of the upstream control packet are used with the result that the start time of the upstream optical switching element of the optical switching device can be accurately given while the ranging can be performed.

The invention according to claim 17 provides an optical switching device used in an optical access network comprising in a tree-shaped structure one center device, a plurality of remote devices, and at least one optical switching device between the center device and the remote device; the center device writing in the downstream control packet a transmission time thereof, and an identification number, a transmission time, a transmission start time and a transmission duration time of the remote device to which the control packet is transmitted or the optical switching device to transmit the downstream control packet the remote device or the optical switching device which has received the downstream control packet setting its own clock to the transmission time, and transmitting at the transmission start time on its own clock the upstream control packet having the transmission start time written therein; the center device determining from the time on its own clock and the transmission start time of the upstream packet a round trip time between the center device and the remote device to which the control packet is transmitted: the optical switching device comprising: first branching and synthesizing means for branching and synthesizing a wave-length of a downstream optical signal and a wave-length of an upstream optical signal which are transmitted with an optical fiber connected to a side of the center device; n second branching and synthesizing means for branching and synthesizing a wave-length of a downstream optical signal and a wave-length of an upstream optical signal which are transmitted with at most n optical fibers connected to a side of the remote device; first branching means for branching into two the downstream optical signal obtained by branching the wave-length from the side of the center device with the first branching and synthesizing means; first delay means for giving a delay to one downstream optical signal out of the two downstream optical signals which are branched with the first delay means; downstream optical switching means for switching the downstream optical signal from the delay means having n outgoing ports and one incoming port for switching the downstream optical signal from the delay means; second branching means for synthesizing with the n second branching and synthesizing means the wave-length of the downstream optical signal from n outgoing ports from the downstream optical switching means and for branching into two the upstream optical signal in which the wave-length from the at most n remote devices is branched with the second synthesizing and branching means; second delay means for delaying the downstream optical signal from the second delay means; and control means for obtaining, in the case where the downstream packet is the downstream control packet the transmission time t1 at the center device, the upstream packet transmission start time t2 of the remote device to which the control packet is transmitted, and obtaining the packet transmitting duration time Ta of the remote device to which the control packet is transmitted; means setting the time t1 to the time on its own clock, selecting an outgoing port connected to the remote device to which the control packet is transmitted out of the outgoing ports of n downstream optical switching means having one own incoming port and n own outgoing ports to connect the selected outgoing port and the incoming port in time not less than the time Tp and transmit the downstream control packet at time t1+Ty1 on its own clock thereby measuring on its own clock the arrival time of the upstream packet from the remote device to which the control packet is transmitted at the incoming port of its own upstream optical switching means with respect to the upstream packet from the remote device to which the control packet is transmitted and which device has received the downstream control packet with the result that the arrival time t3 is set to time t3* on its own clock the other delay time Tz*=t3*−t2 is determined, a port connected to the remote device to which the control packet is transmitted is set as an incoming port of the upstream switching means of its own; the connection start time being set to Tz*+t2, a port connected to the remote device to which the control packet is transmitted is used at the incoming port of the own upstream switching means, the connection start time is set to Tz*+t2, an instruction of connection between the incoming port and the connection duration time is dispatched to the upstream optical switching means upon the arrival of the connection time on its own clock thereby giving the outgoing port of the downstream optical switching means, the connection start time and the connection duration time.

According to the invention claimed in claim 17, a difference is determined between a delay time of the optical switching element and the time t2 written in the GATE message and the arrival time t3 of the packet from the remote device corresponding to the GATE message at the incoming port of the upstream optical switching element thereby enabling obtaining a connection start time of the upstream optical switching element by calculating the connection start time using the delay time.

The invention according to claim 18 provides the optical switching device according to claim 17, wherein the control means comprises: first conversion means for synthesizing a wave-length of the upstream optical signal from the optical switching means with the first branching and synthesizing means to convert to an electric signal the other downstream optical signal out of two downstream optical signals branched with the first branching means; first extraction means for extracting the downstream packet from the electric signal from the first conversion means; analyzing means for obtaining the downstream packet length Tp from the extraction means and obtaining, in the case where the downstream packet is the downstream control packet the identification number of the remote device to which the control packet is transmitted the transmission time t1 at the center device, the transmission start time t2, and the packet transmitting duration time Ta; management means for managing time on the basis of the transmission time t1 added to the downstream control packet obtained at the analyzing means; first calculation means for calculating the arrival time of the downstream packet from the information from the extraction means and the management means; binding means having one output and n inputs for binding the other upstream optical signal out of two upstream optical signals branched with the second branching means; second conversion means for converting to an electric signal the upstream optical signal from the binding means; second extraction means for extracting the packet from the electric signal from the second conversion means; second calculation means for calculating the arrival time of the upstream packet from the information from the extraction means and the management means; upstream switch control means for determining the connection start time of the upstream optical switching means from the information from the second calculation means and the analyzing means and receiving the connection incoming port and the connection duration time from the analyzing means thereby dispatching a connection instruction of the incoming port and the connection duration time to the upstream optical switching means upon the arrival of the connection start time at time from the management means; and downstream switch control means for giving to the downstream optical switching means the outgoing port of the downstream optical switching means, the connection start time and the connection duration time with the information from the analyzing means, the first calculation means and the management means.

According to the invention claimed in claim 18, a difference is determined between a delay time of the optical switching element and the time t2 written in the GATE message and the arrival time t3 of the packet from the remote device corresponding to the GATE message at the incoming port of the upstream optical switching element thereby enabling obtaining a connection start time of the upstream optical switching element by calculating the connection start time using the delay time.

The invention according to claim 19 provides an optical switching device used in an optical access network comprising in a tree-shaped structure one center device, a plurality of remote devices, and at least one optical switching device between the center device and the remote device; the center device writing in the downstream control packet a transmission time thereof, and an identification number, a transmission start time and a transmission duration time of the remote device to which the control packet is transmitted or the optical switching device to transmit the downstream control packet the remote device or the optical switching device which has received the downstream control packet setting its own clock to the transmission time, and transmitting at the transmission start time on its own clock the upstream control packet having the transmission start time written therein; and the center device determining from the time on its own clock and the transmission start time of the upstream packet a round trip time between the center device and the remote device to which the control packet is transmitted and the center device and the optical switching device respectively: the optical switching device comprising: first branching and synthesizing means for branching and synthesizing a wave-length of a downstream optical signal and a wave-length of an upstream optical signal which are transmitted with an optical fiber connected to a side of the center device; n second branching and synthesizing means for branching and synthesizing a wave-length of a downstream optical signal and a wave-length of an upstream optical signal which are transmitted with at most n optical fibers connected to a side of the remote device; first branching means for branching into two a downstream optical signal obtained by branching the wave-length from the side of the center device with the first branching and synthesizing means; first delay means for giving a delay to one downstream optical signal out of the two downstream optical signals which are branched with the first delay means; downstream optical switching means for switching the downstream optical signal from the delay means, the means having one incoming port and n outgoing ports; n second delay means for synthesizing with the n second branching and synthesizing means the wave-length of the downstream optical signal from n outgoing ports from the downstream optical switching means and branching into two the upstream optical signal by branching the wave-length from at most n remote devices with the n branching and synthesizing means; second delay means for delaying one optical signal out of the two downstream optical signals from the second branching means; upstream optical switching means for switching the downstream optical signal from the second delay means; the means having n incoming ports and one outgoing port; and control means for obtaining, in the case where the downstream packet is the downstream control packet the transmission time t1 at the center device, the upstream packet transmission start time t2 of the remote device to which the control packet is transmitted, and obtaining the packet transmitting duration time Ta of the remote device to which the control packet is transmitted; means setting the time t1 to the time on its own clock, selecting an outgoing port connected to the remote device to which the control packet is transmitted out of the outgoing ports of n downstream optical switching means having one own incoming port and n own outgoing ports to connect the selected outgoing port and the incoming port in time not less than the time Tp and transmit the downstream control packet at time t1+Ty1 on its own clock thereby measuring on its own clock the arrival time of the upstream packet from the remote device to which the control packet is transmitted at the incoming port of its own upstream optical switching means with respect to the upstream packet from the remote device to which the control packet is transmitted and which device has received the downstream control packet with the result that the arrival time t3 is set to time t3* on its own clock the other delay time Tz*=t3*−t2 is determined, a port connected to the remote device to which the control packet is transmitted is set as an incoming port of the upstream switching means of its own; the connection start time being set to Tz*+t2, a port connected to the remote device to which the control packet is transmitted is used at the incoming port of the own upstream switching means, the connection start time is set to Tz*+t2, an instruction of connection between the incoming port and the connection duration time is dispatched to the upstream optical switching means upon the arrival of the connection time on its own clock thereby giving the outgoing port of the downstream optical switching means, the connection start time and the connection duration time.

According to the invention claimed in claim 19, a difference is determined between a delay time of the optical switching element and the time t2 written in the GATE message and the arrival time t3 of the packet from the remote device corresponding to the GATE message at the incoming port of the upstream optical switching element thereby enabling obtaining a connection start time of the upstream optical switching element by calculating the connection start time using the delay time.

The invention according to claim 20 provides the optical switching device according to claim 19, wherein the control means comprises: first conversion means for synthesizing a wave-length of the upstream optical signal from the optical switching means with the first branching and synthesizing means to convert to an electric signal the other downstream optical signal out of two downstream optical signals branched with the first branching means; first extraction means for extracting the downstream packet from the electric signal from the first conversion means; analyzing means for obtaining a length Tp of the downstream control packet from the extraction means and obtaining the transmission time t1 of the downstream control packet at the center device, the identification number of the remote device to which the control packet is transmitted the transmission start time t2, and the packet transmitting duration time Ta in the case where the downstream packet is the downstream control packet; management means for managing time on the basis of the transmission time t1 added to the downstream control packet obtained at the analyzing means; first calculation means for calculating the arrival time of the downstream packet from the first extraction means and the management means; downstream switch control means for receiving the time of the management means to give to the downstream optical switching means the outgoing port of the downstream optical switching means, the connection start time, and the connection duration time with the identification number from the analyzing means and the downstream packet length Tp; n second conversion means for converting to an electric signal the other upstream optical signal out of two optical signal branched with the second branching means; second extraction means for extracting a packet from the electric signal from the n second conversion means; second calculation means for calculating the arrival time of the upstream packet with the information from the second calculation means and the management means; and upstream switch control means for determining the connection start time of the upstream optical switching means with the information from the second calculation means and the management means and receiving from the analyzing means the connection incoming port information and the connection duration time of the upstream optical switching means to dispatch to the upstream switching means the incoming port and the connection instruction of the connection duration time upon the arrival of the connection start time.

According to the invention claimed in claim 20, a difference is determined between a delay time of the optical switching element and the time t2 written in the GATE message and the arrival time t3 of the packet from the remote device corresponding to the GATE message at the incoming port of the upstream optical switching element thereby enabling obtaining a connection start time of the upstream optical switching element by calculating the connection start time using the delay time.

The invention according to claim 21 provides the optical switching device according to claim 19, wherein an identification numbers ID of the remote device to which the control packet is transmitted and a transmission request R (R=1; request, R=0; non-request) of the upstream control packet are written in the downstream control packet which is transmitted from the center device with the result that the center device sets the request R to 1 at the transmission time t1 on its own clock to transmit the downstream control packet.

According to the invention claimed in claim 21, the identification number ID of the remote device to which the control packet is transmitted and the transmission request R of the upstream control packet are used with the result that the start time of the upstream optical switching element of the optical switching device can be accurately given while the ranging can be performed.

The invention claimed in claims 22-25 provides the optical switching device, wherein the GATE message defined in MPCP of IEEE 802.3ah is set as the downstream control packet and the REPORT message is used as the upstream control packet.

According to this feature, the start time of the upstream optical switching element of the optical switching device can be performed.

The invention claimed in claim 26 provides the optical switching device, wherein in the case where the center device determines the round trip time RTTs between the center device and the optical switching device to determine at first the round trip time RTTa between the center device and the remote device to which the control packet is transmitted the center device sets to W=Tw−RTTs a size W of the time area for receiving the upstream control packet from the remote device to which the control packet is transmitted when the round trip time of the remote device most remote in design is set to RTTmax, a length of the upstream control packet is set to Tq, and Tw=RTTmax+Tq is set whereas the start time of the time area is set to time (t1*+RTTs) obtained by adding RTTs to the time t1* at which the center device has completed the transmission of the control packet.

According to the invention claimed in claim 26, the identification number ID of the remote device to which the control packet is transmitted and the transmission request R of the upstream control packet are used with the result that the start time of the upstream optical switching element of the optical switching device can be accurately given while the ranging can be performed.

The invention according to claim 27 provides a center device in an optical access network comprising in a tree-shaped structure one center device, a plurality of remote devices, and at least one optical switching device connected between the center device and the remote device; wherein the center device writes in the downstream control packet the transmission time t1 of the downstream control packet the identification number of the remote device to which the control packet is transmitted the transmission start time t2 of the remote device to which the control packet is transmitted, and the transmission duration time Ta of the remote device to which the control packet is transmitted to transmit at the transmission time t1 on its own clock the downstream control packet to the optical switching device; the center device setting to t3 on its own clock the time at which the upstream control packet has been received from the remote device to which the control packet is transmitted thereby obtaining the time t2 written in the received upstream optical control packet; the center device determines as RTTa=t3−t2 the round trip time between the center device and the remote device to which the control packet is transmitted; and the center device, when the time which is desired to be received from the remote device to which the control packet is transmitted is set to t3 on its own clock, sets to t3−RTTa the transmission start time t2 written in the downstream control packet, and determines the round trip time RTTs between the center device and the optical switching device to which the control packet is transmitted by means of the method for determining the round trip time RTTa between the center device and the remote device to which the control packet is transmitted thereby transmitting the values of RTTa and RTTs to the optical switching device.

According to the invention claimed in claim 27, the optical switching device is provided with a ranging function, and the center device performs the ranging of the optical switching device in the same manner as the ranging of the remote device. The center device transmits to the optical device a difference in the two round trip times which is the ranging result thereof; the round trip time between the center device and remote device and the round trip time between the center device and the optical switching device while the optical switching device is capable of obtaining the connection start time of the upstream optical switching element by calculating the connection start time using the difference thereof.

The invention according to claim 28 provides the center device according to claim 27, wherein the GATE message defined in MPCP of IEEE 802.3ah is set as the downstream control packet and the REPORT message is used as the upstream control packet.

According to the invention claimed in claim 28, the start time of the upstream optical switching element of the optical switching device can be given.

The invention according to claim 29 provides the center device according to claim 27, wherein in the case where the center device determines the round trip time RTTs between the center device and the optical switching device to determine at first the round trip time RTTa between the center device and the remote device to which the control packet is transmitted the center device sets to W=Tw−RTTs a size W of the time area for receiving the upstream control packet from the remote device to which the control packet is transmitted when the round trip time of the remote device most remote in design is set to RTTmax, a length of the upstream control packet is set to Tq, and Tw=RTTmax+Tq is set whereas the start time of the time area is set to time (t1*+RTTs) obtained by adding RTTs to the time t1* at which the center device has completed the transmission of the control packet.

According to the invention claimed in claim 29, the center device detects a GATE message corresponding to a first ranging with respect to the remote device to connect the upstream optical switching element after the GATE message has been detected, and detects the arrival time of the REPORT message thereof at the outgoing port of the upstream optical switching element with respect to the REPORT message from the remote device corresponding to this GATE message to determine a difference between the transmission start time of the remote device which is written in the GATE message and the arrival time thereof thereby enabling obtaining a start time of the upstream optical switching element by calculating a connection start time using the difference thereof.

The invention according to claim 30 provides a remote device in an optical access network comprising one center device, a plurality of remote devices, and at least one optical switching device connected between the center device and the remote device; wherein the remote device sets as the time on its own clock the transmission time t1 of the downstream control packet upon receipt of the downstream control packet which is transmitted from the center device, and transmits only in its own transmission duration time the upstream control packet having written therein the transmission start time t2 on its own clock. According to the invention claimed in claim 31, the optical switching device is provided with a ranging function, and the center device performs the ranging of the optical switching device in the same manner as the ranging of the remote device. The center device transmits to the optical device a difference in the two round trip times which is the ranging result thereof; the round trip time between the center device and remote device and the round trip time between the center device and the optical switching device while the optical switching device is capable of obtaining the connection start time of the upstream optical switching element by calculating the connection start time using the difference thereof.

The invention according to claim 31 provides the remote device according to claim 30, wherein the GATE message defined in MPCP of IEEE 802.3ah is set as the downstream control packet and the REPORT message is used as the upstream control packet.

According to the invention according to claim 31, the start time of the optical switching element of the optical switching device can be given.

The invention according to claim 32 provides the remote device according to claim 31; wherein in the case where the center device determines the round trip time RTTs between the center device and the optical switching device to determine at first the round trip time RTTa between the center device and the remote device to which the control packet is transmitted the center device sets to W=Tw−RTTs a size W of the time area for receiving the upstream control packet from the remote device to which the control packet is transmitted when the round trip time of the remote device most remote in design is set to RTTmax, a length of the upstream control packet is set to Tq, and Tw=RTTmax+Tq is set whereas the start time of the time area is set to time (t1*+RTTs) obtained by adding RTTs to the time t1* at which the center device has completed the transmission of the control packet.

According to the invention claimed in claim 32, the center device detects a GATE message corresponding to a first ranging with respect to the remote device to connect the upstream optical switching element after the GATE message has been detected, and detects the arrival time t3 of the REPORT message thereof at the outgoing port of the upstream optical switching element with respect to the REPORT message from the remote device corresponding to this GATE message to determine a difference Tz (=t3−t2) between the time t2 written in the GATE message and the arrival time t3 thereby enabling obtaining a start time of the upstream optical switching element by calculating a connection start time using the difference Tz thereof.

The invention according to claim 33 provides an optical access system comprising one center device, a plurality of remote devices and at least one optical switching device, the one center device and the plurality of remote devices being connected in a tree-shaped structure with the at least one optical switching device; the optical switching device transmitting to the optical switching device the downstream control packet having written therein the transmission time thereof, and an identification number, a transmission start time and a transmission duration time; of the remote device to which the control packet is transmitted; the optical switching device transmitting to the remote device to which the control packet is transmitted the downstream control packet; the remote device to which the control packet is transmitted, upon receipt of the downstream control packet, setting its own clock to the transmission time to transmit to the optical switching device the upstream control packet having written therein the transmission start time at the transmission start time; the optical switching device transmitting to the center device the upstream control packet; the center device determining the transmission start time of the remote device to which the control packet is transmitted after the upstream control packet has been received; characterized in that: the center device determines respectively a round trip time between the center device and the remote device to which the control packet is transmitted and a round trip time between the center device and the optical switching device; the optical switching device sets its own clock to the transmission time, obtains a value of the difference in the two round trip times and the information, and determines the delay time from the dispatch of the connection start instruction to the upstream optical switching means of the optical switching device up to the time of transmission of the upstream control packet with the result that the value obtained by subtracting the delay time from the sum of the transmission start time and the difference is set to the connection start time and the connection duration time is set to at least the transmission duration time.

In another aspect of the present invention, if the optical switching devices are given in the number of n (n is an integer number of 2 or more) or more, the optical switching devices are replaced with optical splitters in any number of (n−1) or less.

According to this aspect of the present invention, the cost of the invention can be decreased by using the optical splitters.

In accordance with the present invention, the optical switching device is provided with a ranging function, and the center device performs ranging of the optical switching device in the same manner as the ranging of the remote devices. The center device transmits to the optical device a difference between the two round trip times which is a ranging result thereof: the round trip time between the center device and the remote device and the round trip time between the center device and the optical switching device thereby enabling obtaining the connection start time of the upstream optical switching element by calculating the connection start time using the difference thereof.

BEST MODE FOR CARRYING OUT THE INVENTION

Features

Figure 1:
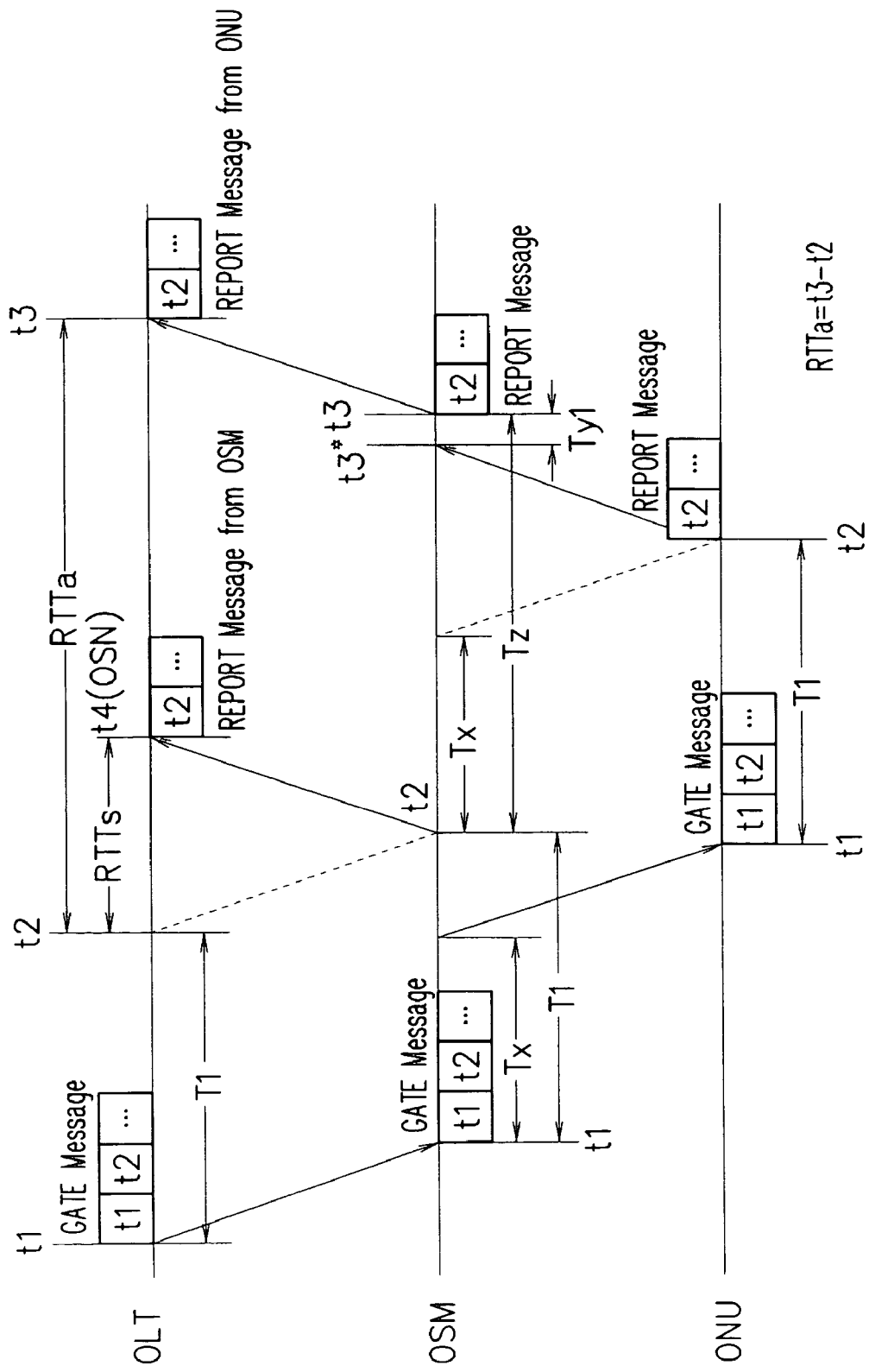
FIG. 1 is an illustration for explaining the first embodiment according to the present invention.

Firstly, a ranging function is also provided for OSM and OLT performs ranging of the OSM similarly to ranging of ONU. The OLT transmits the difference Tz (=RTTa−RTTs) between the round trip time RTTa of the ONU and the round trip time RTTs of the OSM which are ranging results of them to the OSM. The OSM receives Tz from the OLT, calculates connection start time by using the Tz, and obtains the connection start time of an upstream optical switching element.

Secondly, in the OSM, the OLT detects a GATE message corresponding to the first ranging and then, connects the upstream optical switching element, extracts a REPORT message from the ONU corresponding to the GATE message at an outgoing port of the upstream optical switching element, and detects arrival time t3 of the REPORT message. Then, in the OSM, Tz(=t3−t2) is obtained from grant start time t2 written on the GATE message and the arrival time t3. The connection start time is calculated by using the Tz to obtain the start time of the upstream optical switching element.

Thirdly, packet arrival time t3* from the ONU corresponding to the GATE message is obtained at the incoming port of the upstream optical switching element. Then, in the OSM, Tz (=t3*−t2+Ty) is obtained from the grant start time t2 written on the GATE message and delay time Ty of the optical switching element. Connection start time is calculated by suing the Tz to obtain the start time of the upstream optical switching element.

This embodiment is described below.

A synchronizing method for the optical access network of this embodiment is a method in which the optical access network is formed like a tree by one center device, a plurality of remote devices, and at least one optical switching device connected between the center device and the remote devices, the center device transmits a downstream control packet in which transmission time, identification number, transmission start time, and transmission duration of a transmission destination remote device are written to the optical switching device, the optical switching device transmits a downstream control packet to the transmission destination remote device, and when the transmission destination remote device receives the downstream control packet, it adjusts its clock to the transmission time, transmits an upstream control packet in which the transmission start time is written at the transmission start time to the optical switching device, the optical switching device transmits the upstream control packet to the center device, and after receiving the upstream control packet, the center device decides the transmission start time of the remote device. The center device obtains the round trip time with the transmission destination remote device and with optical switch, the optical switching device adjusts its clock to the transmission time, obtains the difference between the both round trip times, outputs a connection start designation to upstream optical switching means, obtains a delay time until the upstream control packet is transmitted after a connection start designation is output, uses a value obtained by subtracting the delay time from the sum of the transmission start time and difference as the connection start time, and uses the connection duration as at least transmission duration.

A synchronizing method for the optical access network of this embodiment is a method in which the optical access network is formed like a tree by one center device, a plurality of remote devices, and at least one optical switching device connected between the center device and the remote devices, the center device writes the transmission time t1 of a downstream control packet, identification number, transmission start time t2, and transmission duration Ta of the transmission destination remote device in the downstream control packet, transmits the downstream control packet to the transmission destination remote device at the transmission time t1 by its own clock, the transmission destination remote device sets the transmission time t1 as the time by its own clock when receiving the downstream control packet, transmits the upstream control packet in which the transmission start time t2 is written at the transmission start time t2 by its own clock by the transmission duration Ta, the center device uses the time when receiving the upstream control packet as t3 by its own clock, obtains the transmission start time t2 written in the upstream control packet, obtains the round trip time RTTa with the transmission destination remote device as RTTa=t3−t2 and after obtaining the RTTa, uses the time for receiving a packet from the transmission destination remote device as t3 by its own clock, and in this case, uses the transmission start time t2 as t3−RTTa, characterized in that an optical switching device is added as a transmission destination of the decent control packet, an optical switch sets the transmission time t1 to its own clock when detecting the downstream control packet, particularly when the downstream control packet is transmitted to its own, sets the transmission time t1 to its own clock when receiving the downstream control packet and transmits the upstream control packet in which the transmission start time t2 is written at the transmission start time t2 to the center device by the transmission duration Ta, the center device obtains the round trip time RTTs with the optical switching device in accordance with a method for obtaining the round trip time RTTa with the transmission destination remote device, the optical switching device obtains the value of other delay time Tz=RTTa−RTTs or values of RTTa and RTTs capable of calculating other delay time Tz from the center device, obtains the transmission start time t2 and transmission duration Ta from the decent control packet to the transmission destination remote device, outputs a direct start designation to the upstream switching means of the optical switching device to set the delay time to be transmitted from the optical switching device corresponding to an identification number as Ty1, selects a port to which the transmission destination remote device corresponding to the identification number as an incoming port, and sets the connection start time as t2+Tz−Ty1 and the connection duration to at least Ta.

A synchronizing method for the optical access network of this embodiment is characterized in that an identification number ID of the transmission destination remote device and transmission request R (R=1: request, R=0: non-request) of the upstream control packet are written in the downstream control packet transmitted from the center device and the center device sets the request R to 1 at the transmission time t1 by its own clock and transmits the downstream control packet in addition to the above configuration.

A synchronizing method for the optical access network of this embodiment is a method in which the optical access network is formed like a tree by one center device, a plurality of remote devices, and at least one optical switching device connected between the center device and the remote devices, the center device writes the transmission time t1 of a downstream control packet, identification number of a transmission destination remove device, transmission start time t2, and transmission duration Ta of the transmission destination remote device in the downstream control packet, transmits the downstream control packet to the transmission destination remote device at the transmission time t1 by its own clock, the transmission destination remote device sets the transmission time t1 as the time by its own clock when receiving the downstream control packet, transmits the upstream control packet in which the transmission start time t2 is written at the transmission start time t2 by its own clock by the transmission duration Ta, the center device uses the time when receiving the upstream control packet as t3 by its own clock, obtains the transmission start time t2 written in the upstream control packet, obtains the round trip time RTTa with the transmission destination remote device as RTTa=t3−t2 and after obtaining the RTTa, uses the time for receiving a packet from the transmission destination remote device as t3 by its own clock, and in this case, uses the transmission start time t2 as t3−RTTa, characterized in that the optical switching device obtains the transmission time t1, an identification number, the transmission time t2, transmission duration Ta, and packet length of the downstream control packet from the downstream control packet, sets the time by its own clock as the transmission time t1, connects only a downstream control packet length Tp by using the outgoing port of downstream optical switching means as a port corresponding to the identification number, measures the arrival time of the upstream control packet from the transmission destination remote device of the optical switching device by the outgoing port of upstream optical switching means, obtains a delay time from the incoming port of the upstream optical switching means up to a pint for measuring the arrival time, sets other delay time as (arrival time−transmission start time t2), sets the connection start time of the upstream optical switching means of the optical switching device as (transmission start timet2+other delay time−delay time) and sets the connection duration as at least the transmission duration Ta.

A synchronizing method for the optical access network of this embodiment is a method in which the optical access network is formed like a tree by one center device, a plurality of remote devices, and at least one optical switching device connected between the center device and the remote devices, the center device writes the transmission time t1 of a downstream control packet, identification number of a transmission destination remove device and transmission start time t2 and transmission duration Ta of the transmission destination remote device in the downstream control packet, transmits the downstream control packet to the transmission destination remote device at the transmission time t1 by its own clock, the transmission destination remote device sets the transmission time t1 as the time by its own clock when receiving the downstream control packet, transmits the upstream control packet in which the transmission start time t2 is written at the transmission start time t2 by its own clock by the transmission duration Ta, the center device uses the time when receiving the upstream control packet as t3 by its own clock, obtains the transmission start time t2 written in the upstream control packet, obtains the round trip time RTTa with the transmission destination remote device as RTTa=t3−t2 and after obtaining the RTTa, uses the time for receiving a packet from the transmission destination remote device as t3 by its own clock, and in this case, uses the transmission start time t2 as t3−RTTa, characterized in that the center device transmits a downstream control packet 1 when setting the downstream control packet and upstream control packet when first obtaining the round trip time RTTa with the transmission destination remote device to the downstream control packet 1 and an upstream control packet 1, receives the upstream control packet 1 from the transmission destination remote device, the optical switching device obtains the information on the identification number, transmission time t1, transmission start time t2, and transmission duration Ta, obtains the packet length Tp of the downstream control packet 1, sets the transmission time t1 as the time by its own clock, selects an outgoing port to which the transmission destination remote device corresponding to the identification number among outgoing ports of downstream optical switching means having one incoming port and n outgoing ports of its own, connects the selected outgoing port and incoming port for the time Tp or more, transmits the downstream control packet 1 at the time t1+tx by its own clock, selects an incoming port to which the transmission destination remote device corresponding to the identification number among incoming ports of the upstream optical switching means having n incoming ports and one outgoing port of its own for the upstream control packet 1 from the transmission destination remote device receiving the downstream control packet 1, sets the connection start time of the selected incoming port and outgoing port to time t2+Tx by its own clock, sets connection duration to Tw(=RTTmax+Tq) which is the sum of round trip time RTTmax with a remote device farthest from the center device in design and downstream control packet length Tq, measures the arrival time of the upstream control packet 1 from the transmission destination remote device by the outgoing port of the upstream optical switching means of its own, sets the arrival time to t3* by its own clock, sets the delay time up to a point for measuring the arrival time t3 from the incoming port of the upstream optical switching means as Ty2, obtains other delay time Tz=T3−t2, the optical switching device obtains the transmission time t2 and transmission duration Ta from the center device to the transmission destination remote device, sets the port to which the transmission destination remote device is connected as the incoming port of the upstream switching means of its own, sets connection start time to t2+Tz−Ty2, and sets connection duration as at least the transmission duration Ta.

A synchronizing method for the optical access network of this embodiment is characterized in that the identification number ID of a transmission destination remote device and the transmission request (R1: request, R0: non-request) of an upstream control packet are written in the downstream control packet transmitted from the center device in addition to the above configuration and the center device sets its own clock to the transmission time t1 and the request R to 1 and transmits a downstream control packet.

A synchronizing method for the optical access network of this embodiment is a method in which the optical access network is formed like a tree by one center device, a plurality of remote devices, and at least one optical switching device connected between the center device and the remote devices, the center device transmits a downstream control packet in which transmission time, identification number, transmission start time, and transmission duration of a transmission destination remote device are written to an optical switching device, the optical switching device transmits a downstream control packet to the transmission destination remote device, the transmission destination remote device adjusts its own clock to the transmission time when receiving the downstream control packet, transmits an upstream control packet in which the transmission start time is written at the transmission start time to the optical switching device, the optical switching device transmits the upstream control packet to the center device, and the center device decides the transmission start time of the packet of the remote device, characterized in that the optical switching device obtains transmission time, identification number, transmission start time, transmission duration, and packet length of the downstream control packet from the downstream control packet, adjusts the time by its own clock to the transmission time, connects the outgoing port and incoming port to which the transmission destination remote device corresponding to the identification number is connected for downstream optical switching means for the time of the downstream control packet length or more, uses the arrival time of an upstream packet from the transmission destination remote device as the arrival time measured by its own clock, obtains other delay time by subtracting the transmission start time from the arrival time, uses a port to which the transmission destination remote device is connected as the incoming port of upstream switching means of its own, uses the connection start time as the sum of the transmission start time and other delay time, and uses the connection duration as at least transmission duration.

A synchronizing method for the optical access network of this embodiment is a method in which the optical access network is formed like a tree by one center device, a plurality of remote devices, and at least one optical switching device connected between the center device and the remote devices, the center device writes the transmission time t1 of a downstream control packet, identification number of a transmission destination remote device, and transmission start time t2 and transmission duration Ta of the transmission destination remote device in a downstream control packet, transmits the downstream control packet to the transmission destination remove device at the transmission time t1 by its own clock, sets the transmission time t1 as the time by its own clock when receiving the downstream control packet, transmits the upstream control packet in which the transmission start time t2 is written at the transmission start time t2 by its own clock by transmission duration Ta, the center device sets the time when receiving the upstream control packet as t3 by its own clock, obtains the transmission start time t2 written in the received upstream control packet, obtains the round trip time RTTa with the transmission destination remote device as RTTa=T3−t2, and sets the time for receiving a packet from the transmission destination remote device as t3 by its own clock after obtaining TTa, and sets the transmission start time t2 to be written in the downstream control packet as t3−RTTa, characterized in that the optical switching device obtains the information on the transmission time t1, identification number, transmission start time t2, and transmission duration Ta, obtains the packet length Tp of the downstream control packet, 0s the transmission time t1 as the time by its own clock, selects an outgoing port to which the transmission destination remote device corresponding to the identification number among outgoing ports of the downstream optical switching means having one incoming port and n outgoing ports of its own, connects the selected outgoing ports and the incoming port for the time Tp or more, transmits the downstream control packet at the time t1+Tx by its own clock, measures the arrival time of an upstream packet from the transmission destination remote device of the upstream optical switching means of its own for an upstream packet from the transmission destination remote device receiving the downstream control packet by its own clock, sets the arrival time as t3* by its own clock, obtains other delay time Tz=t3*−t2, uses a port to which the transmission destination remote device corresponding to the identification number is connected as a port of the upstream switching means of its own, sets the connection start time as t2+Tz, and set the connection duration as at least Ta.

In the case of a synchronizing method for the optical access network of this embodiment, it is characterized that the identification number ID of a transmission destination remote device and the transmission request (R=1; request, R=0: non-request) of an upstream control packet are written in a downstream control packet transmitted from a center device and the center device sets the transmission time t1 by its own clock and request R to 1, and transmits a downstream control packet in addition to the above configuration.

In the case of a synchronizing method for the optical access network of this embodiment, it is characterized by using a GATE message defined by MPCP of IEEE 802.3ah as a decent control packet and a REPORT message as an upstream control packet in addition to the above configuration in addition to the above configuration.

In the case of a synchronizing method for the optical access network of this embodiment, when a center device obtains round trip time RTTs with an optical switching device, and first obtains round trip time RTTa with a transmission destination remote device, characterized in that the center device sets the size W of a time area for receiving an upstream control packet from a transmission destination remote device as Tw−RTTs and the start time of the time area to the time (t1*+RTTs) obtained by adding RTTs to the time t1* when setting the round trip time of the farthest remote device in design as RTTmax, length of the upstream control packet as Tq, and Tw to RTTmax+Tq in addition to the above configuration.

The optical switching device of this embodiment is used for an optical network constituted of one center device, a plurality of remote devices and at least one optical switching device connected between the center device and the remote devices like a tree. The center device writes transmission time, identification number of a transmission destination remote device or optical switching device, transmission time, transmission start time, and transmission duration in a downstream control packet and transmits them and the remote device or optical switch receiving the downstream control packet adjust its own clock to the transmission time, transmits an upstream control packet in which the transmission start time is written at the transmission start time by its own clock, the center device is an optical switching device used to obtain the round trip time with the transmission destination remote device and the round trip time with the optical switching device, the optical switching device sets the time by its own clock as the transmission time, obtains the value of and the information on the difference between the both round trip times, outputs a connection start designation to the upstream optical switching means of the optical switching device and obtains a delay time until the upstream control packet is transmitted, sets the connection start time as the value obtained by subtracting the delay time from the sum of the transmission start time and the value of the difference, and uses the connection duration as at least the transmission duration.

The optical switching device of this embodiment is used for an optical network formed like a tree by one center device, a plurality of remote devices, and at least one optical switching device connected between the center device and remote devices, the center device writes transmission time, identification number of a transmission destination remote device or optical switching device, transmission start time, and transmission duration in a downstream control packet and transmits the downstream control packet, the remote device or optical switch receiving the downstream control packet adjusts its own clock to the transmission time, transmits the upstream control placket in which the transmission start time is written at the transmission start time by its own clock, the center device is an optical switching device used to obtain the round trip time with the transmission destination remote device and the round trip time with the optical switching device from the time by its own clock and the transmission start time of the upstream packet, and the optical switching device includes first wavelength-separating/synthesizing means for separating or synthesizing the wavelength of a downstream optical signal and that of an upstream optical signal transmitted through an optical fiber connected to the center device side, n second wavelength-separating/synthesizing means for separating or synthesizing wavelengths of downstream optical signals and wavelengths of upstream optical signals transmitted through a maximum of n optical fibers connected to the remote device side, first branching means for branching a downstream optical signal obtained by branching the wavelength from the center device side by the first wavelength-separating/synthesizing means into two optical signals, delaying means for delaying one downstream optical signal of the two downstream optical signals branched by the first branching means, downstream optical switching means having one incoming port and n outgoing ports for switching a downstream optical signal from the delaying means, upstream optical switching means having n incoming ports and one outgoing port for switching upstream optical signals obtained by separating wavelengths from n outgoing ports of the downstream optical switching means by n second wavelength-separating/synthesizing means, control means for providing the outgoing port and connection duration of the downstream optical switching means in accordance with the identification number and length of a downstream packet, providing the connection duration of the downstream optical switching means from the arrival time information on an upstream packet, deciding the incoming port, connection start time, and connection duration of the upstream optical switching means from the identification number, difference between the round trip time between center device and remote device and the round trip time between center device and optical switching device, remote device transmission time, and remote device transmission duration, outputting a connection designation for incoming port and connection duration to the upstream optical switching means, obtaining the value of and information on the difference between the both round trip times, obtaining a delay time from the time when a connection start designation is output to the upstream optical switching means until the time when the upstream control packet is transmitted, setting the connection start time as a value obtained by subtracting a delay time from the difference and the sum of the transmission start time, and providing the connection duration to the upstream optical means as the transmission duration, and the outgoing port of the upstream switching means for receiving an optical signal from the second branching means connecting an optical signal from the upstream optical switching means and an optical signal from the control means or an optical signal from the control means.

In the case of the optical switching device of this embodiment, control means includes first converting means for converting one downstream optical signal of two downstream optical signals branched by first branching means into an electrical signal, extracting means for extracting a downstream packet from the electrical signal from the first converting means, analyzing means for analyzing the content of the downstream packet from the extracting means, time management means for setting transmission time obtained by the analyzing means, calculating means for calculating the time from the time management means and the arrival time of the downstream packet from the downstream packet forefront information obtained by extracting means, downstream switch control means for providing the outgoing port and connection time of downstream optical switching means in accordance with the identification number and length of the downstream packet obtained by the analyzing means and providing the connection start time of the downstream switching means from the arrival time information on the downstream packet obtained by the calculating means, generating means for generating an upstream control packet in which the identification number of the optical switching device and transmission start time obtained by the analyzing means are written, transmission means for transmitting the upstream control packet from the generating means at the transmission start time by the time management means, and second converting means for converting the transmission start time from the transmission means into an electrical signal, obtains the value of the difference between the both round trip times and transmission start time, obtains a delay time from the time when a connection start designation is output to the upstream optical switching means until the time when the upstream control packet is transmitted, sets the connection start time as a value obtained by subtracting the delay time from the sum of the transmission start time and the value of the difference and the connection duration as at least transmission duration in addition to the above configuration.

In the case of the optical switching device of this embodiment, the identification number ID of a transmission destination remote device and the transmission request (R=1: request, R=0: non-request) of an upstream control packet are written in a downstream control packet transmitted from a center device and the center device sets the request R to 1 at the transmission time t1 by its own clock and transmits a downstream control packet in addition to the above configuration.

The optical switching device of this embodiment is used for an optical network constituted like a tree by one center device, a plurality of remote devices, and at least one optical switching device connected between the center device and the remote devices, the center device writes transmission time, identification number, transmission start time, and transmission duration of a transmission destination remove device in a downstream control packet and transmits the downstream control packet, the remote device corresponding to the identification number receiving the downstream control packet adjusts its own clock to transmission time, transmits an upstream control packet in which transmission start time is written at the transmission start time by its own clock, and the center device is an optical switching device for obtaining the round trip time with the transmission destination remote device from the time by its own clock and the transmission start time of an upstream packet, the optical switching device obtains transmission start time and transmission duration from the downstream control packet and the packet length of the downstream control packet, adjusts its own clock to the transmission time, connects an outgoing port and incoming port to which the transmission destination remote device corresponding to the identification number is connected for the downstream control packet length or more, measures the arrival time of the upstream control packet from the transmission destination remote device by the outgoing port of the optical switching device, obtains a delay time from the incoming port of the upstream optical switching means up to a point for measuring the arrival time, sets other delay time as (arrival time−transmission start time), obtains transmission start time and transmission duration from the downstream control packet from the center device to the transmission destination remote device, and sets the connection start time as (transmission start time+other delay time−delay time) and the connection duration as at least transmission duration.

The optical switching device of this embodiment is used for an optical network constituted like a tree by one center device, a plurality of remote devices, and at least one optical switching device connected between the center device and the remote devices, the center device writes transmission time, identification number, transmission start time, and transmission duration of a transmission destination remote device in a downstream control packet and transmits the downstream control packet, receives a downstream control packet, adjusts its own clock to the transmission time, the remote device adjusts its own clock to the transmission time, transmits an upstream control packet in which transmission start time is written at the transmission start time by its own clock, and the center device is an optical switching device used for obtaining the round trip time with the transmission destination remote device from the time by its own clock and the transmission start time, and an optical switch includes first wavelength-separating/synthesizing for separating/synthesizing the wavelength of a downstream optical signal and the wavelength of an upstream optical signal transmitted through an optical fiber connected to the center device side, n second wavelength-separating/synthesizing means for separating/synthesizing wavelengths of upstream optical signals and wavelengths of downstream optical signals transmitted through a maximum of n optical fibers connected to the remote device side, first branching means for branching a downstream optical signal obtained by branching the wavelength from the center device side into two optical signals, delaying means for delaying one downstream optical signal of two downstream optical signals branched by the branching means, optical switching means having one incoming port and n outgoing ports for switching a downstream optical signal from the delaying means, upstream optical switching means having n incoming ports and one outgoing port for synthesizing wavelengths of downstream optical signals from n outgoing ports from the downstream optical switching means by n second wavelength-separating/synthesizing means and switching an upstream optical signal obtained by separating wavelengths from a maximum of n remote devices, second branching means for branching an upstream optical signal from the upstream optical switching means, and control means for obtaining the packet length of the downstream control packet, obtaining outgoing port of the downstream optical switching means, transmission time t1 by the center device written in the downstream control packet, upstream packet transmission time t2 of transmission destination remote device, and packet transmission duration Ta of the transmission destination remote device, supplying outgoing port of the downstream optical switching means, connection start time, and connection duration to the downstream optical switching means, and supplying connection incoming port information on the upstream switching means, connection start time, connection duration to the upstream switching means.

In the case of the optical switching device of this embodiment, control means includes first converting means for synthesizing one upstream optical signal of two upstream optical signals branched by second branching means by first wavelength-separating/synthesizing means and converting one downstream optical signal of two downstream optical signals branched by first branching means into an electrical signal, first extracting means for extracting a downstream packet from an electrical signal from first converting means, first calculating means for calculating the arrival time of a downstream control packet in accordance with the information from the first extracting mans and control means, analyzing means for obtaining the transmission time t1 at a center device, and identification number, upstream packet transmission time t1, identification number, upstream packet transmission start time t2, and packet transmission duration Ta of a transmission destination remote device, downstream switch control means for providing identification number and packet length Tp of the transmission destination remote device, switch control means for providing the outgoing port, connection duration, and connection start time of downstream optical switching means in accordance with the identification number of packet length Tp of the transmission destination remote device from the analyzing means and information from the first calculating means, control means for controlling time in accordance with the transmission time t1 attached to the downstream control packet obtained by the analyzing means, second converting means for converting another upstream optical signal of two upstream optical signals branched by the second branching means into electricity, second extracting means for extracting the upstream control packet from an electrical signal of the second converting means, second calculating means for calculating the arrival time of the upstream control packet in accordance with the informations from the second extracting means and control means, and optical switch control means for obtaining the connection start time of the upstream optical switching means, obtaining the incoming port and connection duration of the upstream switching means from the analyzing means, receiving time from the control means, and providing the incoming port, connection start time, and connection duration for the upstream switching means in addition to the above configuration.

In the case of the optical switching device of this embodiment, the identification number ID of the transmission destination remote device and transmission request (R=1: request, R=0: non-request) of the upstream control packet are written in the downstream control packet transmitted from the center device and the center device sets its own clock to the transmission time t1 and the request R to 1, and transits the downstream control packet in addition to the above configuration.

The optical switching device of this embodiment is used for an optical network constituted like a tree by one center device, a plurality of remote devices, and at least one optical switching device connected between the center device and the remote devices, the center device writes transmission time, identification number or optical switching device, transmission time, transmission start time, and transmission duration of a transmission destination remote device in a downstream control packet and transmits the downstream control packet, the remote device or optical switch receiving the downstream control packet adjusts its own clock to transmission time, transmits an upstream control packet in which the transmission start time is written at the transmission start time by its own clock, the center device is an optical switching device used to obtain the round trip time with the transmission destination remote device and the round trip time with the optical switching device, the optical switching device obtains transmission start time, transmission duration, and packet length of the downstream control packet from the downstream control packet, connects an outgoing port selecting the outgoing port to which the transmission destination remote device is connected and incoming port for the time of the packet length or more, measures the arrival time t3* of an upstream packet by its own clock from the transmission destination remote device and uses it as the arrival time, subtracts the transmission start time from the arrival time and obtains other delay time, uses the incoming port of the upstream switching means of the optical switching device as the port to which the transmission destination device is connected, and sets the connection start time as the sum of other delay time and transmission start time, and uses the connection duration as at least transmission duration in addition to the above configuration.

The optical switching device of this embodiment is used for an optical network constituted like a tree by one center device, a plurality of remote devices, and at least one optical switching device connected between the center device and the remote devices, the center device writes transmission time, identification number of a transmission destination remote device, transmission time, transmission start time, and transmission duration in a downstream control packet and transmits the downstream control packet, a remote device receiving the downstream control packet adjusts its own clock to the transmission time and transmits an upstream control packet in which the transmission start time is written at the transmission start time by its own clock, the center device is an optical switching device used to obtain the round trip time with the transmission destination remote device from the time by its own clock and the transmission start time of an upstream packet and includes first wavelength separating/synthesizing means for separating/synthesizing the wavelength of a downstream optical signal and the wavelength of an upstream optical signal transmitted through an optical fiber connected to the center device side, n second wavelength-separating/synthesizing mans for separating/synthesizing wavelengths of downstream optical signals and upstream optical signals transmitted by a maximum of n optical fibers connected to the remote device side, first branching means for branching a downstream optical signal obtained by branching the wavelength from the center device side by the first wavelength-separating/synthesizing means 1 into two optical signals, first delaying means for delaying one downstream optical signal of the two downstream optical signals branched by the first branching means, optical switching means having one incoming port and n outgoing ports for switching a downstream optical signal from the first delaying means, n second branching means for synthesizing wavelengths of downstream optical signals from n outgoing ports from downstream optical switching means by n second wavelength-separating/synthesizing means and branching an upstream optical signal obtained by separating wavelengths from a maximum of n remote devices into two optical signals, second delaying means for delaying a downstream optical signal from the second branching means, upstream optical switching means having n incoming ports and one outgoing port for switching a downstream optical signal from the second delaying means, and control means for obtaining the transmission time t1 at the center device and ascent-packet transmission start time t2 and packet transmission duration Ta of the transmission destination remote device, obtaining the packet length Tp of a downstream control packet, setting the transmission time t1 to the time by its own clock, selecting an outgoing port to which the transmission destination remote device is connected among outgoing ports of n downstream optical switching means, connecting the selected outgoing port with an incoming port for the time Tp or more, transmitting the downstream control packet at the time t1+Tx by its own clock, measuring the arrival time of the upstream packet from the transmission destination remote device receiving the downstream control packet by its own clock at the incoming port of the optical switching means of its own, setting the arrival time to t3* by its own clock, obtaining other delay time Tz*=t3*−t2, using a port to which the transmission destination remote device is connected as the incoming port of the upstream switching means of its own, setting the connection duration time to Tz+t2, outputting a connection designation for an incoming port and connection duration to the upstream switching means when time reaches the connection start time by its own clock, and providing the outgoing port, connection start time, and connection duration of the downstream optical switching mean.

In the case of the optical switching device of this embodiment, in addition to the above configuration, control means includes first converting means for synthesizing the wavelength of an upstream optical signal from upstream switching means by first wavelength-separating/synthesizing means and converting one downstream optical signal of two downstream optical signals branched by first branching means into an electrical signal, first extracting means for extracting a decent packet from the electrical signal from the first converting means, analyzing means for obtaining a downstream packet length Tp from the first extracting means and when the decent packet is a downstream control packet, obtaining the identification number of a transmission destination remote device and the transmission time t1, transmission start time t2, and transmission duration Ta at a center device, control means for controlling time in accordance with the transmission time t1 set to the downstream control packet obtained by the analyzing means, first calculating means for calculating the arrival time of the downstream packet in accordance with the information from the first extracting means and control means, connecting means having n inputs and one output for connecting one upstream optical signal of two upstream optical signals branched by second branching means, second converting means for converting an upstream optical signal from the connecting means into an electricity, second extracting means for extracting a packet from the electrical signal from second converting means, second calculating means for calculating the arrival time of an upstream packet in accordance with the information from the second extracting means and control means, and upstream switch control means for obtaining the connection start time of upstream optical switching means in accordance with the information from the second calculating means and control means, receiving the connection incoming port and connection duration of upstream optical switching means from the analyzing means, and downstream switch control means for supplying the outgoing port, connection start time, and connection duration of downstream optical switching means to the downstream switching means in accordance with the information from the analyzing means, first calculating means, and control means in addition to the above configuration.

The optical switching device of this embodiment is used for an optical network constituted like a tree by one center device, a plurality of remote devices, and at least one optical switching device connected between the center device and the remote devices, the center device writes the identification number, transmission start time, and transmission duration of an transmission destination remote device in a downstream control packet and transmits the decent control packet, a remote device receiving the downstream control packet adjusts its own clock to the transmission time, transmits the upstream control packet in which the transmission start time is written at the transmission start time by its own clock, and the center device is an optical switching device used to obtain the round trip time with a transmission destination remote device from the time by its own clock and the transmission start time of an upstream packet and includes first wavelength-separating/synthesizing means 1 for separating/synthesizing the wavelength of a downstream optical signal and the wavelength of an upstream optical signal transmitted through an optical fiber connected to the center device side, n second wavelength-separating/synthesizing for separating/synthesizing wavelengths of downstream optical signals and wavelengths of upstream optical signals transmitted through a maximum of n optical fibers connected to the remote device side, first branching mans for branching a downstream optical signal obtained by separating a wavelength from the transmission device side by the first wavelength-separating/synthesizing means 1 into two optical signals, first delaying means for delaying one of two optical signals branched by the first branching means, downstream optical switching means having one incoming port and n outgoing ports for switching a downstream optical signal from the first delaying means, n second branching means for synthesizing wavelengths of downstream optical signals from n outgoing ports from the downstream optical switching means by n second wavelength-separating/synthesizing means and branching an upstream optical signal obtained by separating wavelengths from a maximum of n remote devices into two optical signals, second delaying means for delaying one of two downstream optical signals from the second delaying means, upstream optical switching means having n incoming ports and one outgoing port for switching a downstream optical signal from second delaying means, and control means for obtaining the transmission time t1 at the center device and upstream packet transmission start time t2 and packet transmission duration of a transmission destination remote device, obtaining the packet length Tp of a downstream control packet, setting the transmission time t1 to the time by its own clock, selecting an outgoing port to which the transmission destination remote device is connected among outgoing ports of downstream optical switching means having one incoming port and n outgoing ports of its own, connecting the selected outgoing port with incoming port for the time Tp or more, transmitting the downstream control packet at the time t1+Tx by its own clock, measuring the arrival time of an upstream packet by its own clock from the transmission destination remote device receiving the downstream control packet, setting the arrival time to t3* by its own clock, obtaining other delay time $Tz^* = t3^* - t2$, using a port to which the transmission destination remote device is connected as the incoming port of the upstream switching means of its own, setting the connection start time to Tz+t2, outputting a connection designation for incoming port and connection duration to the upstream optical switching means when time reaches the connection start time by its own clock, and providing outgoing port, connection start time, and connection duration of downstream optical switching means when the downstream packet is a downstream control packet.

In the case of the optical switching device of this embodiment, control means includes first converting means for synthesizing wavelengths of upstream optical signals from upstream optical switching means by first wavelength-separating/synthesizing means and converting one of two downstream optical signals branched by fist branching means into an electrical signal, first extracting means for extracting a downstream packet from the electrical signal from the first converting means, analyzing means for analyzing the content of the downstream packet of the first extracting means, analyzing means for obtaining transmission time t1 at a center device, identification number, upstream packet transmission start time t2, and transmission duration Ta of a transmission destination remote device, control means for controlling time in accordance with the transmission time t1 set to a downstream control packet obtained by the analyzing means, first calculating means for calculating the arrival time of the downstream packet from the first extracting means and control means, downstream switch control means for receiving the time of the control means and supplying the outgoing port, connection start time, and connection duration of a downstream optical switching means to the downstream optical switching means in accordance with the identification number from the analyzing means and downstream packet length Tp, n second converting means for converting one of two upstream optical signals branched by second branching means into electricity, second extracting means for extracting packets from electrical signals from the n second converting means, second calculating means for calculating the arrival time of an upstream packet in accordance with the information from the second extracting means and control means, and upstream switch control means for obtaining the connection start time of the upstream optical switching means, receiving the connection incoming port information and connection duration of the upstream optical switching means from the analyzing means, and outputting the connection designation for the upstream optical switching means and connection duration to the upstream optical switching means when time reaches the connection start time in addition to the above configuration.

In the case of the optical switching device of this embodiment, the identification number ID of a transmission destination remote device and the transmission request R (R=1: request, R=0: non-request) of an upstream control packet are written in a downstream control packet transmitted from a center device and the center device sets the transmission time t1 by its own clock and the request R to 1, and transmits a downstream control packet in addition to the above configuration.

In the case of the optical switching device of this embodiment, GATE message defined by MPCP of IEEE802.3ah is used as a downstream control packet and REPORT message is used as an upstream control packet in addition to the above configuration.

In the case of the optical switching device of this embodiment, when obtaining the round trip time RTTs with the optical switching device and first obtaining the round trip time RTTz with a transmission destination remote device, a center device sets W=Tw−RTTs and the start time of a time area to the time (t1*+RTTs) obtained by adding RTTs to the time t1* when the center device completes transmission of a control packet when assuming the size of the time area for receiving an upstream control packet from a transmission destination remote device as W, the round trip time of a farthest remote device in design as RTTmax, the length of the upstream control packet as Tq, and Tw as RTTmax+Tq in addition to the above configuration.

The center device of this embodiment is a center device of an optical access network constituted like a tree by one center device, a plurality of remote devices, and at least one optical switching device connected between the center device and the remote devices, the center device writes the transmission time t1 of a downstream control packet, and identification number, transmission start time t2, and transmission duration Ta of a transmission destination remote device in a downstream control packet, transmits a downstream control packet to the transmission destination remote device at the transmission time t1 by its own clock, sets the time when transmitting a downstream control packet to an optical switching device and receiving an upstream control packet from the transmission destination remote device to t3, obtains the time t2 written in the received upstream optical control packet, and sets the time when receiving a packet from the transmission destination remote device to t3 by its own clock, obtains the round trip time RTTa with the transmission destination remote device as RTTa=t3−t2, and sets the time for receiving a packet from the transmission destination remote device to t3 by its own clock, and in this case, sets the transmission start time t2 to be written in the downstream control packet to t3−RTTa, obtains the round trip time RTTs with the optical switching device by a method for obtaining the round trip time RTTa with the transmission destination remote device, and uses REPORT message as the upstream control packet.

The center device of this embodiment uses GATE message defined by MPCP of IEEE802.3ah as a downstream control packet and uses REPORT message as an upstream control packet.

To obtain the round trip time RTTs with an optical switching device and first obtain the round trip time RTTa with a transmission destination remote device, the center device of this embodiment sets the size W of a time area for receiving an upstream packet from the transmission destination remote device to W=Tw−RTTs as the round trip time RTTmax of a farthest remote device in design and the start time of the time area as the time (t1*+RTTs) obtained by adding RTTs to the time t1* when the center device completes transmission of a control packet in addition to the above configuration.

The remote device of this embodiment is a remote device of an optical access network constituted like a tree by one center device, a plurality of remote devices, and at least one optical switching device connected between the center device and the remote devices sets the transmission time t1 of a downstream control packet to the time by its own clock when receiving the downstream control packet transmitted from the center device and transmits an upstream control packet in which the transmission start time t2 of its own is written by its own clock by the transmission duration Ta of its own.

The remote device of this embodiment uses GATE message defined by MPCP of IEEE802.3ah as a downstream control packet and REPORT message as an upstream control packet in addition to the above configuration.

In the case of the remote device of this embodiment, when a center device obtains the round trip time RTTs with an optical switching device and first obtains the round trip time RTTa with a transmission destination remote device, the center device sets the size W of a time area for receiving an upstream control packet from the transmission destination remote device as W=Tw−RTTs and the start time of the time area as the time (t1*+RTTs) obtained by adding RTTs to the time t1* when the center device completes transmission of a control packet when setting the round trip time of a farthest remote device in design as RTTmax and the length of the upstream control packet as Tq, and Tw as RTTmax+Tq.

The optical access system of this embodiment is connected like a tree by one center device, a plurality of remote devices, and at least one optical switching device, the center device transmits a downstream control packet in which the identification number, transmission start time, and transmission duration of a transmission destination remote device are written to an optical switching device, the optical switching device transmits a downstream control packet to the transmission destination remote device, the transmission destination remote device adjusts its own clock to the transmission time when receiving the downstream control packet, transmits an upstream control packet in which the transmission start time is written to the optical switching device at the transmission start time, the optical switching device transmits the upstream control packet to the center device, the center device decides the transmission start time of the packet of the remote device after receiving the upstream control packet and obtains the round trip time with the transmission destination remote device and the round trip time with an optical switch, the optical switching device adjusts its own clock to the transmission time, obtains the value of and information on the difference between the both round trip times, outputs a connection designation to an upstream optical switching means and then obtains the delay time from the time when a connection start designation is output to the upstream optical switching means of the optical switching device up to the time when the upstream control packet is transmitted, sets the value obtained by subtracting the delay time from the sum of the transmission start time and difference as the connection start time and the connection duration as at least transmission duration.

The optical access system of this embodiment is connected like a tree by one center device, a plurality of remote devices, and at least one optical switching device, the center device writes the transmission time t1 of a downstream control packet and identification number, transmission start time t2, and transmission duration Ta of a transmission destination remote device in a downstream control packet, transmits a downstream control packet to the transmission destination remote device at the transmission time t1 by its own clock, the transmission destination remote device sets the transmission time t1 as the time by its own clock when receiving the downstream control packet, transmits an upstream control packet in which the transmission start time t2 is written at the transmission start time t2 by the transmission duration Ta, sets the time when receiving the upstream control packet as t3 by its own clock, obtains the transmission start time t2 written in the received upstream control packet, obtains the round trip time RTTa with the transmission destination remote device as RTTa=t3−t2, and sets the time when receiving a packet from the transmission destination remote device as t3 by its own clock and in this case, the optical access system for setting the transmission start time t2 to be written in the downstream control packet as t3−RTTa adds the optical switching device to the transmission destination of the downstream control packet, sets the transmission time t1 to its own clock when a optical switch detects the downstream control packet, and particularly when the downstream control packet is transmitted to its own, sets the transmission time t1 to its own clock when receiving the downstream control packet, transmits an upstream control packet in which the transmission start time t2 is written at the transmission start time t2 to the center device by its own clock by the transmission duration Ta, the center device obtains the round trip time RTTs with the optical switching device in accordance with a method for obtaining the round trip time RTTa with the transmission destination remote device, the optical switching device obtains values of RTTa and RTTs capable of calculating the value of other delay time Tz=RTTa−RTTs or still another delay time Tz from the center device, obtains the transmission start time t2 and transmission duration Ta from the downstream control packet to the transmission destination remote device from the center device, outputs a connection start designation to upstream optical switching means of the optical switching device, sets the delay time until transmitted from the optical switching device corresponding to the identification number as Ty1, selects a port to which the transmission destination remote device corresponding to the identification number is connected as the incoming port of its own, and sets the connection start time as t2+Tz−Ty1 and the connection duration as at leas Ta.

In the case of the optical access system of this embodiment, the identification number ID of a sensing-destination remote device and the transmission request R (R=1: request, R=0: non-request) of an upstream request packet are written in a downstream control packet transmitted from a center device and the center device sets the request R to 1 at the transmission time t1 by its own clock, and transmits a downstream control packet in addition to the above configuration.

The optical access system of this embodiment is an optical access system connected like a tree by one center device, a plurality of remote devices, and at least one optical switching device, in which the center device writes the transmission time t1 of a downstream control packet, and identification number, transmission start time t2, and transmission duration Ta of a transmission destination remote device in the downstream control packet, transmits the downstream control packet to the transmission destination remote device at the transmission time t1 by its own clock, the transmission destination remote device sets the transmission time t1 as the time by its own clock when receiving the downstream control packet, transmits an upstream control packet in which the transmission start time t2 is written at the transmission start time t2 by its own clock by the transmission duration Ta, the center device sets the time when receiving the upstream control packet to t3, obtains the transmission start time t2 written in the received upstream control packet, obtains the round trip time RTTa with the transmission destination remote device as RTTa=t3−t2, sets the time for receiving a packet from the transmission destination remove device to t3 by its own clock and in this case, sets the transmission start time t2 to be written in the downstream control packet as t3−RTTa, and the optical switching device obtains the transmission time t1, identification number, transmission start time t2, transmission duration Ta, and packet length of the downstream control packet from the downstream control packet, sets the time by its own clock to the transmission time t12, uses the outgoing port of downstream optical switching means as a port corresponding to the identification number, connects the port by the downstream control packet length Tp, measures the arrival time of the upstream control packet from the transmission destination remote device of the optical switching device by the outgoing port of upstream optical switching means, obtains the delay time from the incoming port of the upstream optical switching means up to the point for measuring the arrival time, sets other delay time to (arrival time−transmission start time t2), sets the connection start time of the upstream optical switching means of the optical switching device to (arrival time+other delay time−delay time), and sets the connection duration to at least transmission duration Ta.

The optical access system of this embodiment is an optical access system connected like a tree by one center device, a plurality of remote devices, and at least one optical switching device, in which the center device writes the transmission time t1 of a downstream control packet, identification number, transmission start time t2, and transmission duration Ta of a transmission destination remote device in the downstream control packet, transmit the downstream control packet to the transmission destination remote device at the transmission time t1 by its own clock, the transmission destination remote device sets the transmission time t1 as the time by its own clock when receiving a downstream control packet, transmits the upstream control packet in which the transmission start time t2 is written at the transmission start time t2 by its own clock by the transmission duration Ta, the center device sets the time when receiving the upstream control packet to t3 by its own clock, obtains the transmission start time t2 written in the received upstream control packet, obtains the round trip time RTTa with a transmission destination remote device as RTTa=t3−t2, sets the time for receiving a packet from the transmission destination remote device to t3 by its own clock and in this case, sets the transmission start time to be written in the downstream control packet to t3−RTTa, and the center device transmits a downstream control packet 1 and receiving an upstream control packet 1 from the transmission destination remote device when using a downstream control packet and upstream control packet for first obtaining the round trip time RTTa with the transmission destination remote device as the downstream control packet 1 and upstream control packet 1, the optical switching device obtains the information on identification number, transmission time t1, transmission start time t2, and transmission duration Ta from the downstream control packet, obtains the packet length Tp of the downstream control packet 1, sets the transmission time t1 to the time by its own clock, selects an outgoing port to which the transmission destination remote device corresponding to the identification among outgoing ports of optical switching means having one incoming port and n outgoing ports of its own, connects the selected outgoing ports and incoming port for the time Tp or more, transmits the downstream control packet 1 at the time t1+Tx by its own clock, selects an incoming port to which the transmission destination remote device corresponding to the identification number among incoming ports of upstream optical switching means having n incoming ports and one outgoing port of its own, sets the connection start time of the selected incoming port and outgoing port to the time t2+Tx by its own clock, sets connection duration as the sum Tw (=RTTmax+Tq) of the round trip time RTTmax with a farthest remote device from the center device in design and the downstream control packet length Tq, measures the arrival time of the upstream control packet 1 from the transmission destination remote device of the upstream switching means of its own, sets the arrival time as t3 by its own clock and the delay time from the incoming port of the upstream switching means up to a point for measuring the arrival time t3 as Ty2, obtains other delay time Tz=t3−t2, the optical switching device obtains the transmission start time t2 and transmission duration Ta from the downstream control packet from the center device to the transmission destination remote device, uses a port to which the transmission destination device is connected as an incoming port of the upstream switching means of its own, sets the connection start time to t2+Tz−Ty2, and sets the connection duration to at leas transmission duration Ta.

In the case of the optical access system of this embodiment, the identification number ID of a transmission destination remote device and the transmission request R (R=1: request, R=0: non-request) of an upstream control packet are written in a downstream control packet transmitted from a center device and the center device sets the request R to 1 at the transmission time t1 by its own clock and transmits a downstream control packet.

The optical access system of this embodiment is an optical access system connected like a tree by one center device, a plurality of remote devices, and at least one optical switching device, in which the center device transmits a downstream control packet in which the identification number, transmission start time, and transmission duration of a transmission destination remote device is written to the optical switching device, the optical switching device transmits a downstream control packet to the transmission destination remote device, the transmission destination remote device adjusts its own clock to the transmission time when receiving the downstream control packet and transmits an upstream control packet in which transmission start time is written at the transmission start time to the optical switching device, the optical switching device transmits the upstream control packet to the center device, the center device decides the transmission start time of a packet of the remote device after receiving the upstream control packet, and the optical switching device obtains transmission time, identification number, transmission start time, transmission duration, and packet length of the downstream control packet from the downstream control packet, adjusts the time of its own clock to the transmission time, connects an outgoing port and incoming port to which the transmission destination remote device is connected corresponding to the identification number for downstream switching means for the time of the downstream control packet or more, sets the arrival time of an upstream packet as the arrival time measured by its own clock from the transmission destination remote device, uses a port to which the transmission destination remote device is connected as the incoming port of the upstream switching means of its own, sets the connection start time as the sum of the transmission start time and other delay time, and sets the connection duration as at least transmission duration.

The optical access system of this embodiment is an optical access system connected like a tree by one center device, a plurality of remote devices, and at least one optical switching device, in which the center device writes the transmission time t1 of a downstream control packet and the identification number, transmission start time t2, and transmission duration of a transmission destination remote device in a downstream control packet, transmits the downstream control packet to the transmission destination remote device at the transmission time t1 by its own clock, the transmission destination remote device uses the transmission time t1 as the time of its own clock when receiving the downstream control packet, transmits an upstream control packet in which the transmission start time t2 is written at the transmission start time t2 by its own clock by the transmission duration Ta, the center device sets the time when receiving the upstream control packet as t3 by its own clock, obtains the transmission start time t2 written in the received upstream control packet, obtains the round trip time RTTa with the transmission destination remote device, and sets the time for receiving a packet from the transmission destination remote device as t3 by its own clock, and in this case, sets the transmission start time t2 to be written in the downstream control packet to t3−RTTa, and the optical switching device obtains the information on the transmission time t1, identification number, transmission start time t2, and transmission duration Ta from the downstream control packet, selects an outgoing port to which the transmission destination remote device corresponding to the identification number among outgoing ports of n downstream optical switching means having one incoming port and n outgoing ports of its own is connected, connects the selected outgoing port and incoming port for the time Tp or more, transmits the downstream control packet at the time t1+Tx by its own clock, measures the arrival time of the upstream packet b its own clock from the transmission destination remote device, sets the arrival time to t3* by its own clock, obtains other delay time Tz=t3*−t2, uses a port to which the transmission destination remote device corresponding to the identification number is connected as the incoming port of the upstream switching means of its own, sets the connection start time to t2+Tz, and sets the connection duration as at least Ta.

The optical access system according to the present embodiment is characterized in that, in addition to the above-mentioned configurations, identification No. ID of a destination remote device and a transmission request R of upstream control packet (R=1: request; R=0: no request) are written in a downstream control packet transmitted from the center device and the center device sets a request R to 1 at transmission time t1 by its own clock and a downstream control packet is transmitted.

The optical access network according to the present embodiment is characterized in that, in addition to the above-mentioned configurations, a GATE message defined by MPCP of IEEE 802.3ah is used as the downstream control packet and a REPORT message as the upstream control packet.

The optical access system according to the present embodiment is characterized in that in addition to the above configuration, in the event that the round-trip time RTTs to and from the optical switch module is found and the round-trip time RTTa to and from the destination remote device is found, the center device defines the size W of a time domain in which the upstream control packet from the destination remote device is received as W=Tw−RTTs, where RTTmax denotes the round-trip time of the farthest remote device in design, Tq denotes the length of the upstream control packet, and Tw=RTTmax+Tq, and the center device assumes that the start time of the time domain is the time (t1*+RTTs) in which RTTs is added to the time t1*, which is the time when the center device completes transmission of the control packet.

The optical access network according to the present embodiment is configured with one center device, multiple remote devices, and at least one optical switch module connected between the center device and the remote devices, and is an optical access network in which the center device transmits a downstream control packet containing the transmission time, an identification number of a destination remote device, transmission start time and transmission duration time to the optical switch module, the optical switch module transmits the downstream control packet to the destination remote device, and the destination remote device sets its clock to the transmission time when it receives the downstream control packet and transmits the upstream control packet with transmission start time written to the transmission start time to the optical switch module, and the optical switch module transmits the upstream control packet to the center device, and the center device decides the transmission start time of the packet after the center device receives the upstream control packet, wherein the center device finds the round-trip time to and from the destination remote device and that to and from the optical switch, respectively, the optical switch module sets its own clock to the transmission time, obtains the difference of both round-trip times and information, finds the delay time from when the connection start direction is transmitted to the upstream optical switching means of the optical switch module until the upstream control packet is transmitted, and assigns the value obtained by subtracting the delay time from the sum of the transmission start time and the difference as the connection start time, and the connection duration time is assigned at least to the transmission duration time.

The optical access network according to the present embodiment is configured with one center device, multiple remote devices, and at least one optical switch module connected between the center device and the remote devices, and is an optical access network in which the center device writes the downstream control packet transmission time t1, identification number of destination remote device, transmission start time t2, and transmission duration time Ta of the destination remote device in a control packet and transmits the downstream control packet to the destination remote device at the transmission time t1 by its own clock, the destination remote device sets the transmission time t1 as the time by its own clock when it receives the downstream control packet and transmits the upstream control packet with the transmission start time t2 written at the transmission start time t2 by its own clock for the transmission duration time Ta only, and the center device designates the time when it receives the upstream control packet as t3 by its own clock, acquires the transmission start time t2 written in the received upstream control packet, finds the round-trip time RTTa to and from the destination remote device as RTTa=t3−t2, and sets the transmission start time t2 to be written to the downstream control packet as t3−RTTa when the time at which the packet from the destination remote device is desired to be received is set to t3 by its own clock after RTTa is found, wherein the optical switch module is added as the destination of the downstream control packet, the optical switch sets the transmission time t1 to its own clock when it detects the downstream control packet, and in particular, in the event that the downstream control packet is addressed to the optical switch itself, the optical switch sets the transmission time t1 to its own clock when it receives the downstream control packet, and transmits the upstream control packet with the transmission start time t2 written to the transmission start time t2 by its own clock for the transmission duration time Ta only, and the center device finds the round-trip time RTTs to and from the optical switch module by a method to find the round trip time RTTa to and from the destination remote device, the optical switch module acquires the value of other delay time Tz=RTTa−RTTs from the center device or the values of RTTa and RTTs which enable it to calculate other delay time TZ, acquires the transmission start time t2 and transmission duration time Ta from the downstream control packet from the center device to the destination remote device, issues a connection start direction to the upstream optical switching means in the optical switch module to set the delay time from the optical switch module corresponding to the identification number to transmission as Ty1, selects a port to which the destination remote device corresponding to the identification number as its own incoming port, sets the connection start time as t2+Tz−Ty1, and sets the connection duration time at least as Ta.

The optical access network according to the present embodiment is characterized in that, in addition to the above-mentioned configurations, identification No. ID of a destination remote device and a transmission request R of upstream control packet (R=1: request; R=0: no request) are written in a downstream control packet transmitted from the center device and the center device sets a request R to 1 at transmission time t1 by its own clock and a downstream control packet is transmitted.

The optical access network according to the present embodiment is configured with one center device, multiple remote devices, and at least one optical switch module connected between the center device and the remote devices, and is an optical access network in which the center device writes the downstream control packet transmission time t1, identification number of destination remote device, transmission start time t2, and transmission duration time Ta of the destination remote device in a control packet and transmits the downstream control packet to the destination remote device at the transmission time t1 by its own clock, the destination remote device sets the transmission time t1 as the time by its own clock when it receives the downstream control packet and transmits the upstream control packet with the transmission start time t2 written at the transmission start time t2 by its own clock for the transmission duration time Ta only, and the center device designates the time when it receives the upstream control packet as t3 by its own clock, acquires the transmission start time t2 written in the received upstream control packet, finds the round-trip time RTTa to and from the destination remote device as RTTa=t3−t2, and sets the transmission start time t2 to be written to the downstream control packet as t3−RTTa when the time at which the packet from the destination remote device is desired to be received is set to t3 by its own clock after RTTa is found, wherein the optical switch module acquires the transmission time t1, identification number, transmission start time T2, transmission duration time Ta, and downstream control packet length from the downstream control packet, sets the time of its own clock to the transmission time t1, designates an outgoing port of the downstream optical switching means as a port corresponding to the identification number, connects the downstream control packet length Tp only, measures the arrival time of the upstream control packet from the destination remote device of the optical switch module by the outgoing port of the upstream optical switching means, finds the delay time from the incoming port of the upstream optical switching means to the point to measure the arrival the arrival time, sets other delay time as (arrival time−transmission start time t2), sets the connection start time of the upstream optical switching means of the optical switch module as (transmission start time t2+other delay time−delay time), and sets the connection duration time at least as transmission duration time Ta.

The optical access network according to the present embodiment is configured with one center device, multiple remote devices, and multiple optical switch modules connected between the center device and the remote devices, and is an optical access network in which the center device writes the downstream control packet transmission time t1, identification number of destination remote device, transmission start time t2, and transmission duration time Ta of the destination remote device in a control packet and transmits the downstream control packet to the destination remote device at the transmission time t1 by its own clock, the destination remote device sets the transmission time t1 as the time by its own clock when it receives the downstream control packet and transmits the upstream control packet with the transmission start time t2 written at the transmission start time t2 by its own clock for the transmission duration time Ta only, and the center device designates the time when it receives the upstream control packet as t3 by its own clock, acquires the transmission start time t2 written in the received upstream control packet, finds the round-trip time RTTa to and from the destination remote device as RTTa=t3−t2, and sets the transmission start time t2 to be written to the downstream control packet as t3−RTTa when the time at which the packet from the destination remote device is desired to be received is set to t3 by its own clock after RTTa is found, wherein the center device transmits a downstream control packet 1 when the downstream control packet and the upstream control packet when the round-trip time RTTa to and from the destination remote device is found at first are designated as the downstream control packet 1 and the upstream control packet 1, respectively, receives the upstream control packet 1 from the destination remote device, and the optical switch module acquires information on identification number, transmission time t1, transmission start time t2, and transmission duration time Ta from the downstream control packet 1, acquires the packet length Tp of the downstream control packet 1, sets the transmission time t1 to the time of its own clock, chooses outgoing ports to which the destination remote device corresponding to the identification number is connected from its own one incoming port and n pieces of outgoing ports of the downstream optical switching means, connects the chosen outgoing ports to the incoming port for more than the time Tp, transmits the downstream control packet 1 at time t1+Tx by its own clock, chooses incoming ports to which a destination remote device corresponding to the identification number is connected from n pieces of its own incoming ports and one outgoing port of the optical switching means for the upstream control packet 1 from the destination remote device which has received the downstream control packet 1, sets the connection start time of the chosen incoming ports and outgoing port as time t2+Tx by its own clock, sets the connection duration time to Tw(=RTTmax+T1) of the sum of round-trip time RTTmax to and from the farthest design remote device from the center device and the downstream control packet length T1, measures the arrival time of the upstream control packet 1 from the destination remote device at its own outgoing port of the upstream optical switch means, sets the arrival time to t3* by its own clock, sets the delay time from the incoming port of the downstream optical switching means to the point to measure the arrival time t3, and finds other delay time Tz=t3−t2, and the optical switch module acquires the transmission start time t2 and the transmission duration time Ta from the downstream control packet from the center device to the destination remote device, chooses a port to which the destination remote device corresponding to the identification number as its own incoming port of the upstream switching means, sets the connection start time as t2+Tz−Ty2, and sets the connection duration time at least as Ta.

The optical access network according to the present embodiment is characterized in that, in addition to the above-mentioned configurations, identification No. ID of a destination remote device and a transmission request R of upstream control packet (R=1: request; R=0: no request) are written in a downstream control packet transmitted from the center device and the center device sets a request R to 1 at transmission time t1 by its own clock and a downstream control packet is transmitted.

The optical access network according to the present embodiment is configured with one center device, multiple remote devices, and at least one optical switch module connected between the center device and the remote devices, and is an optical access network in which the center device transmits a downstream control packet in which the transmission time, identification number of the destination remote device, transmission start time, and transmission duration time to the optical switch module, the optical switch module transmits the downstream control packet to the destination remote device, the destination remote device sets its own clock to the transmission time when it receives the downstream control packet, transmits the upstream control packet in which the transmission start time is written at the transmission start time to the optical device, the optical switch module transmits the upstream control packet to the center device, and the center device decides the transmission start time of the packet of the remote device after it receives the upstream control packet, wherein the optical switch module acquires the transmission time, identification number, transmission start time, transmission duration time, and packet length of the downstream control packet, sets the time of its own clock to the transmission time, connects outgoing ports to incoming ports to which the destination remote device is connected and which correspond to the identification number for the downstream optical switching means for time exceeding the downstream control packet length, designates the arrival time of the upstream packet from the destination remote device as the arrival time measured by its own clock, finds other delay time by subtracting the transmission start time from the arrival time, chooses a port to which the destination remote device corresponding to the identification number as its own incoming port of the upstream switching means, designates the connection start time as the sum of the transmission start time and other delay time, and sets the connection duration time at least as the transmission connection time.

The optical access network according to the present embodiment is configured with one center device, multiple remote devices, and at least one optical switch module connected between the center device and the remote devices, and is an optical access network in which the center device writes the downstream control packet transmission time t1, identification number of destination remote device, transmission start time t2, and transmission duration time Ta of the destination remote device in a control packet and transmits the downstream control packet to the destination remote device at the transmission time t1 by its own clock, the destination remote device sets the transmission time t1 as the time by its own clock when it receives the downstream control packet and transmits the upstream control packet with the transmission start time t2 written at the transmission start time t2 by its own clock for the transmission duration time Ta only, and the center device designates the time when it receives the upstream control packet as t3 by its own clock, acquires the transmission start time t2 written in the received upstream control packet, finds the round-trip time RTTa to and from the destination remote device as RTTa=t3−t2, and sets the transmission start time t2 to be written to the downstream control packet as t3−RTTa when the time at which the packet from the destination remote device is desired to be received is set to t3 by its own clock after RTTa is found, wherein the optical switch module acquires information on identification number, transmission time t1, transmission start time t2, and transmission duration time Ta from the downstream control packet 1, acquires the packet length Tp of the downstream control packet 1, sets the transmission time t1 to the time of its own clock, chooses outgoing ports to which the destination remote device corresponding to the identification number is connected from its own one incoming port and n pieces of outgoing ports of the downstream optical switching means, connects the chosen outgoing ports to the incoming port for more than the time Tp, transmits the downstream control packet 1 at time t1+Tx by its own clock, for the upstream packet from the destination remote device which receives the downstream control packet, measures the arrival time of the upstream packet from the destination remote device at its own incoming port of the upstream optical switching means by its own clock, sets the arrival time to t3* by its own clock, finds other delay time Tz=t3*−t2, sets the port connected to the destination remote device corresponding to the identification number as its own incoming port of the upstream switching means, sets the connection start time as t2+Tz, and sets the connection duration time at least as Ta.

The optical access network according to the present embodiment is characterized in that, in addition to the above-mentioned configurations, identification No. ID of a destination remote device and a transmission request R of upstream control packet (R=1: request; R=0: no request) are written in a downstream control packet transmitted from the center device and the center device sets a request R to 1 at transmission time t1 by its own clock and a downstream control packet is transmitted.

The optical access network according to the present embodiment is characterized in that, in addition to the above-mentioned configurations, a GATE message defined by MPCP of IEEE 802.3ah is used as the downstream control packet and a REPORT message as the upstream control packet.

The optical access system according to the present embodiment is characterized in that in addition to the above configuration, in the event that the round-trip time RTTs to and from the optical switch module is found and the round-trip time RTTa to and from the destination remote device is found, the center device defines the size W of a time domain in which the upstream control packet from the destination remote device is received as W=Tw−RTTs, where RTTmax denotes the round-trip time of the farthest remote device in design, Tq denotes the length of the upstream control packet, and Tw=RTTmax+Tq, and the center device assumes that the start time of the time domain is the time (t1*+RTTs) in which RTTs is added to the time t1*, which is the time when the center device completes transmission of the control packet.

A program according to the present embodiment is a program that allows a computer of an optical access network configured into a tree-shaped with one center device, multiple remote devices, and at least one optical device connected between the center device and the remote devices to execute processing in which the center device transmits a downstream control packet containing the transmission time, an identification number of a destination remote device, transmission start time and transmission duration time to the optical switch module, processing in that the optical switch module transmits the downstream control packet to the destination remote device, and processing in which the destination remote device sets its clock to the transmission time when it receives the downstream control packet and transmits the upstream control packet with transmission start time written to the transmission start time to the optical switch module, processing in which the optical switch module transmits the upstream control packet to the center device, and processing in which the center device decides the transmission start time of the packet after the center device receives the upstream control packet, wherein processing in which the center device finds the round-trip time to and from the destination remote device and that to and from the optical switch, respectively, and processing in which the optical switch module sets its own clock to the transmission time, obtains the difference of both round-trip times and information, finds the delay time from when the connection start direction is transmitted to the upstream optical switching means of the optical switch module until the upstream control packet is transmitted, and assigns the value obtained by subtracting the delay time from the sum of the transmission start time and the difference as the connection start time, and the connection duration time is assigned at least to the transmission duration time.

The program according to the present embodiment is a program that allows a computer of an optical access network configured into a tree-shaped with one center device, multiple remote devices, and at least one optical device connected between the center device and the remote devices to execute processing in which the center device writes the downstream control packet transmission time t1, identification number of destination remote device, transmission start time t2, and transmission duration time Ta of the destination remote device in a control packet and transmits the downstream control packet to the destination remote device at the transmission time t1 by its own clock, processing in which the destination remote device sets the transmission time t1 as the time by its own clock when it receives the downstream control packet and transmits the upstream control packet with the transmission start time t2 written at the transmission start time t2 by its own clock for the transmission duration time Ta only, and processing in which the center device designates the time when it receives the upstream control packet as t3 by its own clock, acquires the transmission start time t2 written in the received upstream control packet, finds the round-trip time RTTa to and from the destination remote device as RTTa=t3−t2, and sets the transmission start time t2 to be written to the downstream control packet as t3−RTTa when the time at which the packet from the destination remote device is desired to be received is set to t3 by its own clock after RTTa is found, wherein the computer is allowed to execute processing in which an optical switch module is added as the destination of the downstream control packet, the optical switch sets the transmission time t1 to its own clock when it detects the downstream control packet, and in particular, in the event that the downstream control packet is addressed to the optical switch itself, the optical switch sets the transmission time t1 to its own clock when it receives the downstream control packet, and transmits the upstream control packet with the transmission start time t2 written to the transmission start time t2 by its own clock for the transmission duration time Ta only, processing in which the center device finds the round-trip time RTTs to and from the optical switch module by a method to find the round trip time RTTa to and from the destination remote device, and processing in which the optical switch module acquires the value of other delay time Tz=RTTa−RTTs from the center device or the values of RTTa and RTTs which enable it to calculate other delay time TZ, acquires the transmission start time t2 and transmission duration time Ta from the downstream control packet from the center device to the destination remote device, issues a connection start direction to the upstream optical switching means in the optical switch module to set the delay time from the optical switch module corresponding to the identification number to transmission as Ty1, selects a port to which the destination remote device corresponding to the identification number as its own incoming port, sets the connection start time as t2+Tz−Ty1, and sets the connection duration time at least as Ta.

The program according to the present embodiment is characterized in that, in addition to the above-mentioned configurations, the computer is allowed to execute processing in that identification No. ID of a destination remote device and a transmission request R of upstream control packet (R=1: request; R=0: no request) are written in a downstream control packet transmitted from the center device and the center device sets a request R to 1 at transmission time t1 by its own clock and a downstream control packet is transmitted.

The program according to the present embodiment is a program that allows a computer of an optical access network configured into a tree-shaped with one center device, multiple remote devices, and at least one optical switch module connected between the center device and the remote devices, to execute processing in which the center device writes the downstream control packet transmission time t1, identification number of destination remote device, transmission start time t2, and transmission duration time Ta of the destination remote device in a control packet and transmits the downstream control packet to the destination remote device at the transmission time t1 by its own clock, processing in which the destination remote device sets the transmission time t1 as the time by its own clock when it receives the downstream control packet and transmits the upstream control packet with the transmission start time t2 written at the transmission start time t2 by its own clock for the transmission duration time Ta only, and processing in which the center device designates the time when it receives the upstream control packet as t3 by its own clock, acquires the transmission start time t2 written in the received upstream control packet, finds the round-trip time RTTa to and from the destination remote device as RTTa=t3−t2, and sets the transmission start time t2 to be written to the downstream control packet as t3−RTTa when the time at which the packet from the destination remote device is desired to be received is set to t3 by its own clock after RTTa is found, wherein the computer is allowed to execute processing in which the optical switch module acquires the transmission time t1, identification number, transmission start time t2, transmission duration time Ta, and downstream control packet length from the downstream control packet, sets the time of its own clock to the transmission time t1, designates an outgoing port of the downstream optical switching means as a port corresponding to the identification number, connects the downstream control packet length Tp only, measures the arrival time of the upstream control packet from the destination remote device of the optical switch module by the outgoing port of the upstream optical switching means, finds the delay time from the incoming port of the upstream optical switching means to the point to measure the arrival the arrival time, sets other delay time as (arrival time−transmission start time t2), sets the connection start time of the upstream optical switching means of the optical switch module as (transmission start time t2+other delay time−delay time), and sets the connection duration time at least as transmission duration time Ta.

The program according to the present embodiment is a program that allows a computer of an optical access network configured into a tree-shaped with one center device, multiple remote devices, and at least one optical switch module connected between the center device and the remote devices to execute processing in which the center device writes the downstream control packet transmission time t1, identification number of destination remote device, transmission start time t2, and transmission duration time Ta of the destination remote device in a control packet and transmits the downstream control packet to the destination remote device at the transmission time t1 by its own clock, processing in which the destination remote device sets the transmission time t1 as the time by its own clock when it receives the downstream control packet and transmits the upstream control packet with the transmission start time t2 written at the transmission start time t2 by its own clock for the transmission duration time Ta only, and processing in which the center device designates the time when it receives the upstream control packet as t3 by its own clock, acquires the transmission start time t2 written in the received upstream control packet, finds the round-trip time RTTa to and from the destination remote device as RTTa=t3−t2, and sets the transmission start time t2 to be written to the downstream control packet as t3−RTTa when the time at which the packet from the destination remote device is desired to be received is set to t3 by its own clock after RTTa is found, wherein the computer is allowed to execute processing in which the center device transmits a downstream control packet 1 when the downstream control packet and the upstream control packet when the round-trip time RTTa to and from the destination remote device is found at first are designated as the downstream control packet 1 and the upstream control packet 1, respectively, receives the upstream control packet 1 from the destination remote device, and the optical switch module acquires information on identification number, transmission time t1, transmission start time t2, and transmission duration time Ta from the downstream control packet 1, acquires the packet length Tp of the downstream control packet 1, sets the transmission time t1 to the time of its own clock, chooses outgoing ports to which the destination remote device corresponding to the identification number is connected from its own one incoming port and n pieces of outgoing ports of the downstream optical switching means, connects the chosen outgoing ports to the incoming port for more than the time Tp, transmits the downstream control packet 1 at time t1+Tx by its own clock, chooses incoming ports to which a destination remote device corresponding to the identification number is connected from n pieces of its own incoming ports and one outgoing port of the optical switching means for the upstream control packet 1 from the destination remote device which has received the downstream control packet 1, sets the connection start time of the chosen incoming ports and outgoing port as time t2+Tx by its own clock, sets the connection duration time to Tw (=RTTmax+T1) of the sum of round-trip time RTTmax to and from the farthest design remote device from the center device and the downstream control packet length T1, measures the arrival time of the upstream control packet 1 from the destination remote device at its own outgoing port of the upstream optical switch means, sets the arrival time to t3* by its own clock, sets the delay time from the incoming port of the downstream optical switching means to the point to measure the arrival time t3, and finds other delay time Tz=t3−t2, and the optical switch module acquires the transmission start time t2 and the transmission duration time Ta from the downstream control packet from the center device to the destination remote device, chooses a port to which the destination remote device corresponding to the identification number as its own incoming port of the upstream switching means, sets the connection start time as t2+Tz−Ty2, and sets the connection duration time at least as Ta.

The program according to the present embodiment is characterized in that, in addition to the above-mentioned configurations, the computer is allowed to execute processing in that identification No. ID of a destination remote device and a transmission request R of upstream control packet (R=1: request; R=0: no request) are written in a downstream control packet transmitted from the center device and the center device sets a request R to 1 at transmission time t1 by its own clock and a downstream control packet is transmitted.

The program according to the present embodiment is a program that allows a computer of an optical access network configured into a tree-shaped with one center device, multiple remote devices, and at least one optical switch module connected between the center device and the remote devices to execute processing in which the center device transmits a downstream control packet in which the transmission time, identification number of the destination remote device, transmission start time, and transmission duration time to the optical switch module, processing in which the optical switch module transmits the downstream control packet to the destination remote device, the destination remote device sets its own clock to the transmission time when it receives the downstream control packet, transmits the upstream control packet in which the transmission start time is written at the transmission start time to the optical device, processing in which the optical switch module transmits the upstream control packet to the center device, and processing in which the center device decides the transmission start time of the packet of the remote device after it receives the upstream control packet, wherein the computer is allowed to execute processing in which the optical switch module acquires the transmission time, identification number, transmission start time, transmission duration time, and packet length of the downstream control packet, sets the time of its own clock to the transmission time, connects outgoing ports to incoming ports to which the destination remote device is connected and which correspond to the identification number for the downstream optical switching means for time exceeding the downstream control packet length, designates the arrival time of the upstream packet from the destination remote device as the arrival time measured by its own clock, finds other delay time by subtracting the transmission start time from the arrival time, chooses a port to which the destination remote device corresponding to the identification number as its own incoming port of the upstream switching means, designates the connection start time as the sum of the transmission start time and other delay time, and sets the connection duration time at least as the transmission connection time.

The program according to the present embodiment is a program that allows a computer of an optical access network configured into a tree-shaped with one center device, multiple remote devices, and at least one optical switch module connected between the center device and the remote devices to execute processing in which the center device writes the downstream control packet transmission time t1, identification number of destination remote device, transmission start time t2, and transmission duration time Ta of the destination remote device in a control packet and transmits the downstream control packet to the destination remote device at the transmission time t1 by its own clock, processing in which destination remote device sets the transmission time t1 as the time by its own clock when it receives the downstream control packet and transmits the upstream control packet with the transmission start time t2 written at the transmission start time t2 by its own clock for the transmission duration time Ta only, and processing in which the center device designates the time when it receives the upstream control packet as t3 by its own clock, acquires the transmission start time t2 written in the received upstream control packet, finds the round-trip time RTTa to and from the destination remote device as RTTa=t3−t2, and sets the transmission start time t2 to be written to the downstream control packet as t3−RTTa when the time at which the packet from the destination remote device is desired to be received is set to t3 by its own clock after RTTa is found, wherein the computer is allowed to execute processing in which the optical switch module acquires information on identification number, transmission time t1, transmission start time t2, and transmission duration time Ta from the downstream control packet 1, acquires the packet length Tp of the downstream control packet 1, sets the transmission time t1 to the time of its own clock, chooses outgoing ports to which the destination remote device corresponding to the identification number is connected from its own one incoming port and n pieces of outgoing ports of the downstream optical switching means, connects the chosen outgoing ports to the incoming port for more than the time Tp, transmits the downstream control packet 1 at time t1+Tx by its own clock, for the upstream packet from the destination remote device which receives the downstream control packet measures the arrival time of the upstream packet from the destination remote device at its own incoming port of the upstream optical switching means by its own clock, sets the arrival time to t3* by its own clock, finds other relay time Tz=t3*−t2, sets the port connected to the destination remote device corresponding to the identification number as its own incoming port of the upstream switching means, sets the connection start time as t2+Tz, and sets the connection duration time at least as Ta.

The program according to the present embodiment is characterized in that, in addition to the above-mentioned configurations, the computer is allowed to execute processing in that identification No. ID of a destination remote device and a transmission request R or upstream control packet (R=1: request; R=0: no request) are written in a downstream control packet transmitted from the center device and the center device sets a request R to 1 at transmission time t1 by its own clock and a downstream control packet is transmitted.

The program according to the present embodiment is characterized in that, in addition to the above-mentioned configurations, a GATE message defined by MPCP of IEEE 802.3ah is used as the downstream control packet and a REPORT message as the upstream control packet.

The program according to the present embodiment is characterized in that in addition to the above configuration, in the event that the round-trip time RTTs to and from the optical switch module is found and the round-trip time RTTa to and from the destination remote device is found, the center device defines the size W of a time domain in which the upstream control packet from the destination remote device is receives as W=Tw−RTTs, where RTTmax denotes the round-trip time of the farthest remote device in design, Tq denotes the length of the upstream control packet, and Tw=RTTmax+Tq, and the center device assumes that the start time of the time domain is the time (t1*+RTTs) in which RTTs is added to the time t1*, which is the time when the center device completes transmission of the control packet.

A recording medium according to the present embodiment is a recording medium which records a program that allows a computer of an optical access network configured into a tree-shaped with one center device, multiple remote devices, and at least one optical device connected between the center device and the remote devices to execute processing in which the center device transmits a downstream control packet containing the transmission time, an identification number of a destination remote device, transmission start time and transmission duration time to the optical switch module, processing in that the optical switch module transmits the downstream control packet to the destination remote device, and processing in which the destination remote device sets its clock to the transmission time when it receives the downstream control packet and transmits the upstream control packet with transmission start time written to the transmission start time to the optical switch module, processing in which the optical switch module transmits the upstream control packet to the center device, and processing in which the center device decides the transmission start time of the packet after the center device receives the upstream control packet, wherein the recording medium records a program that allows a computer to execute processing in which the center device finds the round-trip time to and from the destination remote device and that to and from the optical switch, respectively, and processing in which the optical switch module sets its own clock to the transmission time, obtains the difference of both round-trip times and information, finds the delay time from when the connection start direction is transmitted to the upstream optical switching means of the optical switch module until the upstream control packet is transmitted, and assigns the value obtained by subtracting the delay time from the sum of the transmission start time and the difference as the connection start time, and the connection duration time is assigned at least to the transmission duration time.

The recording medium according to the present embodiment is a recording medium which records a program that allows a computer of an optical access network configured into a tree-shaped with one center device, multiple remote devices, and at least one optical device connected between the center device and the remote devices to execute processing in which the center device writes the downstream control packet transmission time t1, identification number of destination remote device, transmission start time t2, and transmission duration time Ta of the destination remote device in a control packet and transmits the downstream control packet to the destination remote device at the transmission time t1 by its own clock, processing in which the destination remote device sets the transmission time t1 as the time by its own clock when it receives the downstream control packet and transmits the upstream control packet with the transmission start time t2 written at the transmission start time t2 by its own clock for the transmission duration time Ta only, and processing in which the center device designates the time when it receives the upstream control packet as t3 by its own clock, acquires the transmission start time t2 written in the received upstream control packet, finds the round-trip time RTTa to and from the destination remote device as RTTa=t3−t2, and sets the transmission start time t2 to be written to the downstream control packet as t3−RTTa when the time at which the packet from the destination remote device is desired to be received is set to t3 by its own clock after RTTa is found, wherein the recording medium records a program that allows a computer to execute processing in which an optical switch module is added as the destination of the downstream control packet, the optical switch sets the transmission time t1 to its own clock when it detects the downstream control packet, and in particular, in the event that the downstream control packet is addressed to the optical switch itself, the optical switch sets the transmission time t1 to its own clock when it receives the downstream control packet, and transmits the upstream control packet with the transmission start time t2 written to the transmission start time t2 by its own clock for the transmission duration time Ta only, processing in which the center device finds the round-trip time RTTs to and from the optical switch module by a method to find the round trip time RTTa to and from the destination remote device, and processing in which the optical switch module acquires the value of other delay time Tz=RTTa−RTTs from the center device or the values of RTTa and RTTs which enable it to calculate other delay time TZ, acquires the transmission start time t2 and transmission duration time Ta from the downstream control packet from the center device to the destination remote device, issues a connection start direction to the upstream optical switching means in the optical switch module to set the delay time from the optical switch module corresponding to the identification number to transmission as Ty1, selects a port to which the destination remote device corresponding to the identification number as its own incoming port, sets the connection start time as t2+Tz−Ty1, and sets the connection duration time at least as Ta.

The recording medium according to the present embodiment is characterized in that the recording medium records a program which allows a computer to execute processing in which identification No. ID of a destination remote device and a transmission request R of upstream control packet (R=1: request; R=0: no request) are written in a downstream control packet transmitted from the center device and the center device sets a request R to 1 at transmission time t1 by its own clock and a downstream control packet is transmitted, in addition to the above-mentioned configurations.

The recording medium according to the present embodiment is a recording medium that records a program which allows a computer of an optical access network configured into a tree-shaped with one center device, multiple remote devices, and at least one optical switch module connected between the center device and the remote devices, to execute processing in which the center device writes the downstream control packet transmission time t1, identification number of destination remote device, transmission start time t2, and transmission duration time Ta of the destination remote device in a control packet and transmits the downstream control packet to the destination remote device at the transmission time t1 by its own clock, processing in which the destination remote device sets the transmission time t1 as the time by its own clock when it receives the downstream control packet and transmits the upstream control packet with the transmission start time t2 written at the transmission start time t2 by its own clock for the transmission duration time Ta only, and processing in which the center device designates the time when it receives the upstream control packet as t3 by its own clock, acquires the transmission start time t2 written in the received upstream control packet, finds the round-trip time RTTa to and from the destination remote device as RTTa=t3−t2, and sets the transmission start time t2 to be written to the downstream control packet as t3−RTTa when the time at which the packet from the destination remote device is desired to be received is set to t3 by its own clock after RTTa is found, wherein the recording medium records a program that allows a computer to execute processing in which the optical switch module acquires the transmission time t1, identification number, transmission start time t2, transmission duration time Ta, and downstream control packet length from the downstream control packet, sets the time of its own clock to the transmission time t1, designates an outgoing port of the downstream optical switching means as a port corresponding to the identification number, connects the downstream control packet length Tp only, measures the arrival time of the upstream control packet from the destination remote device of the optical switch module by the outgoing port of the upstream optical switching means, finds the delay time from the incoming port of the upstream optical switching means to the point to measure the arrival the arrival time, sets other delay time as (arrival time−transmission start time t2), sets the connection start time of the upstream optical switching means of the optical switch module as (transmission start time t2+other delay time−delay time), and sets the connection duration time at least as transmission duration time Ta.

The recording medium according to the present embodiment is a recording medium that records a program which allows a computer of an optical access network configured into a tree-shaped with one center device, multiple remote devices, and at least one optical switch module connected between the center device and the remote devices to execute processing in which the center device writes the downstream control packet transmission time t1, identification number of destination remote device, transmission start time t2, and transmission duration time Ta of the destination remote device in a control packet and transmits the downstream control packet to the destination remote device at the transmission time t1 by its own clock, processing in which the destination remote device sets the transmission time t1 as the time by its own clock when it receives the downstream control packet and transmits the upstream control packet with the transmission start time t2 written at the transmission start time t2 by its own clock for the transmission duration time Ta only, and processing in which the center device designates the time when it receives the upstream control packet as t3 by its own clock, acquires the transmission start time t2 written in the received upstream control packet, finds the round-trip time RTTa to and from the destination remote device as RTTa=t3−t2, and sets the transmission start time t2 to be written to the downstream control packet as t3−RTTa when the time at which the packet from the destination remote device is desired to be received is set to t3 by its own clock after RTTa is found, wherein the recording medium records a program that allows a computer to execute processing in which the center device transmits a downstream control packet 1 when the downstream control packet and the upstream control packet when the round-trip time RTTa to and from the destination remote device is found at first are designated as the downstream control packet 1 and the upstream control packet 1, respectively, receives the upstream control packet 1 from the destination remote device, and the optical switch module acquires information on identification number, transmission time t1, transmission start time t2, and transmission duration time Ta from the downstream control packet 1, acquires the packet length Tp of the downstream control packet 1, sets the transmission time t1 to the time of its own clock, chooses outgoing ports to which the destination remote device corresponding to the identification number is connected from its own one incoming port and n pieces of outgoing ports of the downstream optical switching means, connects the chosen outgoing ports to the incoming port for more than the time Tp, transmits the downstream control packet 1 at time t1+Tx by its own clock, chooses incoming ports to which a destination remote device corresponding to the identification number is connected from n pieces of its own incoming ports and one outgoing port of the optical switching means for the upstream control packet 1 from the destination remote device which has received the downstream control packet 1, sets the connection start time of the chosen incoming ports and outgoing port as time t2+Tx by its own clock, sets the connection duration time to Tw (=RTTmax+T1) of the sum of round-trip time RTTmax to and from the farthest design remote device from the center device and the downstream control packet length T1, measures the arrival time of the upstream control packet 1 from the destination remote device at its own outgoing port of the upstream optical switch means, sets the arrival time to t3* by its own clock, sets the delay time from the incoming port of the downstream optical switching means to the point to measure the arrival time t3, and finds other delay time Tz=t3−t2, and the optical switch module acquires the transmission start time t2 and the transmission duration time Ta from the downstream control packet from the center device to the destination remote device, chooses a port to which the destination remote device corresponding to the identification number as its own incoming port of the upstream switching means, sets the connection start time as t2+Tz−Ty2, and sets the connection duration time at least as Ta.

The recording medium according to the present embodiment is characterized in that the recording medium records a program which allows a computer to execute processing in which identification No. ID of a destination remote device and a transmission request R of upstream control packet (R=1: request; R=0: no request) are written in a downstream control packet transmitted from the center device and the center device sets a request R to 1 at transmission time t1 by its own clock and a downstream control packet is transmitted, in addition to the above-mentioned configurations.

The recording medium according to the present embodiment is a recording medium that records a program which allows a computer of an optical access network configured into a tree-shaped with one center device, multiple remote devices, and at least one optical switch module connected between the center device and the remote devices to execute processing in which the center device transmits a downstream control packet in which the transmission time, identification number of the destination remote device, transmission start time, and transmission duration time to the optical switch module, processing in which the optical switch module transmits the downstream control packet to the destination remote device, the destination remote device sets its own clock to the transmission time when it receives the downstream control packet, transmits the upstream control packet in which the transmission start time is written at the transmission start time to the optical device, processing in which the optical switch module transmits the upstream control packet to the center device, and processing in which the center device decides the transmission start time of the packet of the remote device after it receives the upstream control packet, wherein the recording medium records a program that allows a computer to execute processing in which the optical switch module acquires the transmission time, identification number, transmission start time, transmission duration time, and packet length of the downstream control packet, sets the time of its own clock to the transmission time, connects outgoing ports to incoming ports to which the destination remote device is connected and which correspond to the identification number for the downstream optical switching means for time exceeding the downstream control packet length, designates the arrival time of the upstream packet from the destination remote device as the arrival time measured by its own clock, finds other delay time by subtracting the transmission start time from the arrival time, chooses a port to which the destination remote device corresponding to the identification number as its own incoming port of the upstream switching means, designates the connection start time as the sum of the transmission start time and other delay time, and sets the connection duration time at least as the transmission connection time.

The recording medium according to the present embodiment is a recording medium that records a program which allows a computer of an optical access network configured into a tree-shaped with one center device, multiple remote devices, and at least one optical switch module connected between the center device and the remote devices to execute processing in which the center device writes the downstream control packet transmission time t1, identification number of destination remote device, transmission start time t2, and transmission duration time Ta of the destination remote device in a control packet and transmits the downstream control packet to the destination remote device at the transmission time t1 by its own clock, processing in which the destination remote device sets the transmission time t1 as the time by its own clock when it receives the downstream control packet and transmits the upstream control packet with the transmission start time t2 written at the transmission start time t2 by its own clock for the transmission duration time Ta only, and processing in which the center device designates the time when it receives the upstream control packet as t3 by its own clock, acquires the transmission start time t2 written in the received upstream control packet, finds the round-trip time RTTa to and from the destination remote device as RTTa=t3−t2, and sets the transmission start time t2 to be written to the downstream control packet as t3−RTTa when the time at which the packet from the destination remote device is desired to be received is set to t3 by its own clock after RTTa is found, wherein the recording medium records a program that allows a computer to execute processing in which the optical switch module acquires information on identification number, transmission time t1, transmission start time t2, and transmission duration time Ta from the downstream control packet 1, acquires the packet length Tp of the downstream control packet 1, sets the transmission time t1 to the time of its own clock, chooses outgoing ports to which the destination remote device corresponding to the identification number is connected from its own one incoming port and n pieces of outgoing ports of the downstream optical switching means, connects the chosen outgoing ports to the incoming port for more than the time Tp, transmits the downstream control packet 1 at time t1+Tx by its own clock, for the upstream packet from the destination remote device which receives the downstream control packet, measures the arrival time of the upstream packet from the destination remote device at its own incoming port of the upstream optical switching means by its own clock, sets the arrival time to t3* by its own clock, finds other delay time Tz=t3*−t2, sets the port connected to the destination remote device corresponding to the identification number as its own incoming port of the upstream switching means, sets the connection start time as t2+Tz, and sets the connection duration time at least as Ta.

The recording medium according to the present embodiment is characterized in that the recording medium records a program which allows a computer to execute processing in which identification No. ID of a destination remote device and a transmission request R of upstream control packet (R=1: request; R=0: no request) are written in a downstream control packet transmitted from the center device and the center device sets a request R to 1 at transmission time t1 by its own clock and a downstream control packet is transmitted, in addition to the above-mentioned configurations.

The recording medium according to the present embodiment is characterized in that, in addition to the above-mentioned configurations, a GATE message defined by MPCP of IEEE 802.3ah is used as the downstream control packet and a REPORT message as the upstream control packet.

The recording medium according to the present embodiment is characterized in that in addition to the above configuration, in the event that the round-trip time RTTs to and from the optical switch module is found and the round-trip time RTTa to and from the destination remote device is found, the center device defines the size W of a time domain in which the upstream control packet from the destination remote device is received as W=Tw−RTTs, where RTTmax denotes the round-trip time of the farthest remote device in design, Tq denotes the length of the upstream control packet, and Tw=RTTmax+Tq, and the center device assumes that the start time of the time domain is the time (t1*+RTTs) in which RTTs is added to the time t1*, which is the time when the center device completes transmission of the control packet.

A synchronizing method in the optical access network according to the present embodiment is characterized in that in addition to the above configurations, where there are n (n is an integer of 2 or greater) pieces or more of the optical switch modules, optional (n−1) pieces or less of optical switches are replaced with optical splitters.

An optical switch according to the present embodiment is characterized in that in addition to the above-mentioned configurations, where there are n (n is an integer of 2 or greater) pieces or more of optical switch modules, optional (n−1) pieces or less of optical switches are replaced with optical splitters.

A center device according to the present embodiment is characterized in that in addition to the above configurations, where there are n (n is an integer of 2 or greater) pieces or more of the optical switch modules, optional (n−1) pieces or less of optical switches are replaced with optical splitters.

A remote device according to the present embodiment is characterized in that in addition to the above configurations, where there are n (n is an integer of 2 or greater) pieces or more of the optical switch modules, optional (n−1) pieces or less of optical switches are replaced with optical splitters.

An optical access system according to the present embodiment is characterized in that in addition to the above configurations, where there are n (n is an integer of 2 or greater) pieces or more of the optical switch modules, optional (n−1) pieces or less of optical switches are replaced with optical splitters.

An optical access system according to the present embodiment is characterized in that in addition to the above configurations, where there are n (n is an integer of 2 or greater) pieces or more of the optical switch modules, optional (n−1) pieces or less of optical switches are replaced with optical splitters.

A program according to the present embodiment is characterized in that in addition to the above configurations, where there are n (n is an integer of 2 or greater) pieces or more of the optical switch modules, optional (n−1) pieces or less of optical switches are replaced with optical splitters.

A recording medium according to the present embodiment is characterized in that in addition to the above configurations, where there are n (n is an integer of 2 or greater) pieces or more of the optical switch modules, optional (n−1) pieces or less of optical switches are replaced with optical splitters.

Embodiment 1

Method 1

In Embodiment 1, OLT carries out ranging to OSM, too, RTTs denotes the round-trip delay time of OLT and OSM, TZ=RTTa−RTTs from the round trip time RTTa of OLT and ONU is acquired from OLT, and using this Tz, the connection start time of the upstream optical switching element is determined.

FIG. 1 describes the present embodiment.

The present embodiment is characterized in that OLT carries out ranging against OSM and round-trip time RTTs is measured as is the case in that OLT carries out ranging for ONU and round-trip time RTTa of the control packet is measured.

As shown in the figure, in order for OSM to use the delay time Tz=RTTa−RTTs, OLT informs RTTa and RTTs or its difference RTTa−RTTs information, OLT transmits the information of RTTa, RTTs or their difference RTTa−RTTs to OSM. Once OSM acquires Tz, the connection start time t3* of the upstream optical switching element can be obtained as t3*=t2+tz−Ty1. However, Ty1 is the delay time from when the upstream optical switching element gives the start time until when the packet is transmitted from OSM, and is the value which can be acquired in advance in designing OSM. In addition, t2 is the grant start time (transmission start time) written in the GATE message (downstream control packet).

Embodiment 2

Method 2

When OLT carries out the first ranging of ONU, the arrival time t3 of the REPORT message (upstream control packet) to the GAT message (downstream control packet) is found at the outgoing port of the upstream optical switching element of the optical switch module, Tz(=t3−t2) is found from the grant start time t2 written in the GATE message, and using this Tz, the contact start time of the upstream optical switching element is determined.

Figure 2:
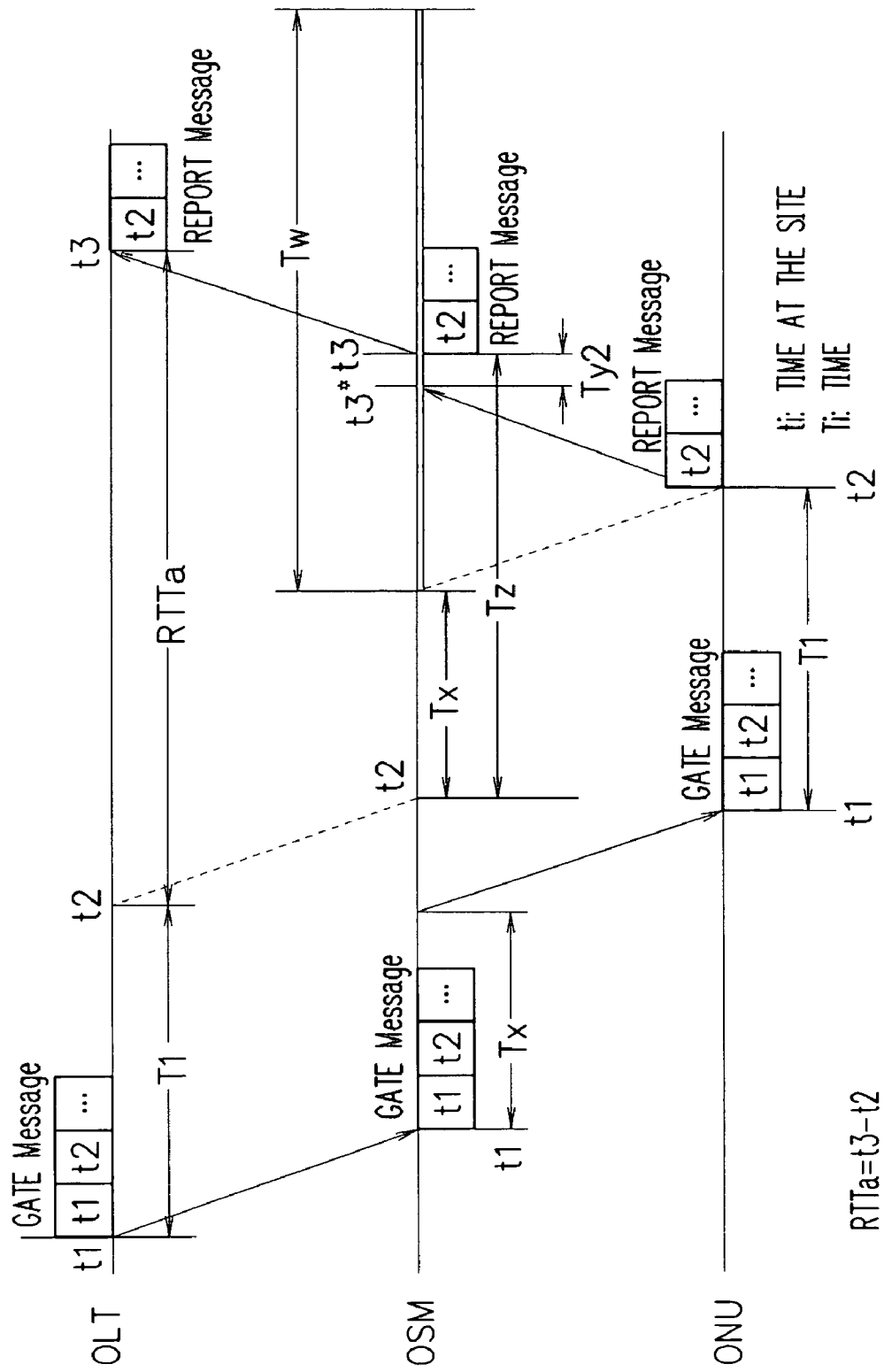
FIG. 2 is an illustration for explaining the second embodiment according to the present invention.

FIG. 2 describes embodiment 2.

In OSM, first of all, LLID, t1, and t2 obtained from the GATE message in the ONU direction are used. The OSM clock is set to time t1 when the GATE message is received.

First of all, the distance between OSM and ONU is optional and time t2+Tx is designated as the contact start time of the upstream switching element by a clock of OSM which detects the arrival of the REPORT message at the outgoing port of the optical switch module and the contact duration time is set to Tw, the ranging window size. Now, Tx denotes the delay time on the downstream side of OSM and is the value which can be obtained in advance in designing OSM. That is, OSM chooses the incoming port corresponding to LLID of the upstream optional switching element, sets the connection start time to t2+TX by the OSM's clock, sets the connection duration time to Tw, detects arrival of the REPORT message from ONU to the GATE message, and acquires the arrival time t3. Because the contact start time of the upstream switching element is t2+Tx and the contact duration time Tw, at the outgoing port of the upstream switching element the REPORT message from ONU can be detected without fail. From this t3, Tz can be obtained by Tz=t3−t2. After Tz is obtained, the contact start time t3* of the upstream optical switching element can be obtained as t3*=t2+Tz−Ty2. Now, Ty2 is the delay time from the incoming port of the upstream optical switching element to the point where the arrival time t3 is measured.

This operation must be carried out when OLT carries out ranging for the first time for ONU corresponding to LLID. Detecting that the GATE message is the first ranging can be understood that the transmission start time t2 of ONU attached to the GATE message is the time in the ranging window when the ranging window is set to a fixed position in the system frame. In addition, for example, the GATE message right after the Discovery operation is detected as the first ranging, too. Furthermore, it is possible to use in combination that the transmission direction R of the GATE message indicates the REPORT message, too.

Embodiment 3

Method 3

At the incoming port of the upstream optical switching element in OSM, the upstream packet corresponding to the GATE message is detected at LLID, Tz=t3*−t2 is found from the arrival time t3* by the upstream packet and using this Tz, the contact start time of the upstream optical switching element is determined. However, t2 is the grant start time of ONU written in the GATE message.

Figure 3:
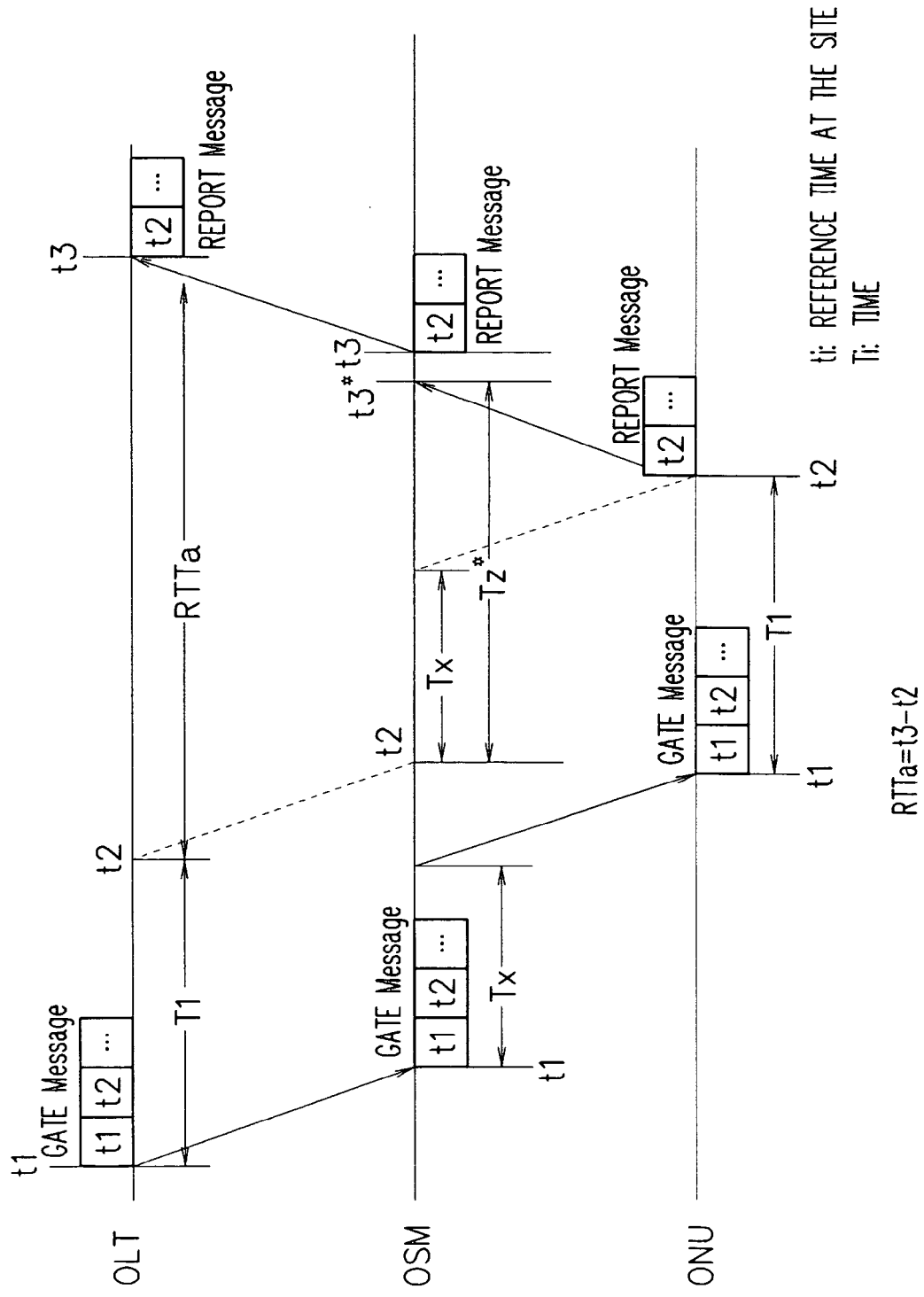
FIG. 3 is an illustration for explaining the third embodiment according to the present invention.

FIG. 3 describes the present embodiment.

The present embodiment enables the detection of the arrival time t3* of the upstream control packet at the incoming port of the upstream switch, enables grasping of the correspondence with the GATE message from LLID of the upstream packet, and enables the evaluation of delay time Tz*=t3*−t2 from the time stamp of the GATE message. After this Tz* is obtained, the arrival time t3* of the upstream control packet, that is, the contact start time t3* of the upstream optical switch can be obtained at t3*=Tz*+t2.

Embodiment 4

Ranging Window

Embodiment 4 is an embodiment of ranging window in OLT.

Figure 4:
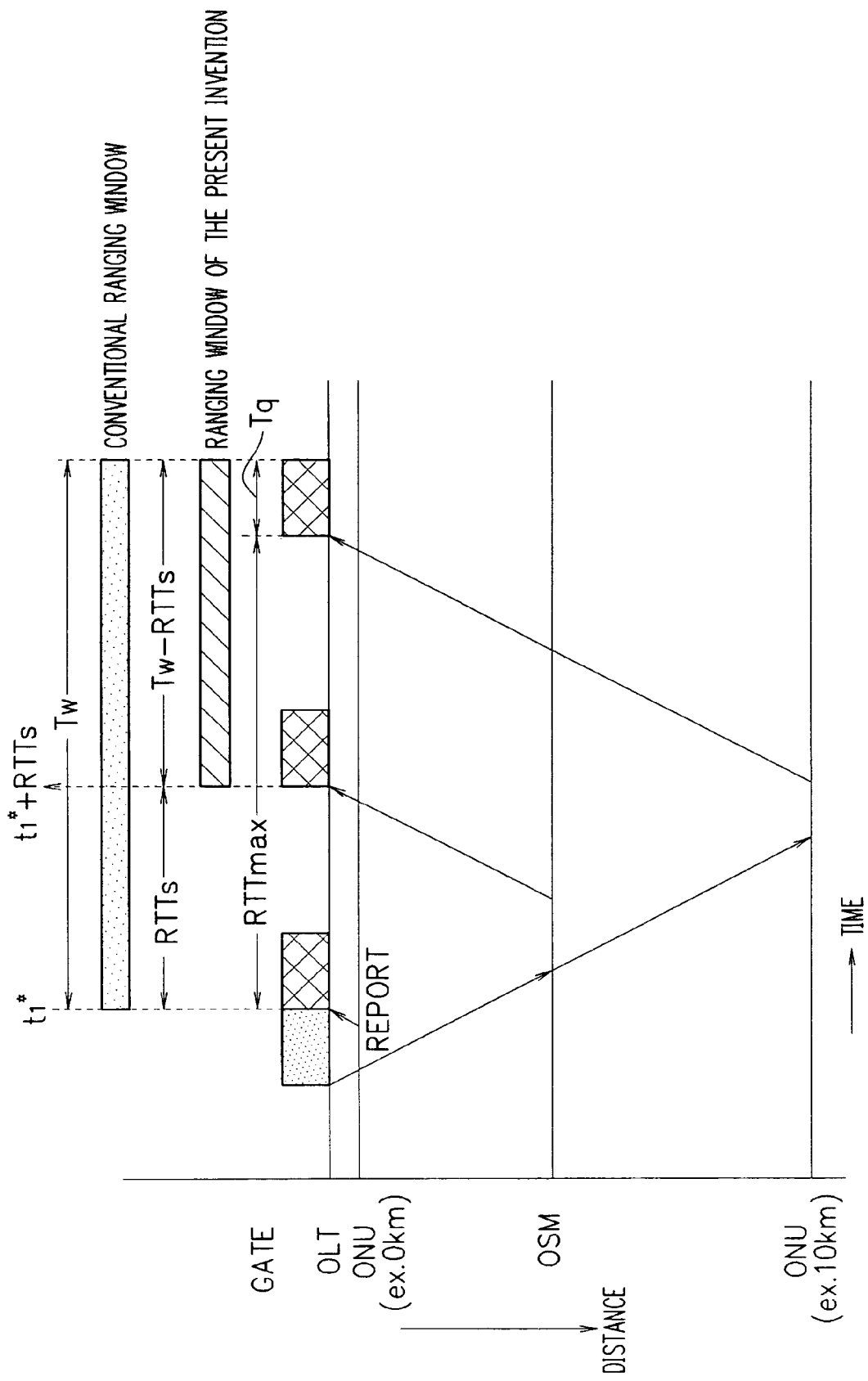
FIG. 4 is an illustration for explaining the fourth embodiment according to the present invention.
Figure 10:
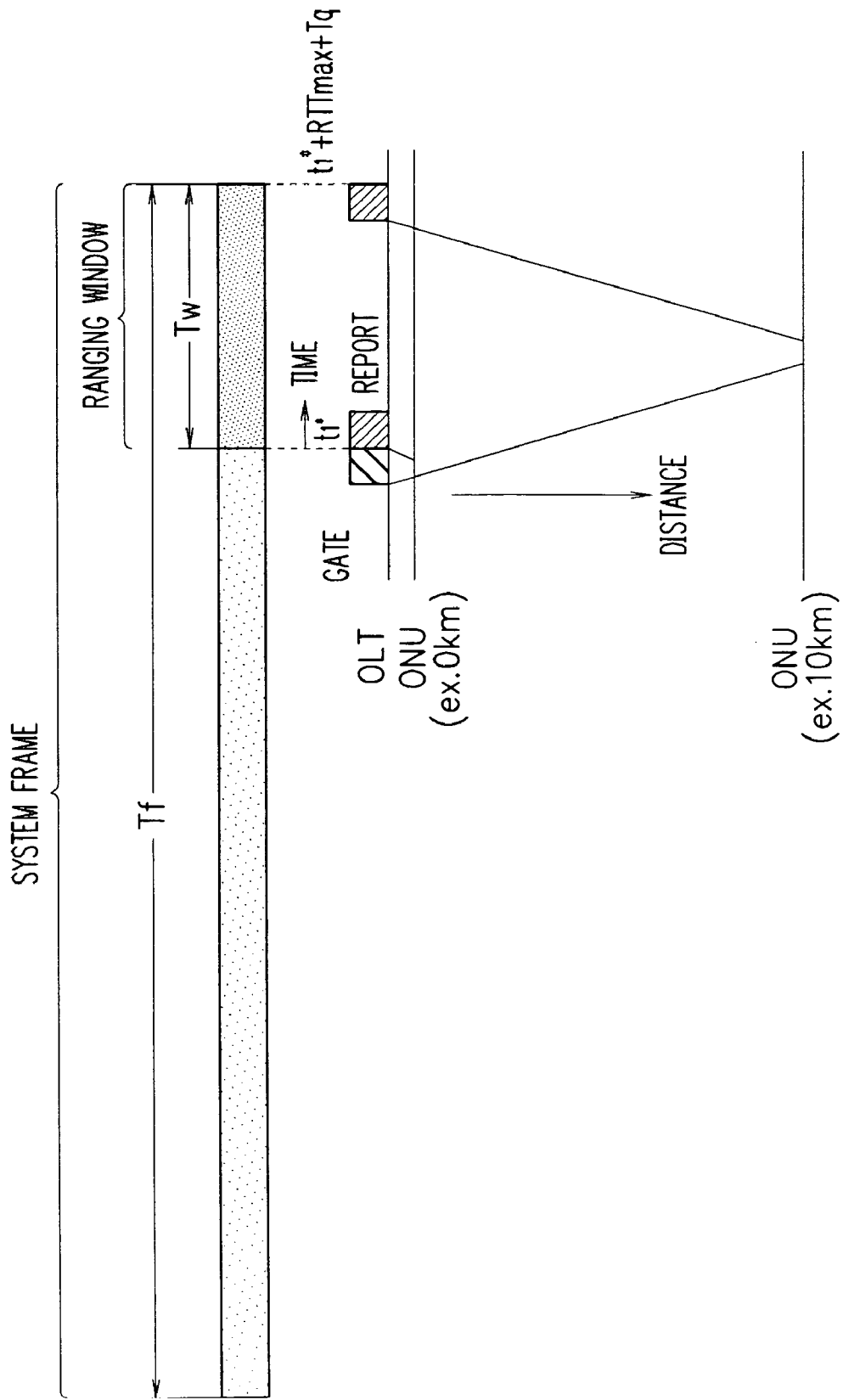
FIG. 10 is an illustration of another conventional technology.
Figure 11:
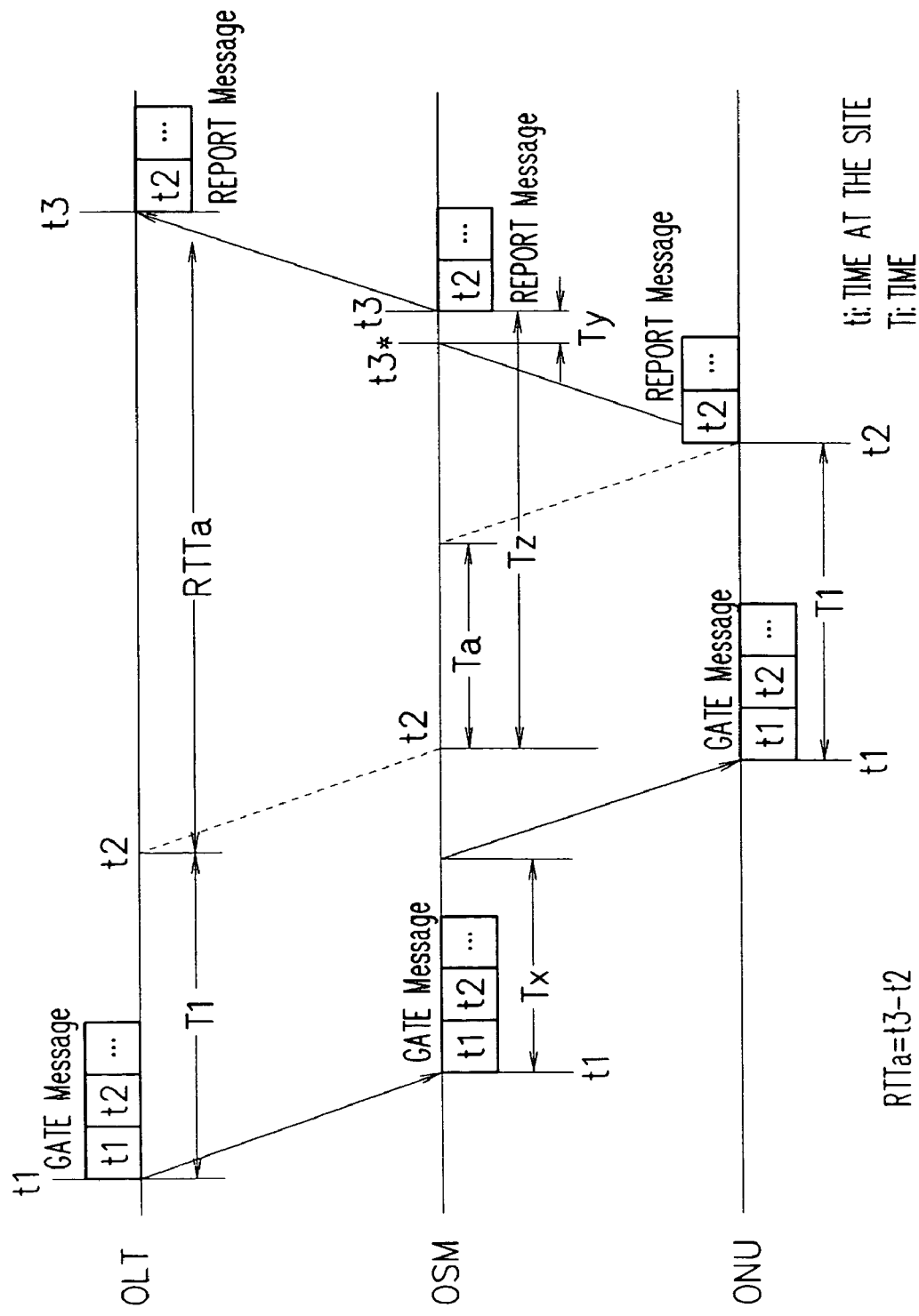
FIG. 11 is an illustration for explaining the relationship of times in the present invention.

Referring to FIG. 4, the present embodiment will be described. By the way, FIG. 4 is an enlarged view of FIG. 10.

In the ranging window of conventional technology shown in FIG. 4, assuming that ONU is installed in an optional distance from OLT, the round-trip distance between OLT and ONU is set to 0 km to the maximum distance L km which is fixed in designing the network, Tw which corresponds to the time obtained by adding the REPORT message length Tq to the round-trip time worth of L km is designated as the ranging window size, and the ranging window start point is designated as the time t1* which corresponds to the position of ONU of 0 km.

Now, when ranging is carried out for the first time, this Tw must be saved to avoid collision with a packet from other ONU.

Now, in embodiment 1 according to the present invention, first of all, it is utilized that the center device (OLT) must find the round-trip time RTTs to and from the optical switch module (OSM). Once the RTTs value can be obtained, as shown in FIG. 4, the ranging window start point should be designated as t1*+RTTs and the size of the ranging window should be set to Tw−RTTs. A small ranging window is desirable from the viewpoint of transmission efficiency.

Embodiment 5

Optical Switch Module of Method 1

Embodiment 5 is an embodiment of an optical switch module (OSM).

The present embodiment at first allows OSM to have ranging functions, too, and OLT carries out OSM ranging in the same manner as ONU ranging. OLT transmits the difference Tz (=RTTa−RTTs) between ONU round-trip time RTTa and OSM round-trip time RTTs, which is the ranging results of them, to OSM. OSM receives Tz from OLT and using the TZ, calculates the contact start time and obtains the start time of the upstream optical switching element. Consequently, OSM possesses response functions of REPORT message from OLT to the GATE message, functions to receive TZ from OLT thereafter, and functions to give upstream connection start time to the upstream switch control section after it receives Tz.

Figure 5:
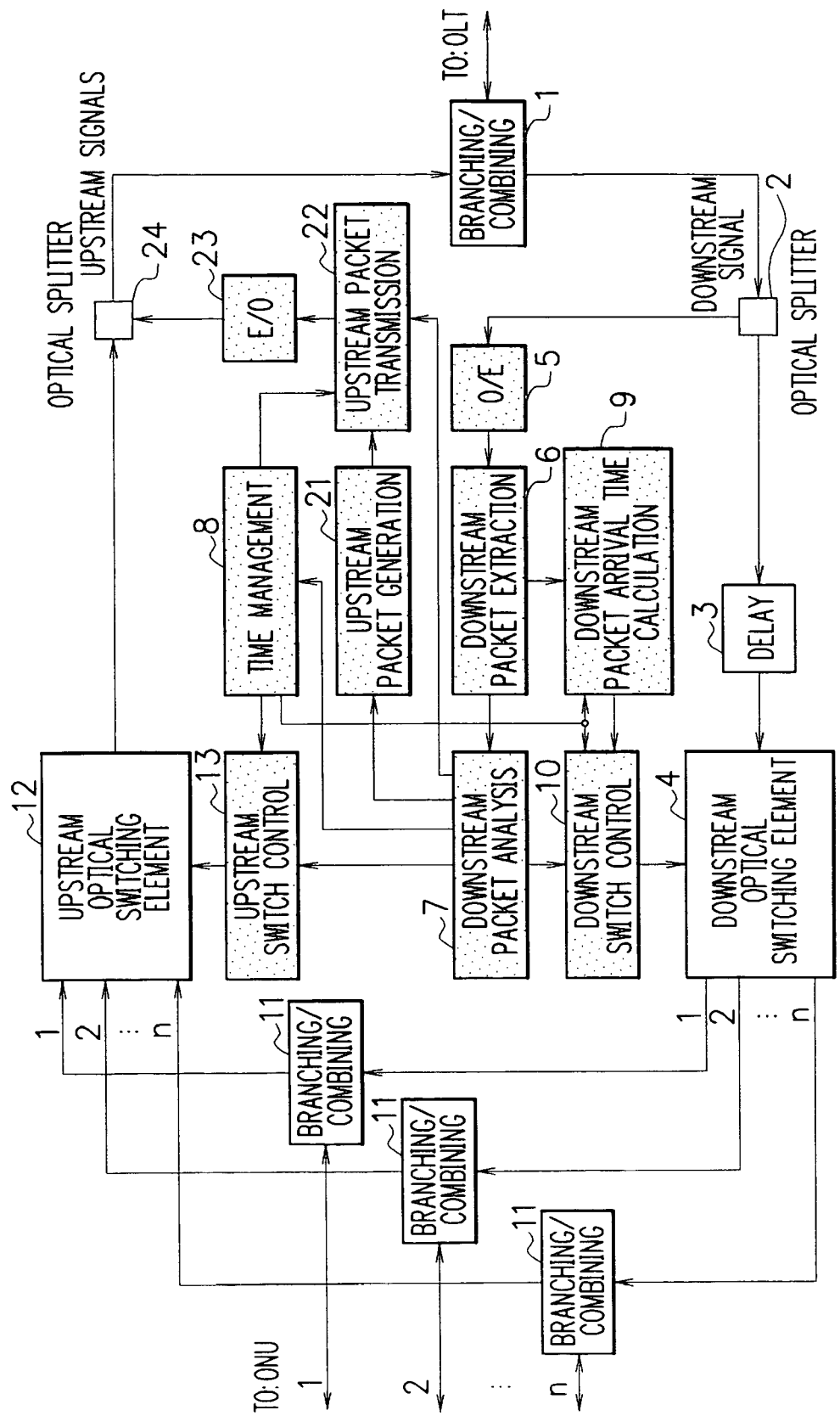
FIG. 5 is an illustration for explaining the fifth embodiment according to the present invention.

FIG. 5 shows embodiment 5.

A branching and combining section 1 branches wavelength of downstream optical signals transmitted from OLT via optical fiber into the OSM inside, and conversely, combines wavelength of upstream optical signals from the OSM inside with optical fiber connected to OLT.

There are n pieces of branching and combining sections 11, which are connected to n pieces of ONU at maximum via optical fiber. The branching and combining section 11 branches the wavelength of upstream optical signals from ONU and entered into the OSM inside. Conversely, the branching and combining section 11 combines downstream optical signals from the OSM inside with optical fiber connected to ONU.

The optical splitter 2 branches a downstream optical signal from the branching and combining section 1 into two signals and transmits one to a delay section 3 and the other to a photoelectric converter section 5.

The delay section 3 enters optical signals from the optical splitter 2 into a downstream optical switching element 4 after delaying them by the time (Tx−Ts) only required for processing electrical signals later discussed, including the time required for the photoelectric converter section 5. Now, Tx is shown in FIG. 1 and Ts is the delay time from when the downstream optical switching element begins connection until when optical signals are transmitted from OSM and both are values which can be obtained in advance in designing of OSM.

The downstream optical switching element 4 is an optical switching device with one incoming port and n pieces of outgoing ports, and connects the downstream optical signals from the delay section 3 to the outgoing port packet by packet in accordance with he directions of a downstream switch control section 10. Optical signals from the outgoing port of the downstream optical switching element 4 are entered into the branching and combining section 11.

The photoelectric converter section 5 converts optical signals from the optical splitter 2 into electricity and enters into the downstream packet extracting section 6 as electrical signals.

The downstream packet extracting section 6 extracts the leading information of the downstream packet, ending information of the downstream packet, and downstream packet from the electrical signals from the photoelectric converter section 5, and enters these pieces of information into a downstream packet analyzing section 7 and at the same time enters the leading information of the downstream packet into a downstream packet arrival time calculating section 9.

The downstream packet analyzing section 7 obtains not only the downstream packet length Tp by the leading information and the ending information from the downstream packet extracting section 6 but also the following information in accordance with the type of the downstream packet. In the event that the downstream packet is the GATE message, the downstream packet analyzing section obtains LLID, time stamp t1, grant start time t2, and grant length Ta.

In the event that the downstream packet is a control message which notifies Tz (difference between ONU roundtrip time RTTa and OSM roundtrip time RTTs) from OLT (hereinafter called "SYN message"), Tz is obtained. In the event that the downstream packet is a packet other than the SYN message (hereinafter called "data packet"), LLID is obtained.

In the event that the downstream packet is GATE message and LLID is ONU, the downstream analyzing section 7 enters LLID and Tp into the downstream switch control section 10, LLID, Ta, and t2 into an upstream switch control section 13, and t1 into a time management section 9.

In the event that the downstream packet is GATE message and LLID is OSM, the downstream packet analyzing section 7 enters t1 into a time management section 8, requires generation of REPORT message to the upstream packet generating section 21, and enters t2 into an upstream packet transmission section 22.

In the event that the downstream packet is SYN message and LLID is OSM, the downstream packet analyzing section 7 enters Tz into the upstream switch control section 13.

In the event that the downstream packet is a data packet and LLID is ONU, the downstream packet analyzing section 7 enters LLID and Tp into the downstream switch control section 10.

The time management section 8 sets the time of the clock inside the time management section to t1 from the downstream packet analyzing section 7, and distributes time to the downstream packet arrival time calculating section 9, downstream switch control section 10, upstream switch control section 13, and upstream packet transmission section 22, respectively.

The downstream packet arrival time calculating section 9 calculates the arrival time t1 of the downstream packet based on the packet leading information from the downstream packet extracting section 6 and time from the time management section 8, and enters into the downstream switch control section 10.

The downstream switch control section 10 chooses the outgoing port of the downstream optical switching element 4 to which ONU corresponding to LLID from the downstream packet analyzing section 7 is connected, designates Tp from the downstream packet analyzing section 7 as the connection duration time of the downstream optical switching element 4, receives time t1 from the downstream packet arrival time calculating section 9, and when the time from the time management section 8 becomes t1+Tx−Ts, directs switching of the downstream optical switching element 4.

The upstream switch control section 13 chooses the incoming port of an optical switching element 12 which is connected to ONU of LLID from the downstream packet analyzing section 7, designates Ta from the downstream packet analyzing section 7 as the connection duration time of the upstream optical switching element 12, receives time Tz and time t2 from the downstream packet analyzing section 7, and when the time from the time management section 8 becomes t2+Tz−Ty1, directs switching of the upstream optical switching element 12.

The upstream packet generating section 21 generates the REPORT message and enters into the upstream packet transmission section 22 when LLID in the downstream packet analyzing section 7 is the GATE message of OSM.

The upstream packet transmission section 22 receives time t2 of the GATE message from the downstream packet analyzing section when LLID is OSM, and enters the REPORT message into a photoelectric converter section 23 when the time from the time management section 8 is t2.

The photoelectric converter section 23 converts electrical signals from the upstream packet transmission section 22 into optical signals and enters into one of the outgoing ports of the optical splitter 24 (coupler) or the upstream optical switch 12.

The optical splitter 24 (coupler) connects optical signals from the photoelectric converter section 23 with optical signals from the upstream optical switching element.

Embodiment 6

Optical Switch Module of Method 2

Embodiment 6 is an embodiment of an optical switch module (OSM).

In the present embodiment, first of all, OLT detects a GATE message corresponding to the first ranging to ONU in OSM, and after the GATE message is detected, connects an upstream switching element, extracts a REPORT message from ONU which corresponds to the GATE message at an outgoing port of the upstream optical switching element, and detects the arrival time t3 of the REPORT message.

Next, in OSM, Tz (=t3−t2) is found from the grant start time t2 and the arrival time t3 written in the GATE message. The present embodiment purports to calculate the connection start time using the Tz and obtain the start time of the upstream optical switching element.

Figure 6:
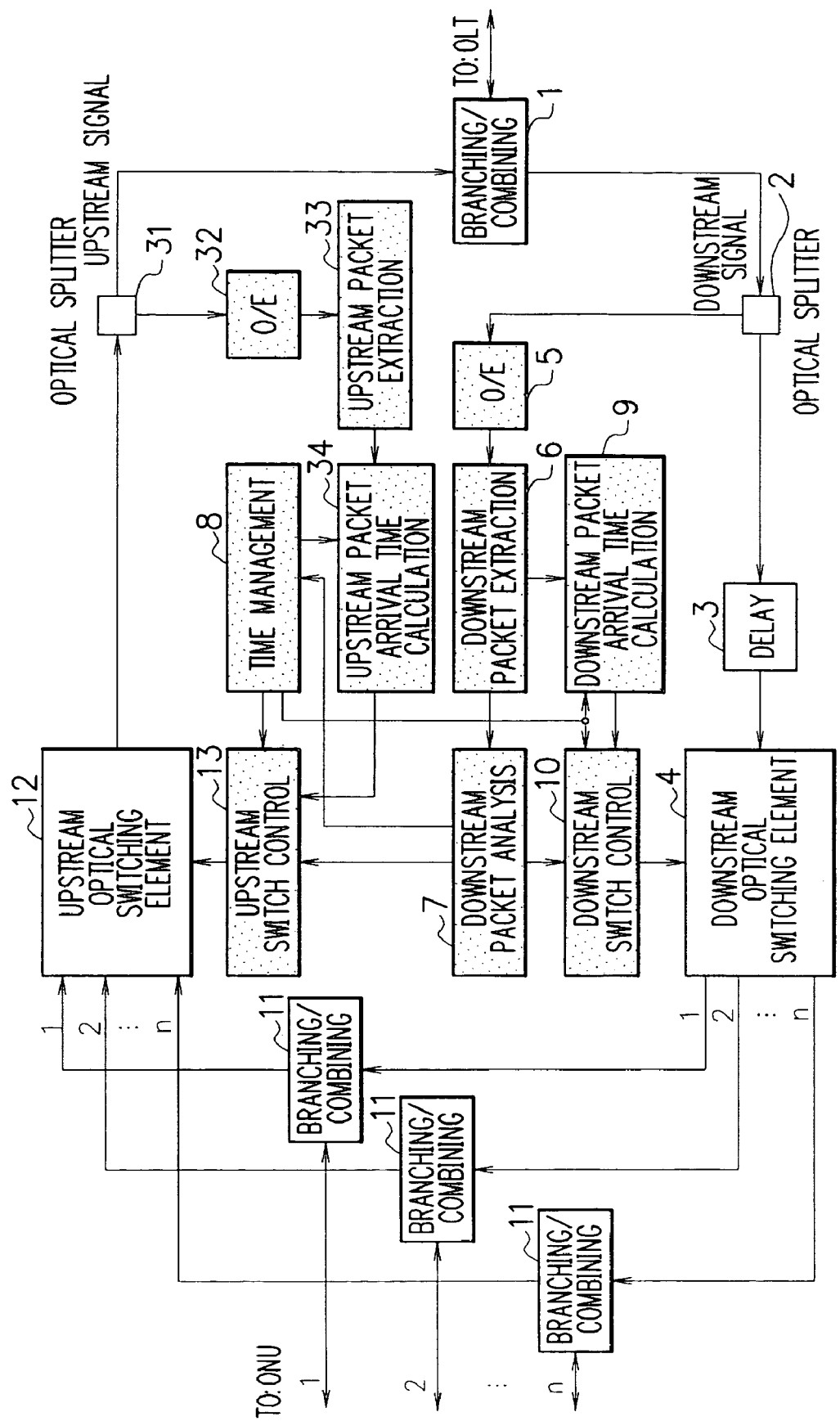
FIG. 6 is an illustration for explaining the sixth embodiment according to the present invention.

FIG. 6 shows embodiment 6.
FIG. 6 is described as follows.

The branching and combining section 1 as a first branching and combining means branches wavelength of downstream optical signals transmitted from OLT via optical fiber into the OSM inside, and conversely, the branching and combining section 1 combines the wavelength of upstream signals from the OSM inside with optical fiber connected to OLT.

There are n pieces of branching and combining sections 11 as second branching and combining means, which are connected to n pieces of ONU at maximum via optical fiber. The branching and combining section 11 branches wavelength of upstream optical signals from ONU and enters into the OSM inside. Conversely, the branching and combining section 11 combines downstream optical signals from the OSM inside with optical fiber connected to ONU.

The optical splitter 2 branches the downstream optical signal from the branching and combining section 1 into two signals and transmits one to the delay section 3 and the other downstream optical signals to the photoelectric converter section 5.

The delay section 3 enters optical signals from the optical splitter 2 into a downstream optical switching element 4 after delaying them by the time (Tx−Ts) only required for processing electrical signals later discussed, including the time required for the photoelectric converter section 5. Now, Tx is shown in FIG. 1 and Ts is the delay time from when the downstream optical switching element begins connection until when optical signals are transmitted from OSM and both are values which can be obtained in advance in designing of OSM.

The downstream optical switching element 4 is an optical switching device with one incoming port and n pieces of outgoing ports, and connects the downstream optical signals from the delay section 3 to the outgoing port packet by packet in accordance with he directions of a downstream switch control section 10. Optical signals from the outgoing port of the downstream optical switching element 4 are entered into the branching and combining section 11.

The photoelectric converter section 5 converts optical signals from the optical splitter 2 into electricity and enters into the downstream packet extracting section 6 as electrical signals.

The downstream packet extracting section 6 extracts the leading information of the downstream packet, ending information of the downstream packet, and downstream packet from the electrical signals from the photoelectric converter section 5, and enters these pieces of information into a downstream packet analyzing section 7 and at the same time enters the leading information of the downstream packet into a downstream packet arrival time calculating section 9.

The downstream packet analyzing section 7 obtains not only the downstream packet length Tp by the leading information and the ending information from the downstream packet extracting section 6 but also the following information in accordance with the type of the downstream packet. In the event that the downstream packet is the GATE message, the downstream packet analyzing section obtains LLID, time stamp t1, grant start time t2, and grant length Ta.

In the event that the downstream packet is a packet other than the SYN message (hereinafter called the "data packet"), LLID is obtained.

In the event that the downstream packet is GATE message and LLID is ONU, the downstream analyzing section 7 enters LLID and Tp into the downstream switch control section 10, LLID, Ta, and t2 into an upstream switch control section 13, and t1 into a time management section 9.

In the event that the downstream packet is a data packet and LLID is ONU, the downstream packet analyzing section 7 enters LLID and Tp into the downstream switch control section 10.

The time management section 8 sets the time of the clock inside the time management section to t1 from the downstream packet analyzing section 7, and distributes time to the downstream packet arrival time calculating section 9, downstream switch control section 10, upstream switch control section 13, and upstream packet arrival time calculating section 34, respectively.

The downstream packet arrival time calculating section 9 calculates the arrival time t1 of the downstream packet based on the packet leading information from the downstream packet extracting section 6 and time from the time management section 8, and enters into the downstream switch control section 10.

The downstream switch control section 10 chooses the outgoing port of the downstream optical switching element 4 to which ONU corresponding to LLID from the downstream packet analyzing section 7 is connected, designates Tp from the downstream packet analyzing section 7 as the connection duration time of the downstream optical switching element 4, receives downstream packet arrival time t1 from the downstream packet arrival time calculating section 9, and when the time from the time management section 8 becomes t1+Tx−Ts, directs switching of the downstream optical switching element 4.

In the downstream packet analyzing section 7, judgment is made on whether or not the GATE message is that for the first ranging for ONUa. In such event, the GATE message for the first ranging is expressed as GATE message 1 and the REPORT message to which ONUa receiving the GATE message 1 replies is expressed as REPORT message 1.

In the event that the downstream packet analyzing section 7 detects GATE message 1, the downstream packet analyzing section 7 enters in an upstream switch control section 13 that it is LLID of GATE message 1 and the first ranging.

The upstream switch control section 13 which receives that the message is LLID of GATE message 1 and the first ranging designates the incoming port to which ONU corresponding to LLID is connected, sets the connection start time to t2+Tx of FIG. 2 by the time of the time management section 8, designates the connection duration time as the size Tw of the ranging window, and directs the upstream optical switching element 12 to connect. Now, Tz is the grant start time written in GATE message 1.

The upstream optical switching element 12 enters REPORT message 1 which arrives during the time Tw into the optical splitter 31 which is located at the outgoing port of the upstream optical switching element 12.

The optical splitter 31 branches optical signals from the upstream optical switching element 12 into two. The photoelectric converter section 32 enters one optical signal from the optical splitter 31 into the upstream packet extracting section 33 after it is converted into electricity.

The upstream packet extracting section 33 extracts REPORT message 1 and enters into the upstream packet arrival time calculating section 34.

The upstream packet arrival time calculating section 34 finds the arrival time t3 of REPORT message 1 by the clock of the time management section 8 by the information of the upstream packet extracting section 33 and enters the arrival time t3 into the upstream switch control section 13.

The upstream switch control section 13 calculates Tz=t3−t2 using time t3 from the upstream packet arrival time calculating section 34 and t2 written in GATE message 1 obtained at the downstream control packet analyzing section 7, and thereafter, chooses an incoming port of the optical switching element 12 connected to ONUa of LLID from the downstream packet analyzing section 7, designates Ta from the downstream packet analyzing section 7 as the connection duration time of the upstream optical switching element 12, receives time t2 from the downstream packet analyzing section 7, and when the time from the time management section 8 becomes t2+Tz−Ty1, directs switching of the upstream optical switching element. However, Ty1 is the delay time from when the upstream optical switching element begins connection until when the packet is transmitted from OSM and is the value which can be obtained in advance in designing of OSM.

Embodiment 7

Optical Switch Module of Method 301

Embodiment 7 is an embodiment of an optical switch module (OSM).

The present embodiment first of all destinations at an optional GATE message in OSM, and finds the arrival time t3* of a packet from ONU which corresponds to the GATE message at an incoming port of the upstream optical switching element.

Then, Tz*(=t3*−t2) is found from the grant start time written in the GATE message in OSM. After the Tz* is obtained, using Tz*, the connection start time is calculated and the upstream optical switching element start time is obtained.

Figure 7:
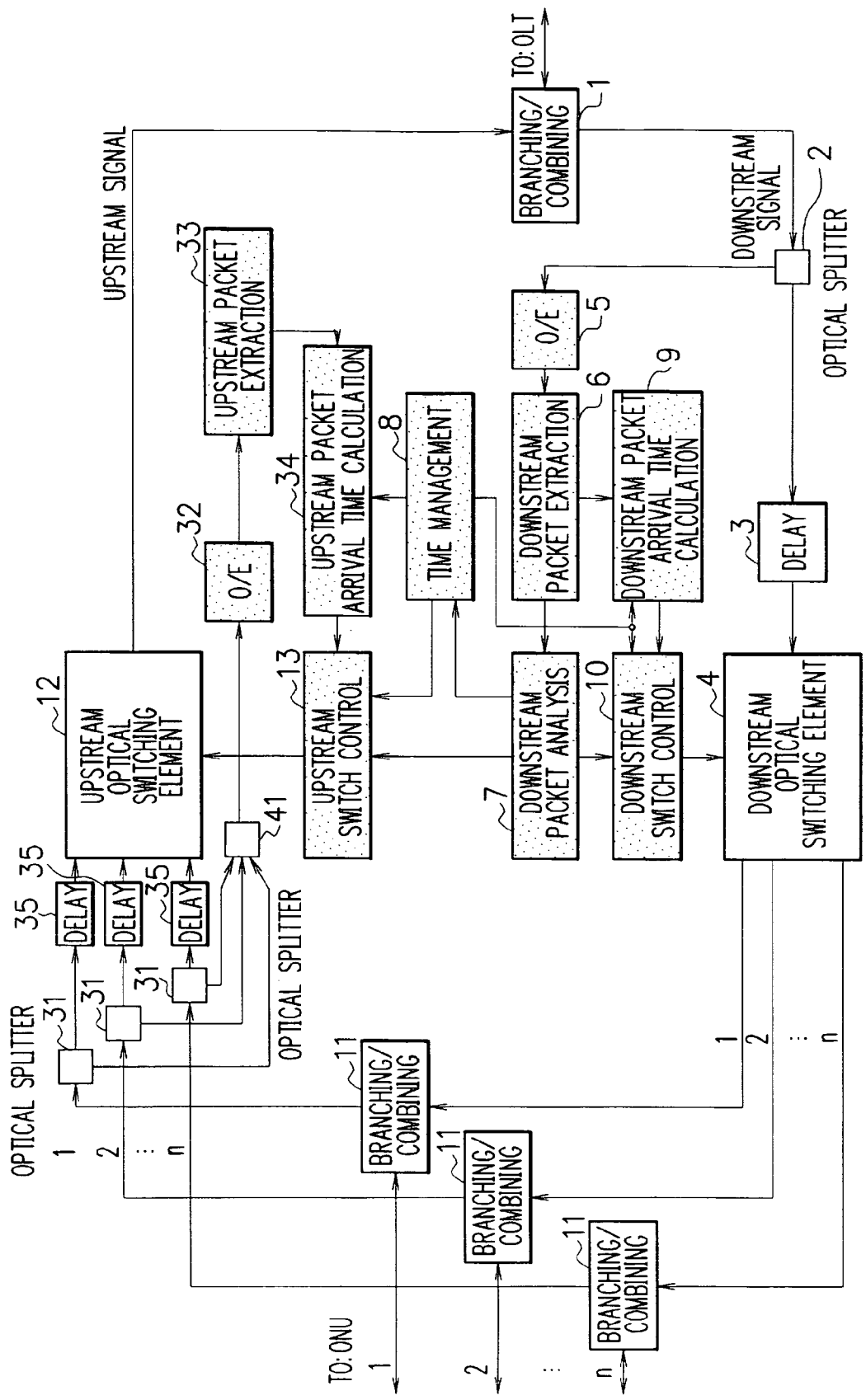
FIG. 7 is an illustration for explaining the seventh embodiment according to the present invention.

FIG. 7 shows embodiment 7.

FIG. 7 is discussed as follows.

The branching and combining section 1 branches wavelength of downstream optical signals transmitted from OLT via optical fiber and conversely, the branching and combining section 1 branches wavelength of upstream signals from the OSM inside to optical fiber connected to OLT.

There are n pieces of branching and combining sections 11, which are connected to n pieces of ONU at maximum via optical fiber. The branching and combining section 11 branches wavelength of upstream optical signals from ONU and enters into the OSM inside. Conversely, the branching and combining section 11 combines downstream optical signals from the OSM inside to optical fiber connected to ONU.

The optical splitter 2 as a first branching means branches downstream optical signals from the branching and combining section 1 into two signals, transmits one downstream optical signal to the delay section 3 and the other downstream signal to the photoelectric converter section 5 as a first conversion means.

The delay section 3 enters optical signals from the optical splitter 2 into a downstream optical switching element 4 after delaying them by the time (Tx−Ts) only required for processing electrical signals later discussed, including the time required for the photoelectric converter section 5. Now, Tx is shown in FIG. 1 and Ts is the delay time from when the downstream optical switching element begins connection until when optical signals are transmitted from OSM and both are values which can be obtained in advance in designing of OSM.

The downstream optical switching element 4 is an optical switching device with one incoming port and n pieces of outgoing ports, and connects the downstream optical signals from the delay section 3 to the outgoing port packet by packet in accordance with the directions of a downstream switch control section 10. Optical signals from the outgoing port of the downstream optical switching element 4 are entered into the branching and combining section 11.

The photoelectric converter section 5 converts optical signals from the optical splitter 2 into electricity and enters into the downstream packet extracting section 6, first-extracting means, as electrical signals.

The downstream packet extracting section 6 extracts the leading information of the downstream packet, ending information of the downstream packet, and downstream packet from the electrical signals from the photoelectric converter section 5, and enters these pieces of information into a downstream packet analyzing section 7 and at the same time enters the leading information of the downstream packet into a downstream packet arrival time calculating section 9, first calculating means.

The downstream packet analyzing section 7 obtains not only the downstream packet length Tp by the leading information and the ending information from the downstream packet extracting section 6 but also the following information in accordance with the type of the downstream packet. In the event that the downstream packet is the GATE message, the downstream packet analyzing section obtains LLID, time stamp t1, grant start time t2, and grant length Ta.

In the event that the downstream packet is a packet other than the SYN message (hereinafter called the "data packet"), LLID is obtained.

In the event that the downstream packet is GATE message and LLID is ONU, the downstream analyzing section 7 enters LLID and Tp into the downstream switch control section 10, LLID, Ta, and t2 into an upstream switch control section 13, and t1 into a time management section 9.

In the event that the downstream packet is a data packet and LLID is ONU, the downstream packet analyzing section 7 enters LLID and Tp into the downstream switch control section 10.

The time management section 8 sets the time of the clock inside the time management section to t1 from the downstream packet analyzing section 7, and distributes time to the downstream packet arrival time calculating section 9, downstream switch control section 10, upstream switch control section 13, and upstream packet arrival time calculating section 34, respectively.

The downstream packet arrival time calculating section 9 calculates the arrival time t1 of the downstream packet based on the packet leading information from the downstream packet extracting section 6 and time from the time management section 8, and enters into the downstream switch control section 10.

The downstream switch control section 10 chooses the outgoing port of the downstream optical switching element 4 to which ONU corresponding to LLID from the downstream packet analyzing section 7 is connected, designates Tp from the downstream packet analyzing section 7 as the connection duration time of the downstream optical switching element 4, receives t1 from the downstream packet arrival time calculating section 9, and when the time from the time management section 8 becomes t1+Tx−Ts, directs switching of the downstream optical switching element 4.

The wavelength from upstream optical signals from ONU is branched at the branching and combining section 11 and entered into the optical splitter 31, a second branching means. The optical splitter 31 separates optical signals from the branching and combining section 11 into two, enters one optical signal into the upstream switching element via the delay section 35 and the other optical signal into the optical splitter 41. The optical splitter 41 combines n pieces of optical signals from n pieces of optical splitters 31 into one and enters into a photoelectric converter section 32, second converting means. The photoelectric converter section 32 converts optical signals from the optical splitter 41 into electrical signals and enters into an upstream packet detector section 33, second extracting means. The upstream packet detector section 33 detects an upstream packet from upstream optical signals and enters into an upstream packet arrival calculating section 34.

The upstream packet arrival calculating section 34 calculates the arrival time t3* of the upstream packet from the packet leading information from the upstream packet extracting section 33 and time information from the time management section 8 and enters into the upstream switch control section 13.

The upstream switch control section 13 calculates Tz*=t3−t2 using time t3* from the upstream packet arrival time calculating section 34 and t2 written in GATE message which directs transmission of this upstream packet obtained in the downstream control packet analyzing section 7.

The relationship between Tz*, t2, and t3* is shown in the horizontal line of OSM of FIG. 3.

The upstream switch control section 13 hereinafter chooses the incoming port of an optical switching element 12 which is connected to ONU of LLID from the downstream packet analyzing section 7 for the upstream packet from ONUa that corresponds to this LLID, designates Ta from the downstream packet analyzing section 7 as the connection duration time of the upstream optical switching element 12, receives information on time t2 from the downstream packet analyzing section 7, and when the time from the time management section 8 becomes t2+Tz, directs switching of the upstream optical switching element 12.

Embodiment 8

Optical Switch Module of Method 3-2

Embodiment 8 is an embodiment of another optical switch module (OSM).

Figure 8:
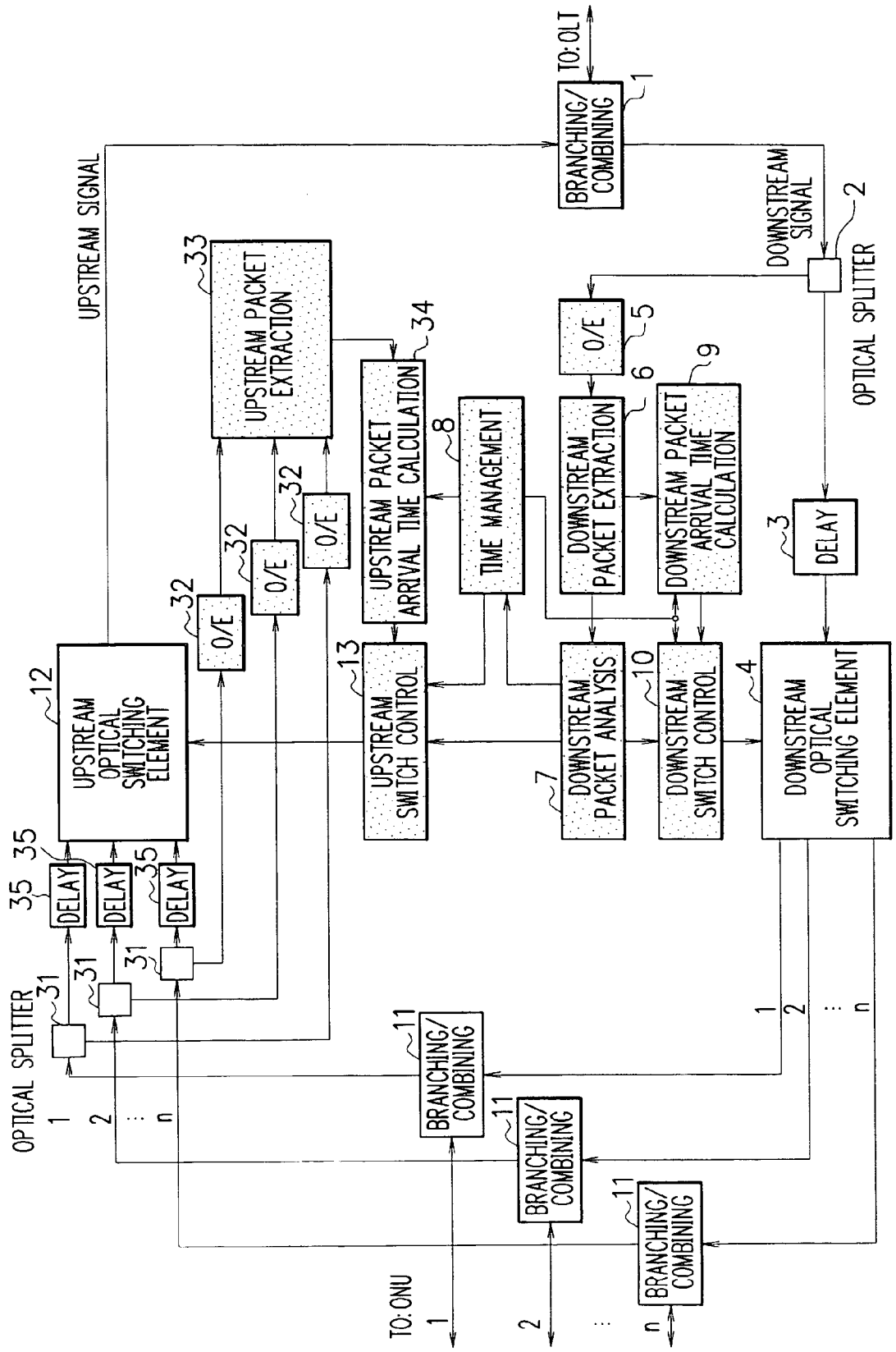
FIG. 8 is an illustration for explaining the eighth embodiment according to the present invention.
Figure 9:
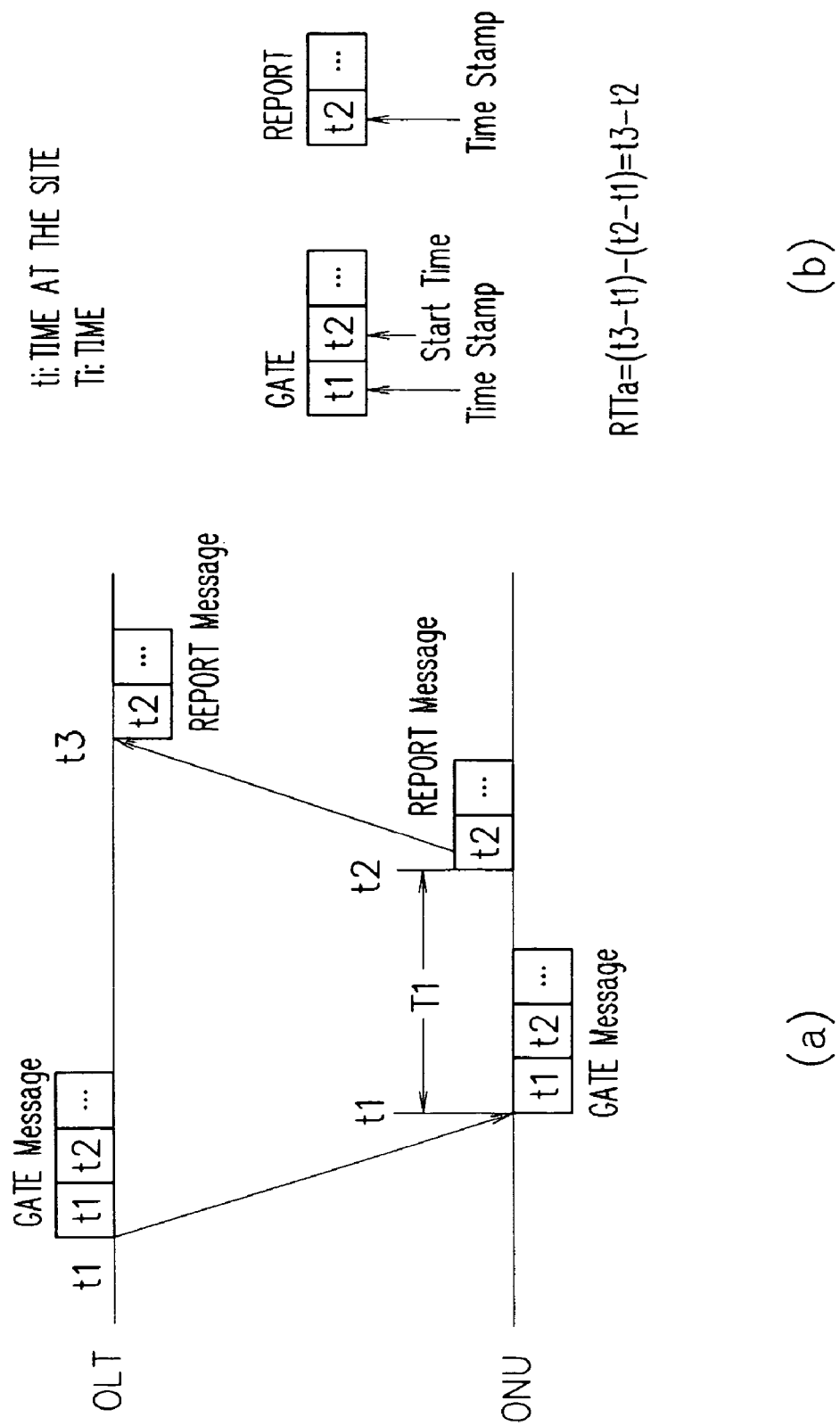
FIG. 9 is an illustration of conventional technology.

FIG. 8 shows embodiment 8.

FIG. 8 differs from FIG. 7 in that the optical splitter 41 of FIG. 7 is not used but n pieces of photoelectric converter sections 32 are used, and n pieces of electric signals are entered in the upstream packet extracting section, and all the remainders are same as FIG. 7, and therefore, the explanation will be omitted.

Effect of the Invention

In an optical access network configured by a center device (OLT), multiple remote devices (ONU) and one or multiple optical switch modules (OSM) installed between OLT and ONU, the connection start time of the upstream optical switching element in the optical switch module (OSM) has not been clarified. By the present invention, the contact start time of the upstream switching element of the optical switch module (OSM) in an optical access network can be obtained and the optical access network can be operated effectively.

By the way, each of the embodiments described above is a preferred embodiment of the present invention and changes and variations may be made without departing from the spirit or scope of the present invention.

In addition, by programs which possess processing procedures to achieve the methods, devices, etc. as embodiments mentioned above and by recording the programs in recording media, each function according to the embodiments of the present invention can be actualized by allowing computer CPU comprising the system to execute processing by the programs supplied from the recording media.

In such event, the present invention should be applied even in the event that the information group containing programs is supplied from the above-mentioned recording media or from external recording media via network.

That is, the program code itself read from the recording media actualizes new functions of the present invention, and recording media which store the program code and signals read from the recording media constitute the present invention.

Examples of the recording media include flexible disks, hard disks, optical disks, magneto-optic disks, flash memory, CD-ROM, CD-R, magnetic tapes, nonvolatile memory cards, ROM, EEPROM, etc.

According to the program related to the present invention, each function as the embodiment related to the above-mentioned invention can be actualized in synchronizing methods, optical switches, remote devices, optical access systems, and optical access networks controlled by the relevant programs.

The present invention can provide the connection start time of the upstream switching element of the optical switch in the optical access network. Consequently, it can be applied extensively to the optical access network.

What is claimed is:

1. A synchronizing method in an optical access network comprising, in a tree-shaped structure, a center device, a plurality of remote devices, and at least one optical switching device connected between the center device and the remote devices;
    the center device transmitting to the optical device a downstream control packet having written therein a transmission time thereof, and an identification number, a transmission start time and a transmission duration time of the remote device to which the downstream control packet is transmitted;
    the optical switching device transmitting the downstream control packet to the remote device to which the control packet is transmitted;
    the remote device to which the downstream control packet is transmitted, upon receipt of the downstream control packet, setting its own clock to the transmission time, to transmit to the optical switching device an upstream control packet having written therein the transmission start time at the transmission start time;
    the optical switching device transmitting to the center device the upstream control packet; and
    the center device determining the packet transmission start time of the remote device after a receipt of the upstream control packet, said method characterized in that:
    the center device determines a round trip time respectively between the center device and the remote device to which the packet is transmitted and between the center device and the optical switching device; and
    the optical switching device sets its own clock to the transmission time to obtain a value of a difference in the round trip time and the information thereof, and determining a delay time from a dispatch of an instruction of a connection start to an upstream optical means of the upstream optical switching device up to the time of transmitting the upstream control packet with a result that a value obtained by subtracting the delay time from a sum of the transmission start time and the difference thereof is set as a connection start time, and the connection start time is set at least to the transmission duration time.

2. The synchronizing method in the optical access network according to claim 1, wherein an identification number ID of the remote device to which the control packet is transmitted and a transmission request R (R=1; request, R=0; non-request) of the upstream control packet are written in the downstream control packet which is transmitted from the center device with a result that the center device sets the request R to 1 at the transmission time on its own clock to transmit the downstream control packet.

3. The synchronizing method in the optical network according to claim 1, wherein a GATE message defined in MPCP of IEEE 802.3ah is set as the downstream control packet and a REPORT message is used as the upstream control packet.

4. The synchronizing method in the optical access network according to claim 1,
    wherein, in a case the center device determines the round trip time RTTs between the center device and the optical switching device to determine at first the round trip time RTTa between the center device and the remote device to which the control packet is transmitted, the center device sets a size W of the time area for receiving the upstream control packet from the remote device to which the control packet is transmitted to W=Tw−RTTs, and
    in a case where a round trip time of the remote device which is most remote in design is set to RTTmax, a length of the upstream control packet is set to Tq, and Tw=RTTmax+Tq is set while the start time of the time area is set to time (t1*+RTTs), wherein RTTs is added to time t1* at which the center device has completed the transmission of the control packet.

5. The synchronizing method according to claim 1, wherein in the case where the optical switching devices are given in the number of n (n is an integer number of 2 or more) or more, the optical switching devices are replaced with optical splitters in any number of (n−1) or less.

6. A synchronizing method in an optical access network comprising, in a tree-shaped structure, a center device, a plurality of remote devices, and at least one optical switching device connected between the center device and the remote devices;
    the center device writing in a downstream control packet a transmission time t1 of the downstream control packet, an identification number and a transmission start time t2 of the remote device to which the downstream control packet is transmitted, and a transmission duration time Ta of the remote device to which the downstream control packet is transmitted to transmit at the transmission time t1 on its own clock the downstream control packet to the remote device to which the packet is transmitted;

the remote device to which the packet is transmitted, upon a receipt of the downstream control packet, setting the transmission time t1 as a time on its own clock to transmit only in the transmission duration time Ta the upstream control packet having written therein the transmission start time t2 at the transmission start time t2 on its own clock; and the center device setting to t3 on its own clock a time at which the upstream control packet is received, and obtaining the transmission start time t2 written in the upstream control packet which has been received with a result that the center device determines as RTTa=t3−t2 the round trip time RTTa between the center device and the remote device to which the control packet is transmitted, and sets to t3−RTTa the transmission start time t2 to be written in the downstream control packet when a desired time is set to t3 at which time the packet is received from the remote device to which the control packet is transmitted after the RTTa has been determined, said method characterized in that:

the optical switching device obtains from the downstream control packet the transmission time t1, the identification number, the transmission start time t2, the transmission duration time Ta, and the packet length of the downstream control packet, sets the time on its own clock to the transmission time t1 and uses an outgoing port of a downstream optical switching means as a port corresponding to the identification number to be connected only in the downstream control packet length Ta, so that an arrival time of the upstream control packet from the remote device to which the control packet is transmitted is measured at the outgoing port of the upstream optical switching means, a delay time is determined which extends from an incoming port of an upstream optical switching means up to a point of measuring the delay time, an other delay time is set to (the arrival time−the transmission start time t2), the connection start time of the upstream optical switching means of the optical switching means is set to (the transmission start time t2+the other delay time−the delay time), and the connection duration time is set to at least the transmission duration time Ta.

7. The synchronizing method in an optical access network according to claim 6, wherein an identification numbers ID of the remote device to which the control packet is transmitted and a transmission request R (R=1; request, R=0; non-request) of the upstream control packet are written in the downstream control packet which is transmitted from the center device with a result that the center device sets the request R to 1 at the transmission time t1 on its own clock to transmit the downstream control packet.

8. The synchronizing method in the optical network according to claim 6, wherein a GATE message defined in MPCP of IEEE 802.3ah is set as the downstream control packet and a REPORT message is used as the upstream control packet.

9. The synchronizing method according to claim 6, wherein in the case where the optical switching devices are given in the number of n (n is an integer number of 2 or more) or more, the optical switching devices are replaced with optical splitters in any number of (n−1) or less.

10. A synchronizing method in an optical access network comprising, in a tree-shaped structure, a center device, a plurality of remote devices, and at least one optical switching device connected between the center device and the remote devices;

the center device transmitting to the optical device a downstream control packet having written therein a transmission time thereof, an identification number, a transmission start time, and a transmission duration time of the remote device to which the control packet is transmitted;

the optical switching device transmitting the downstream control packet to the remote device to which the control packet is transmitted;

the remote device to which the downstream control packet is transmitted, upon a receipt of the downstream control packet, setting its own clock to the transmission time to transmit to the optical switching device an upstream control packet having written therein the transmission start time at the transmission start time;

the optical switching device transmitting to the center device the upstream control packet; and the center device determining the packet transmission start time of the remote device after the receipt of the upstream control packet;

said method characterized in that:

the optical switching device obtains from the downstream control packet the transmission time, the identification number, the transmission start time, the transmission duration time, and the packet length of the downstream control packet to set the time on its own clock to the transmission time, the incoming port of the outgoing port connected in time not less than the packet length of the control packet to the remote device to which the control packet is transmitted and which corresponds to the identification number are connected to the downstream optical switching means with a result that the arrival time of the upstream packet from the remote device to which the control packet is transmitted is set to the arrival time measured on its own clock to determine the other delay time by subtracting the transmission start time from the arrival time, the port connected to the remote device to which the control packet is transmitted is used as the own incoming port of the upstream switching means, the connection start time is set to a sum of the transmission start time and the other delay time, and the connection duration time is set to at least the transmission duration time.

11. The synchronizing method according to claim 10, wherein an identification number ID of the remote device to which the control packet is transmitted and a transmission request R (R=1; request, R=0; non-request) of the upstream control packet are written in the downstream control packet transmitted from the center device, and the center device sets the request R to 1 at the transmission time t1 on its own clock to transmit the downstream control packet.

12. The synchronizing method in the optical network according to claim 10, wherein a GATE message defined in MPCP of IEEE 802.3ah is set as the downstream control packet and a REPORT message is used as the upstream control packet.

13. The synchronizing method according to claim 10, wherein in the case where the optical switching devices are given in the number of n (n is an integer number of 2 or more)

or more, the optical switching devices are replaced with optical splitters in any number of (n−1) or less.

14. An optical switching device which is used in an optical access network comprising, in a tree-shaped structure, a center device, a plurality of remote devices, and at least one optical switching device between the center device and the remote device;

the center device writing in a downstream control packet a transmission time thereof, and an identification number, a transmission time, and a transmission duration time of the remote device to which the control packet is transmitted or the optical switching device to transmit the downstream control packet;

the remote device or the optical switching device which has received the downstream control packet setting its own clock to the transmission time to transmit at the transmission start time on its own clock the upstream control packet having written therein the transmission start time at the transmission start time on its own clock;

and the center device determining from the time on its own clock and the transmission start time of the upstream packet a round trip time between the center device and the remote device to which the control packet is transmitted and a round trip time between the center device and the optical switching device, respectively;

the optical switching device comprising:

first branching and synthesizing means for branching and synthesizing a wave-length of a downstream optical signal and a wave-length of an upstream optical signal which are transmitted with an optical fiber connected to a side of the center device;

n second branching and synthesizing means for branching and synthesizing a wave-length of a downstream optical signal and a wave-length of an upstream optical signal which are transmitted with at most n optical fibers connected to a side of the remote device;

first branching means for branching into two the downstream optical signal obtained by branching the wavelength from the side of the center device with the first branching and synthesizing means;

delay means for giving a delay to one downstream optical signal out of the two downstream optical signals which are branched with the delay means;

downstream optical switching means for switching the downstream optical signal from the delay means having n outgoing ports and one incoming port for switching the downstream optical signal from the delay means;

upstream optical switching means for synthesizing a wave-length of the downstream optical signal from n outgoing ports from the downstream optical switching means, the means having one outgoing port and n incoming ports for switching the upstream optical signal which has been branched in the wave-length from at most n remote devices with the second synthesizing means;

control means for giving the outgoing port of the downstream optical switching means and the connection duration time with the identification number of the downstream packet and the length of the downstream packet, and giving the connection start time of the downstream optical switching means from the arrival time information of the upstream packet with a result that the incoming port of the upstream optical switching means, the connection start time and the connection duration time are determined from the identification number, the difference in the round trip time between the center device and the remote device and the round trip time between the center device and the optical switching device, the transmission time of the remote device and the transmission duration time of the remote device to dispatch a connection instruction to connect the upstream optical switching means and the incoming port upon an arrival of the connection start time, the control means obtaining a value of the difference in two round trip times and the information and determining a delay time which extends from a dispatch of the connection start instruction to an upstream optical switching means with a result that the connection start time is set to a value obtained by subtracting the delay time from a sum of the transmission start time and the difference, and the connection duration time is set to at least the transmission duration time to be given to the optical switching means; and an outgoing port of the second branching means or of the upstream optical switching means; the second branching means connecting the optical signal from the upstream optical switching means and an optical signal from the control means; the upstream optical switching means receiving the optical signal from the control means.

15. The optical switching device according to claim 14, wherein the control means comprises:

first conversion means for converting to an electric signal the other downstream optical signal out of two downstream optical signals which are branched with the first branching means;

extraction means for extracting a downstream packet from the electric signal from the extraction means;

analyzing means for analyzing a content of the downstream packet from the extraction means;

time management means for setting the transmission time obtained with the analyzing means;

calculation means for calculating the arrival time of the downstream packet from the time from the time management means and the downstream packet head information obtained with the extraction means;

downstream switch control means for giving the connection start time and the outgoing port of the downstream optical switching means from the identification number obtained with the analyzing means and the length of the downstream packet and for giving the connection start time of the downstream optical switching means;

generation means for generating with an instruction from the analyzing means the identification number of the optical switching means of the optical switching means and the upstream control packet having written therein the transmission start time obtained with the analyzing means;

transmission means for transmitting at the transmission start time with the time management means the upstream control packet from the generation means; and second conversion means for converting to an electric signal the transmission start time from the transmission means, wherein a value of the difference in the two round trip times and the transmission start time are obtained, a delay time is determined which extends from the dispatch of the connection start instruction to the upstream optical switching means up to a time of transmitting the upstream control packet, and the connection start time is set to a value obtained by subtracting the delay time from the sum of the transmission start time and the value of the difference to set the connection duration time to at least the transmission duration time.

16. The optical switching device according to claim 14, wherein an identification numbers ID of the remote device to which the control packet is transmitted and a transmission request R (R=1; request, R=0; non-request) of the upstream control packet are written in the downstream control packet which is transmitted from the center device with a result that the center device sets the request R to 1 at a transmission time t1 on its own clock to transmit the downstream control packet.

17. The optical switching device according to claim 14, wherein a GATE message defined in MPCP of IEEE 802.3ah is set as the downstream control packet and a REPORT message is used as the upstream control packet.

18. The optical switching device according to claim 14, wherein in the case where the center device determines the round trip time RTTs between the center device and the optical switching device to determine at first the round trip time RTTa between the center device and the remote device to which the control packet is transmitted, the center device sets to W=Tw−RTTs a size W of the time area for receiving the upstream control packet from the remote device to which the control packet is transmitted when the round trip time of the remote device most remote in design is set to RTTmax, a length of the upstream control packet is set to Tq, and Tw=RTTmax+Tq is set, whereas the start time of the time area is set to time (t1*+RTTs) obtained by adding RTTs to the time t1* at which the center device has completed the transmission of the control packet.

19. The optical switching device according to claim 14, wherein in the case where the optical switching devices are given in the number of n (n is an integer number of 2 or more) or more, the optical switching devices are replaced with optical splitters in any number of (n−1) or less.

20. An optical switching device used in an optical access network comprising, in a tree-shaped structure, a center device, a plurality of remote devices, and at least one optical switching device between the center device and the remote device;
   the center device writing in a downstream control packet a transmission time thereof, and an identification number, a transmission start time and a transmission duration time of the remote device to which the control packet is transmitted to transmit the downstream control packet and which receives the downstream control packet to set its own clock to the transmission time;
   the remote device setting its own clock to the transmission time to transmit an upstream control packet having written therein the transmission start time at the transmission start time on its own clock; and
   the center device to determine a round trip time between the center device and the remote device to which the control packet is transmitted respectively from the time on its own clock and the transmission start time of the transmission start time;
   the optical switching device comprising:
      first branching and synthesizing means for branching and synthesizing a wave-length of a downstream optical signal and a wave-length of an upstream optical signal which are transmitted with an optical fiber connected to a side of the center device;
      n second branching and synthesizing means for branching and synthesizing a wave-length of a downstream optical signal and a wave-length of an upstream optical signal which are transmitted with at most n optical fibers connected to a side of the remote device;
      first branching means for branching into two the downstream optical signal obtained by branching the wavelength from the side of the center device with the first branching and synthesizing means;
      delay means for giving a delay to one downstream optical signal out of the two downstream optical signals which are branched with the delay means;
      downstream optical switching means for switching the downstream optical signal from the delay means having n outgoing ports and one incoming port for switching the downstream optical signal from the delay means;
      upstream optical switching means for synthesizing a wave-length of the downstream optical signal from n outgoing ports from the downstream optical switching means, the upstream optical switching means having one outgoing port and n incoming port for switching the upstream optical signal which has been branched in the wave-length from at most n remote devices with the second synthesizing means;
      second branching means for branching an upstream optical signal from the optical switching means; and
      control means for obtaining a packet length of the control packet and obtaining a transmission time t1 at the center device written in the control means, the upstream packet transmission start time t2 of the remote device to which the control packet is transmitted and the packet transmitting duration time Ta of the remote device to which the control packet is transmitted with the result that the downstream optical switching means the outgoing port of the downstream optical switching means, the connection start time and the connection duration time is given with the information and the upstream optical switching means to the downstream optical switching means, and the connection incoming port information of the upstream optical switching means, the connection start time, and the connection duration time are given to the upstream optical switching means.

21. The optical switching device according to claim 20, wherein the control means comprises:
   first conversion means for synthesizing with the first branching and synthesizing means a wave-length of one upstream optical signal out of two upstream optical signals branched with the second branching means to convert to an electric signal the other downstream optical signal out of two downstream optical signals branched with the first branching means;
   first extraction means for extracting the downstream packet from the electric signal from the first conversion means;
   first calculation means for calculating an arrival time of the downstream control packet with information from the first extraction means and a management means;
   analyzing means for obtaining a downstream packet length Tp from the extraction means and for obtaining the transmission time t1 at the center device, the identification number of the remote device to which the control packet is transmitted, the upstream packet transmission start time t2 of the remote device to which the control packet is transmitted, and the packet transmitting duration time Ta of the remote device to which the control packet is transmitted in a case where the downstream packet is the downstream control packet;
   downstream switch control means for giving the outgoing port of the downstream optical switching means, the connection duration time, and the connection start time with the identification number of the remote device to which the control packet is transmitted from the analyzing means and with the packet length and the information from the calculation means;

management means for managing time on a basis of the transmission time t1 added to the downstream control packet obtained with the analyzing means;

second conversion means for converting to an electric signal another upstream optical signal out of two upstream optical signals branched with the second branching means;

second extraction means for extracting the upstream control packet from the electric signal from the second conversion means;

second calculation means for calculating the arrival time of the upstream control packet with information from the second extraction means and the management means; and upstream optical switching control means for determining the incoming port of the upstream optical switching means and the connection duration from the analyzing means, further receiving the time from the management means to give to the optical switching means the incoming port, the connection start time and the connection duration time.

22. The optical switching device according to claim 20, wherein an identification numbers ID of the remote device to which the control packet is transmitted and a transmission request R (R=1; request, R=0; non-request) of the upstream control packet are written in the downstream control packet which is transmitted from the center device with a result that the center device sets the request R to 1 at the transmission time t1 on its own clock to transmit the downstream control packet.

23. The optical switching device according to claim 20, wherein a GATE message defined in MPCP of IEEE 802.3ah is set as the downstream control packet and a REPORT message is used as the upstream control packet.

24. The optical switching device according to claim 20, wherein in the case where the optical switching devices are given in the number of n (n is an integer number of 2 or more) or more, the optical switching devices are replaced with optical splitters in any number of (n−1) or less.

25. An optical switching device used in an optical access network comprising, in a tree-shaped structure, a center device, a plurality of remote devices, and at least one optical switching device between the center device and a remote device;

the center device writing in a downstream control packet a transmission time thereof, and an identification number, a transmission time, a transmission start time, and a transmission duration time of the remote device to which the control packet is transmitted or the optical switching device to transmit the downstream control packet;

the remote device or the optical switching device which has received the downstream control packet setting its own clock to the transmission time, and transmitting at the transmission start time on its own clock the upstream control packet having the transmission start time written therein;

the center device determining from the time on its own clock and the transmission start time of the upstream packet a round trip time between the center device and the remote device to which the control packet is transmitted, the optical switching device comprising:

first branching and synthesizing means for branching and synthesizing a wave-length of a downstream optical signal and a wave-length of an upstream optical signal which are transmitted with an optical fiber connected to a side of the center device;

n second branching and synthesizing means for branching and synthesizing a wave-length of a downstream optical signal and a wave-length of an upstream optical signal which are transmitted with at most n optical fibers connected to a side of the remote device;

first branching means for branching into two the downstream optical signal obtained by branching the wavelength from the side of the center device with the first branching and synthesizing means;

first delay means for giving a delay to one downstream optical signal out of the two downstream optical signals which are branched with the first delay means;

downstream optical switching means for switching the downstream optical signal from the delay means having n outgoing ports and one incoming port for switching the downstream optical signal from the delay means;

second branching means for synthesizing with the n second branching and synthesizing means the wavelength of the downstream optical signal from n outgoing ports from the downstream optical switching means and for branching into two the upstream optical signal in which the wave-length from the at most n remote devices is branched with the second synthesizing and branching means;

second delay means for delaying the downstream optical signal from the second delay means;

control means for obtaining, in a case where the downstream packet is the downstream control packet, the transmission time t1 at the center device, the upstream packet transmission start time t2 of the remote device to which the control packet is transmitted, and obtaining the packet transmitting duration time Ta of the remote device to which the control packet is transmitted;

means for setting the time t1 to the time on its own clock, selecting an outgoing port connected to the remote device to which the control packet is transmitted out of the outgoing ports of n downstream optical switching means having one own incoming port and n own outgoing ports to connect the selected outgoing port and the incoming port in time not less than the time Tp and transmit the downstream control packet at time t1+Ty1 on its own clock thereby measuring on its own clock the arrival time of the upstream packet from the remote device to which the control packet is transmitted at the incoming port of its own upstream optical switching means with respect to the upstream packet from the remote device to which the control packet is transmitted and which remote device has received the downstream control packet with a result that the arrival time t3 is set to time t3* on its own clock, the other delay time Tz*=t3*−t2 is determined, a port connected to the remote device to which the control packet is transmitted is set as an incoming port of the upstream switching means of its own;

the connection start time being set to Tz*+t2, a port connected to the remote device to which the control packet is transmitted is used at the incoming port of the own upstream switching means, the connection start time is set to Tz*+t2, an instruction of connection between the incoming port and the connection duration time is dispatched to the upstream optical switching means upon the arrival of the connection time on its own clock thereby giving the outgoing port of the downstream optical switching means, the connection start time and the connection duration time.

26. The optical switching device according to claim 25, wherein the control means comprises:
   first conversion means for synthesizing a wave-length of the upstream optical signal from the optical switching means with the first branching and synthesizing means to convert to an electric signal the other downstream optical signal out of two downstream optical signals branched with the first branching means;
   first extraction means for extracting the downstream packet from the electric signal from the first conversion means;
   analyzing means for obtaining the downstream packet length Tp from the extraction means and obtaining, in a case where the downstream packet is the downstream control packet, the identification number of the remote device to which the control packet is transmitted, the transmission time t1 at the center device, the transmission start time t2, and the packet transmitting duration time Ta;
   management means for managing time on a basis of the transmission time t1 added to the downstream control packet obtained at the analyzing means;
   first calculation means for calculating the arrival time of the downstream packet from the information from the extraction means and the management means;
   binding means having one output and n inputs for binding the other upstream optical signal out of two upstream optical signals branched with the second branching means;
   second conversion means for converting to an electric signal the upstream optical signal from the binding means;
   second extraction means for extracting the packet from the electric signal from the second conversion means;
   second calculation means for calculating the arrival time of the upstream packet from the information from the extraction means and the management means;
   upstream switch control means for determining a connection start time of the upstream optical switching means from the information from the second calculation means and the analyzing means and receiving the connection incoming port and the connection duration time from the analyzing means thereby dispatching a connection instruction of the incoming port and the connection duration time to the upstream optical switching means upon the arrival of the connection start time at time from the management means; and
   downstream switch control means for giving to the downstream optical switching means the outgoing port of the downstream optical switching means, the connection start time and the connection duration time with the information from the analyzing means, the first calculation means and the management means.

27. The optical switching device according to claim 25, wherein a GATE message defined in MPCP of IEEE 802.3ah is set as the downstream control packet and a REPORT message is used as the upstream control packet.

28. The optical switching device according to claim 25, wherein in the case where the optical switching devices are given in the number of n (n is an integer number of 2 or more) or more, the optical switching devices are replaced with optical splitters in any number of (n−1) or less.

29. An optical switching device used in an optical access network comprising, in a tree-shaped structure, a center device, a plurality of remote devices, and at least one optical switching device between the center device and a remote device;
   the center device writing in the downstream control packet a transmission time, an identification number of the remote device to which the control packet is transmitted or the optical switching device, a transmission start time and a transmission duration time to transmit the transmission time, the identification number thereof, the transmission start time and the transmission duration time;
   the remote device or the optical switching device which has received the downstream control packet setting its own clock to the transmission time, and transmitting at the transmission start time on its own clock the upstream control packet having the transmission start time written therein; and
   the center device determining from the time on its own clock and the transmission start time of the upstream packet a round trip time between the center device and the remote device to which the control packet is transmitted and the center device and the optical switching device, respectively,
   the optical switching device comprising:
      first branching and synthesizing means for branching and synthesizing a wave-length of a downstream optical signal and a wave-length of an upstream optical signal which are transmitted with an optical fiber connected to a side of the center device;
      n second branching and synthesizing means for branching and synthesizing a wave-length of a downstream optical signal and a wave-length of an upstream optical signal which are transmitted with at most n optical fibers connected to a side of the remote device;
      first branching means for branching into two a downstream optical signal obtained by branching the wave-length from a side of the center device with the first branching and synthesizing means;
      first delay means for giving a delay to one downstream optical signal out of the two downstream optical signals which are branched with the first delay means;
      downstream optical switching means for switching the downstream optical signal from the delay means, the means having one incoming port and n outgoing ports;
      n second delay means for synthesizing with the n second branching and synthesizing means the wave-length of the downstream optical signal from n outgoing ports from the downstream optical switching means and branching into two the upstream optical signal by branching the wave-length from at most n remote devices with the n branching and synthesizing means;
      second delay means for delaying one optical signal out of the two downstream optical signals from the second branching means;
      upstream optical switching means for switching the downstream optical signal from the second delay means; the upstream optical switching means having n incoming ports and one outgoing port;
      control means for obtaining, in the case where the downstream packet is the downstream control packet, the transmission time t1 at the center device, the upstream packet transmission start time t2 of the remote device to which the control packet is transmitted, and obtaining the packet transmitting duration time Ta of the remote device to which the control packet is transmitted;

means for setting the time t1 to the time on its own clock, selecting an outgoing port connected to the remote device to which the control packet is transmitted out of the outgoing ports of n downstream optical switching means having one own incoming port and n own outgoing ports to connect the selected outgoing port and the incoming port in time not less than the time Tp and transmit the downstream control packet at time t1+Ty1 on its own clock thereby measuring on its own clock the arrival time of the upstream packet from the remote device to which the control packet is transmitted at the incoming port of its own upstream optical switching means with respect to the upstream packet from the remote device to which the control packet is transmitted and which device has received the downstream control packet with the result that the arrival time t3 is set to time t3* on its own clock, the other delay time Tz*=t3*−t2 is determined, a port connected to the remote device to which the control packet is transmitted is set as an incoming port of the upstream switching means of its own;

the connection start time being set to Tz*+t2, a port connected to the remote device to which the control packet is transmitted is used at the incoming port of the own upstream switching means, the connection start time is set to Tz*+t2, an instruction of connection between the incoming port and the connection duration time is dispatched to the upstream optical switching means upon the arrival of the connection time on its own clock thereby giving the outgoing port of the downstream optical switching means, the connection start time, and the connection duration time.

30. The optical switching device according to claim 29, wherein the control means comprises:

first conversion means for synthesizing a wave-length of the upstream optical signal from the optical switching means with the first branching and synthesizing means to convert to an electric signal the other downstream optical signal out of two downstream optical signals branched with the first branching means;

first extraction means for extracting the downstream packet from the electric signal from the first conversion means;

analyzing means for obtaining a downstream packet length Tp from the first extraction means and obtaining the identification number of the remote device to which the control packet is transmitted, the transmission time t1 at the center device, the transmission start time t2, and the packet transmitting duration time Ta in the case where the downstream packet is the downstream control packet;

management means for managing time on a basis of the transmission time t1 added to the downstream control packet obtained at the analyzing means;

first calculation means for calculating the arrival time of the downstream packet from the first extraction means and the management means;

downstream switch control means for receiving the time of the management means to give to the downstream optical switching means the outgoing port of the downstream optical switching means, the connection start time, and the connection duration time with the identification number from the analyzing means and the downstream packet length Tp;

n second conversion means for converting to an electric signal the other upstream optical signal out of two optical signal branched with the second branching means;

second extraction means for extracting a packet from the electric signal from the n second conversion means;

second calculation means for calculating the arrival time of the upstream packet with the information from the second calculation means and the management means; and upstream switch control means for determining the connection start time of the upstream optical switching means with the information from the second calculation means and the management means and receiving from the analyzing means the connection incoming port information and the connection duration time of the upstream optical switching means to dispatch to the upstream switching means the incoming port and the connection instruction of the connection duration time upon the arrival of the connection start time.

31. The optical switching device according to claim 29, wherein an identification number ID of the remote device to which the control packet is transmitted and a transmission request R (R=1; request, R=0; non-request) of the upstream control packet are written in the downstream control packet transmitted from the center device, and the center device sets the request R to 1 at the transmission time t1 on its own clock to transmit the downstream control packet.

32. The optical switching device according to claim 29, wherein in the case where the optical switching devices are given in the number of n (n is an integer number of 2 or more) or more, the optical switching devices are replaced with optical splitters in any number of (n−1) or less.

33. The optical switching device according to claim 29, wherein a GATE message defined in MPCP of IEEE 802.3ah is set as the downstream control packet and a REPORT message is used as the upstream control packet.

34. The center device in an optical access network comprising, in a tree-shaped structure, a center device, a plurality of remote devices, and at least one optical switching device connected between the center device and the remote device;

wherein the center device writes in a downstream control packet a transmission time t1 of the downstream control packet, the identification number of the remote device to which the control packet is transmitted, the transmission start time t2 of the remote device to which the control packet is transmitted, and the transmission duration time Ta of the remote device to which the control packet is transmitted to transmit at the transmission time t1 on its own clock the downstream control packet to the optical switching device; the center device setting to t3 on its own clock the time at which the upstream control packet has been received from the remote device to which the control packet is transmitted thereby obtaining the time t2 written in the received upstream optical control packet;

the center device determines as RTTa=t3−t2 a round trip time between the center device and the remote device to which the control packet is transmitted; and the center device, when the time which is desired to be received from the remote device to which the control packet is transmitted is set to t3 on its own clock, sets to t3−RTTa the transmission start time t2 written in the downstream control packet, and determines the round trip time RTTs between the center device and the optical switching device to which the control packet is transmitted by means of the method for determining the round trip time RTTa between the center device and the remote device to which the control packet is transmitted thereby transmitting the values of RTTa and RTTs to the optical switching device.

35. The center device according to claim 34, wherein a GATE message defined in MPCP of IEEE 802.3ah is set as the downstream control packet and a REPORT message is used as the upstream control packet.

36. The center device according to claim 34, wherein in the case where the center device determines the round trip time RTTs between the center device and the optical switching device to determine at first the round trip time RTTa between the center device and the remote device to which the control packet is transmitted, the center device sets to W=Tw−RTTs a size W of the time area for receiving the upstream control packet from the remote device to which the control packet is transmitted when the round trip time of the remote device most remote in design is set to RTTmax, a length of the upstream control packet is set to Tq, and Tw=RTTmax+Tq is set whereas a start time of the time area is set to time (t1*+RTTs) obtained by adding RTTs to the time t1* at which the center device has completed the transmission of the control packet.

37. The center device according to claim 34, wherein in the case where the optical switching devices are given in the number of n (n is an integer number of 2 or more) or more, the optical switching devices are replaced with optical splitters in any number of (n−1) or less.

38. A remote device in an optical access network comprising a center device, a plurality of remote devices, and at least one optical switching device connected between the center device and a remote device;

wherein in a case where the center device determines a round trio time RTTs between the center device and the optical switching device to determine at a first a round trip time RTTa between the center device and the remote device to which a control packet is transmitted, the center device sets to W=Tw−RTTs a size W of a time area for receiving an upstream control packet from the remote device to which the control packet is transmitted when a round trip time of a remote device most remote in design is set to RTTmax, a length of the upstream control packet is set to Tq, and Tw=RTTmax+Tq is set, whereas a start time of the time area is set to time (t1*+RTTs) obtained by adding RTTs to a time t1* at which the center device has completed transmission of the control packet, and the remote device sets as the time on its own clock the transmission time t1 of the downstream control packet upon receipt of the downstream control packet which is transmitted from the center device, and transmits only in its own transmission duration time the upstream control packet having written on its own clock the transmission start time t2.

39. The remote device according to claim 38, wherein a GATE message defined in MPCP of IEEE 802.3ah is set as the downstream control packet and a REPORT message is used as the upstream control packet.

40. The remote device according to claim 38, wherein in the case where the optical switching devices are given in the number of n (n is an integer number of 2 or more) or more, the optical switching devices are replaced with optical splitters in any number of (n−1) or less.

\* \* \* \* \*